(12) United States Patent
Tabata et al.

(10) Patent No.: US 7,396,316 B2
(45) Date of Patent: Jul. 8, 2008

(54) CONTROL DEVICE FOR VEHICULAR DRIVE SYSTEM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 281 days.

(21) Appl. No.: 11/092,819

(22) Filed: Mar. 30, 2005

(65) Prior Publication Data
US 2006/0166784 A1 Jul. 27, 2006

(30) Foreign Application Priority Data

| Apr. 27, 2004 | (JP) | ............................. 2004-132029 |
| Jun. 3, 2004 | (JP) | ............................. 2004-165807 |
| Feb. 17, 2005 | (JP) | ............................. 2005-040653 |

(51) Int. Cl.
*B60W 10/04* (2006.01)
*B60W 10/10* (2006.01)

(52) U.S. Cl. ...................................... 477/107; 477/110
(58) Field of Classification Search .................. 477/37, 477/107, 110, 120
See application file for complete search history.

(56) References Cited

U.S. PATENT DOCUMENTS

| 6,579,201 | B2 * | 6/2003 | Bowen | ........................... 475/5 |
| 6,886,648 | B1 | 5/2005 | Hata et al. | |
| 7,131,933 | B2 * | 11/2006 | Tabata | ......................... 477/181 |
| 7,198,123 | B2 * | 4/2007 | Imazu et al. | ............... 180/65.2 |

FOREIGN PATENT DOCUMENTS

| EP | 0 450 282 A2 | 10/1991 |
| EP | 0 450 282 A3 | 10/1991 |
| EP | 1 236 603 A2 | 9/2002 |
| EP | 1 304 248 A1 | 4/2003 |
| JP | 50-30223 | 3/1975 |
| JP | 2-256957 | 10/1990 |
| JP | 5-164205 | 6/1993 |

(Continued)

OTHER PUBLICATIONS

International Search Report for Appn. No. JP2006/321344 issued Nov. 28, 2006.

(Continued)

*Primary Examiner*—Tisha D Lewis
(74) *Attorney, Agent, or Firm*—Kenyon & Kenyon LLP

(57) ABSTRACT

Hybrid controller 52 for a vehicular drive system is operable during a shifting control of step-variable transmission portion 20 for a stepping change of its speed ratio, for changing a speed ratio of continuously-variable transmission portion 11, such that total speed ratio $\gamma T$ of transmission mechanism 10 defined by the speed ratio of the continuously-variable transmission portion 11 and the speed ratio of the step-variable transmission portion 20 is continuously changed, irrespective of the stepping change of the speed ratio of the step-variable transmission portion 20, so that an amount of stepping change of engine speed $N_E$ before and after a shifting action of the step-variable transmission portion 20 is reduced, and a shifting shock of the step-variable transmission portion 20 is reduced. The hybrid controller 52 permits the transmission mechanism 10 to function as a continuously variable transmission, thereby improving fuel economy of the vehicular drive system.

15 Claims, 26 Drawing Sheets

FOREIGN PATENT DOCUMENTS

| | | |
|---|---|---|
| JP | 7-336810 | 12/1995 |
| JP | 09-322307 | 12/1997 |
| JP | 09-331603 | 12/1997 |
| JP | 10-184410 | 7/1998 |
| JP | 11-198668 A | 7/1999 |
| JP | 2000-346169 | 12/2000 |
| JP | 2000-346187 A | 12/2000 |
| JP | 2001-193830 | 7/2001 |
| JP | 2003-011682 A | 1/2003 |
| JP | 2003-127679 | 5/2003 |
| JP | 2003-127681 A | 5/2003 |
| JP | 2003-130202 A | 5/2003 |
| JP | 2003-130203 A | 5/2003 |
| JP | 2003-301731 | 10/2003 |
| JP | 2004-66898 | 3/2004 |

OTHER PUBLICATIONS

Japanese Office Action, Appln. No. 2004-165807, dated Jul. 3, 2007.
English translation of Supplementary European Search Report, Appln. No. 05728659.3 2421, dated Jan. 4, 2008.
Korean Language Version of Korean Office Action, Appln. No. KR 2005-12583, dated Jan. 22, 2008.
Japanese translation of Korean Office Action, Appln. No. KR 2005-12583, dated Jan. 22, 2008.
Corresponding Application KR 2004-0012583.

\* cited by examiner

|   | C0 | C1 | C2 | B0 | B1 | B2 | B3 | SPEED RATIO | STEPPING RATIO |
|---|---|---|---|---|---|---|---|---|---|
| 1st | ◎ | ○ |   |   |   |   | ○ | 3.357 | 1.54 |
| 2nd | ◎ | ○ |   |   |   | ○ |   | 2.180 | 1.53 |
| 3rd | ◎ | ○ |   |   | ○ |   |   | 1.424 | 1.42 |
| 4th | ◎ | ○ | ○ |   |   |   |   | 1.000 | 1.42 |
| 5th |   | ○ | ○ | ◎ |   |   |   | 0.705 | SPREAD 4.76 |
| R |   |   | ○ |   |   |   | ○ | 3.209 | |
| N |   | ○ |   |   |   |   |   |   | |

○ ENGAGED

◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N | ○ |  |  |  |  |  |  |  |

○ ENGAGED

◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

FIELD OF THE INVENTION

The present invention relates in general to a vehicular drive system including a differential mechanism which functions as a transmission having a differential function, and more particularly to techniques for controlling the speed ratio of one of the differential mechanism and an automatic transmission in relation to the speed ratio of the other.

BACKGROUND ART

There is known a drive system for a vehicle, which includes a differential mechanism functioning as a transmission having a differential function, and an automatic transmission operable in a step-variable shifting state, and which is arranged to transmit an output of a drive power source to drive wheels of the vehicle. Generally, the overall speed ratio of the vehicular drive system of this type is determined by the speed ratios of those two transmission mechanisms.

As an example of the differential mechanism functioning as a transmission having a differential function, there is known a drive system which includes a differential device operable to distribute an output of an engine to a first electric motor and an output shaft, and a second electric motor which disposed between the differential device and the drive wheels, and which is operable as a continuously controlled continuously variable transmission. Examples of this type of drive system include drive systems for a hybrid vehicle as disclosed in Patent Documents 1-6. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the differential mechanism functions as an electrically controlled continuously variable transmission the speed ratio of which is electrically variable, thereby making it possible to drive the vehicle under the control of a control device, with the engine kept in an optimum operating state with an improved fuel economy.

The overall speed ratio of vehicular drive system including the two transmissions indicated above is determined by the speed ratio of the differential device having the differential function, and the speed ratio of the automatic transmission. When the differential mechanism is placed in its continuously-variable shifting state, the drive system as a whole functions as the electrically controlled continuously variable transmission, like a drive system including only the differential device, and the vehicle is driven with the engine kept in its optimum operating state.

Patent Document 1: JP-2003-301731A
Patent Document 2: JP-2003-130203A
Patent Document 3: JP-2003-127681A
Patent Document 4: JP-2004-130202A
Patent Document 5: JP-11-198668A
Patent Document 6: JP-11-198668A

DISCLOSURE OF THE INVENTION

When the automatic transmission is shifted in the step-variable shifting state during a shifting action of the differential mechanism in the continuously-variable shifting state, or in the absence of this shifting action, the engine speed is variable in steps according to a change in steps of the speed ratio of the automatic transmission, so that there is a possibility that the overall speed ratio of the drive system as a whole is not continuously variable before and after the shifting action of the automatic transmission. In other words, there is a possibility that the drive system as a whole does not function as a continuously variable transmission before and after the shifting action of the automatic transmission. Accordingly, the drive system may suffer from a shifting shock, or suffer from deterioration of fuel economy of the engine due to a failure to control the engine speed along the highest-fuel-economy curve for the engine to provide a required torque.

The vehicular drive system shown in the above-identified Patent Document 1 is not provided with a fluid-actuated power transmitting device such as a torque converter, so that when the transmission is shifted in the step-variable shifting state, the engine speed is changed in a predetermined relation with the vehicle speed as the speed ratio of the transmission is changed. Where the transmission is shifted to change its speed ratio by controlling the engaging and releasing actions of well known hydraulically operated frictional coupling devices, for example, there is a delay of an actual shifting action of the transmission after a moment of determination of effecting the shifting action. During a time of this delay, the engine speed may not change. Thus, the transmission has a risk of deteriorated shifting response. For instance, when the transmission is commanded to effect a shift-down action upon depression of an accelerator pedal, the engine speed may not rise in a quick response to the depression of the accelerator pedal, leading to a possibility of a delayed rise (delayed initiation of increase) of the engine output.

The present invention was made in view of the background art described above. It is therefore a first object of the present invention to provide a control device for a vehicular drive system including a differential mechanism operable in a continuously-variable shifting state and a transmission operable in a step-variable shifting state, which control device permits reduction of a change of the engine speed in steps during a shifting action of the transmission in the step-variable shifting state. The second object of the invention is to provide a control device for a vehicular drive system including a differential mechanism functioning as a transmission mechanism having a differential function and an automatic transmission operable in a step-variable shifting state, which control device permits a rapid change of the engine speed and an improved shifting response of the automatic transmission when the automatic transmission is shifted in the step-variable shifting state.

According to a $1^{st}$ form of this invention, there is provided a control device for (a) a vehicular drive system comprising a continuously-variable transmission portion including a differential mechanism having a first element connected to an engine, a second element connected to a first electric motor and a third element connected to a power transmitting member, and further including a second electric motor disposed in a power transmitting path between the power transmitting member and a drive wheel of a vehicle, the continuously-variable transmission portion functioning as an electrically controlled continuously variable transmission, and a transmission portion constituting a portion of the power transmitting path, the control device being characterized by comprising (b) continuously-variable shifting control means operable during a shifting control of the transmission portion, for implementing a shifting control of the continuously-variable transmission portion in synchronization with the shifting control of the transmission portion, such that a speed ratio defined by the continuously-variable transmission portion and the transmission portion is continuously changed.

In the control device described above, the continuously-variable shifting control means is operable during a shifting control of the transmission portion for a stepping change of its speed ratio, for implementing a shifting control of the continuously-variable transmission portion in synchronization with the shifting control of the transmission portion, such that a speed ratio defined by the continuously-variable transmission portion and the transmission portion, that is, an overall speed ratio defined by a speed ratio of the continuously-variable transmission portion and the speed ratio of the transmission portion is continuously changed, that is, so as reduce an amount of a stepping change of the speed ratio due to a shifting action of the transmission portion. Accordingly, a stepping change of the speed of the engine before and after the shifting action of the transmission portion is reduced, and a shifting shock of the transmission portion is reduced. Further, the drive system as a whole is operable to function as a continuously variable transmission, so that the fuel economy of the vehicle is improved.

According to a $2^{nd}$ form of this invention, there is provided a control device for (a) a vehicular drive system comprising a continuously-variable transmission portion disposed in a power transmitting path for transmitting an output of an engine to a drive wheel of a vehicle and functioning as a continuously variable transmission, and a transmission portion constituting a portion of the power transmitting path and connected to the continuously-variable transmission portion, the control device being characterized by comprising (b) continuously-variable shifting control means operable during a shifting control of the transmission portion, for implementing a shifting control of the continuously-variable transmission portion in synchronization with the shifting control of the transmission portion, such that a speed ratio defined by the continuously-variable transmission portion and the transmission portion is continuously changed.

In the control device described above, the continuously-variable shifting control means is operable during a shifting control of the transmission portion for a stepping change of its speed ratio, for implementing a shifting control of the continuously-variable transmission portion in synchronization with the shifting control of the transmission portion, such that an overall speed ratio defined by a speed ratio of the continuously-variable transmission portion and the speed ratio of the transmission portion is continuously changed, that is, so as reduce an amount of a stepping change of the speed ratio due to a shifting action of the transmission portion. Accordingly, a stepping change of the speed of the engine before and after the shifting action of the transmission portion is reduced, and a shifting shock of the transmission portion is reduced. Further, the drive system as a whole is operable to function as a continuously variable transmission, so that the fuel economy of the vehicle is improved.

In a $3^{rd}$ form of this invention according to the $1^{st}$ or $2^{nd}$ form, the transmission portion is a step-variable automatic transmission. In this form of the invention, the overall speed ratio defined by the speed ratio of the continuously-variable transmission portion and the speed ratio of the transmission portion can be changed in steps when the transmission portion is shifted. In this case, the overall speed ratio can be changed more rapidly than when the overall speed ratio is continuously changed. Accordingly, the drive device as a whole can be operated to function as a continuously variable transmission under the control of the continuously-variable shifting control means, so that a vehicle drive torque can be smoothly changed, and the speed ratio can be changed in steps to rapidly change the vehicle drive torque.

In a $4^{th}$ form of this invention according to any one of the $1^{st}$ through $3^{rd}$ forms, the continuously-variable shifting control means is operable to change the speed ratio of the continuously-variable transmission portion, in synchronization with the shifting control of the transmission portion, in a direction opposite to a direction of change of the speed ratio of the transmission portion, so as to reduce an amount of change of the speed ratio defined by the continuously-variable transmission portion and the transmission portion. In this form of the invention, the amount of change of the engine speed before and after the shifting action of the transmission portion is reduced, and the shifting shock is further reduced.

In a $5^{th}$ form of this invention according to any one of the $1^{st}$ through $4^{th}$ forms, the continuously-variable shifting control means is operable to implement the shifting control of the continuously-variable transmission portion, in an inertial phase of a shifting action of the transmission portion in which an input speed of the transmission portion changes. In this form of the invention, the shifting control of the continuously-variable transmission portion is implemented by the continuously-variable shifting control means in synchronization with the shifting control of the transmission portion.

In a $6^{th}$ form of this invention according to any one of the $1^{st}$ through $5^{th}$ forms, the control device further comprises torque-reduction control means for reducing an input torque of the transmission portion, the torque-reduction control means reducing the input torque during the shifting control of the transmission portion. In this form of the invention, the torque-reduction control means reduces the input torque of the transmission portion, so as to reduce a torque corresponding to an inertial torque generated due to a change of the speed of a rotary element or elements of the transmission portion in the form of a step-variable transmission portion during its shifting action, and reduce a torque corresponding to an inertial toque generated due to a change of the speed of a rotary element or elements of the continuously-variable transmission portion during the shifting action. Accordingly, the shifting shock is reduced. For instance, the torque-reduction control means reduces the input torque by reducing the engine torque or the torque of the second electric motor.

According to a $7^{th}$ form of this invention, there is provided a control device for (a) a vehicular drive system comprising a continuously-variable transmission portion including a differential mechanism having a first element connected to an engine, a second element connected to a first electric motor and a third element connected to a power transmitting member, and further including a second electric motor disposed in a power transmitting path between the power transmitting member and a drive wheel of a vehicle, the continuously-variable transmission portion functioning as an electrically controlled continuously variable transmission, and a step-variable transmission portion which constitutes a portion of the power transmitting path and which functions as a step-variable automatic transmission, the control device being characterized by comprising (b) continuously-variable shifting control means operable during a shifting control of the step-variable transmission portion, for implementing a shifting control of the continuously-variable transmission portion in synchronization with the shifting control of the step-variable transmission portion, such that a speed ratio of the continuously-variable transmission portion is changed in a direction opposite to a direction of change of a speed ratio of the step-variable transmission portion.

In the control device described above, the continuously-variable shifting control means is operable during a shifting control of the step-variable transmission portion for a stepping change of its speed ratio, for changing the speed ratio of the continuously-variable transmission portion, so as to reduce an amount of the stepping change, so that an overall speed ratio defined by the speed ratio of the continuously-variable transmission portion and the speed ratio of the step-variable transmission portion is continuously changed. Accordingly, a stepping change of the speed of the engine before and after the shifting action of the step-variable transmission portion is reduced, and a shifting shock of the step-variable transmission portion is reduced. Further, the drive system as a whole is operable to function as a continuously variable transmission, so that the fuel economy of the vehicle is improved.

According to an $8^{th}$ form of this invention, there is provided a control device for (a) a vehicular drive system comprising a continuously-variable transmission portion disposed in a power transmitting path for transmitting an output of an engine to a drive wheel of a vehicle and functioning as a continuously variable transmission, and a step-variable transmission portion which constitutes a portion of the power transmitting path and functions as a step-variable automatic transmission and which is connected to the continuously-variable transmission portion, the control device being characterized by comprising (b) continuously-variable shifting control means operable during a shifting control of the step-variable transmission portion, for implementing a shifting control of the continuously-variable transmission portion in synchronization with the shifting control of the step-variable transmission portion, such that a speed ratio of the continuously-variable transmission portion is changed in a direction opposite to a direction of change of a speed ratio of the step-variable transmission portion.

In the control device described above, the continuously-variable shifting control means is operable during a shifting control of the step-variable transmission portion for a stepping change of its speed ratio, for changing the speed ratio of the continuously-variable transmission portion, so as to reduce an amount of the stepping change, so that an overall speed ratio defined by the speed ratio of the continuously-variable transmission portion and the speed ratio of the step-variable transmission portion is continuously changed. Accordingly, a stepping change of the speed of the engine before and after the shifting action of the step-variable transmission portion is reduced, and a shifting shock of the step-variable transmission portion is reduced. Further, the drive system as a whole is operable to function as a continuously variable transmission, so that the fuel economy of the vehicle is improved.

In a $9^{th}$ form of this invention according to the $7^{th}$ or $8^{th}$ form, the continuously-variable shifting control means is operable to implement the shifting control of the continuously-variable transmission portion, in an inertial phase of a shifting action of the step-variable transmission portion in which an input speed of the step-variable transmission portion changes the shifting control of the continuously-variable transmission portion is implemented by the continuously-variable shifting control means in synchronization with the shifting control of the step-variable transmission portion.

In a $10^{th}$ form of this invention according to any one of the $7^{th}$ through $9^{th}$ forms, the control device further comprises torque-reduction control means for reducing an input torque of the step-variable transmission portion, the torque-reduction control means reducing the input torque during the shifting control of the step-variable transmission portion. In this form of the invention, the torque-reduction control means reduces the input torque of the step-variable transmission portion, so as to reduce a torque corresponding to an inertial torque generated due to a change of the speed of a rotary element or elements of the step-variable transmission portion during its shifting action, and reduce a torque corresponding to an inertial toque generated due to a change of the speed of a rotary element or elements of the continuously-variable transmission portion during the shifting action. Accordingly, the shifting shock is reduced. For instance, the torque-reduction control means reduces the input torque by reducing the engine torque or the torque of the second electric motor.

In a $11^{th}$ form of this invention according to any one of the $7^{th}$ through $10^{th}$ forms, the continuously-variable shifting control means is operable to change the speed ratio of the continuously-variable transmission portion in the direction opposite to the direction of change of the speed ratio of the step-variable transmission portion, so as to reduce an amount of change of the speed ratio defined by the continuously-variable transmission portion and the step-variable transmission portion. In this form of the invention, the amount of change of the engine speed before and after the shifting action of the step-variable transmission portion is reduced, and the shifting shock is further reduced.

According to a $12^{th}$ form of this invention, there is provided a control device for a vehicular drive system comprising a continuously-variable transmission portion including a differential mechanism operable to distribute an output of an engine to a first electric motor and a power transmitting member, and further including a second electric motor disposed in a power transmitting path between the power transmitting member and a drive wheel of a vehicle, the continuously-variable transmission portion functioning as an electrically controlled continuously variable transmission, and a step-variable transmission portion constituting a portion of the power transmitting path and functioning as a step-variable automatic transmission, the control device being characterized by comprising (a) engine speed control means operable during a shifting control of the step-variable transmission portion, for controlling a speed of the engine by controlling an electric continuously-variable shifting action of the continuously-variable transmission portion.

In the above-described control device for the drive system comprising the continuously-variable transmission portion functioning as an electrically controlled continuously variable transmission, the engine speed control means is operated during a shifting control of the step-variable transmission portion, to control the speed of the engine by utilizing the function of the continuously-variable transmission portion as the electrically controlled continuously variable transmission, that is, by utilizing the differential function of the differential mechanism, so that the engine speed is rapidly changed with improved response irrespective of the moment of initiation of a shifting action of the step-variable transmission portion, and the shifting control of the step-variable transmission portion is rapidly completed since the shifting control is implemented simultaneously with the engine speed control. When the step-variable transmission portion is shifted down in response to a depression operation of an accelerator pedal, for example, the engine speed is rapidly raised following the depressing operation of the accelerator pedal, so that the engine output (power) is rapidly increased. Further, the shift-down action of the step-variable transmission portion is rapidly completed since the shift-down control is implemented simultaneously with the engine speed control.

In a $13^{th}$ form of this invention according to the $12^{th}$ form, the engine speed control means controls the speed of the engine by utilizing the electric motor, such that the speed of the engine is made equal to a target engine speed value upon completion of a shifting action of the step-variable transmission portion. In this form of the invention, the engine speed is controllable with improved response, irrespective of a change of the engine speed during the shifting action of the step-variable transmission portion.

In a 14$^{th}$ form of this invention according to the 12$^{th}$ or 13$^{th}$ form, the engine speed control means controls a rate of change of the speed of the engine on the basis of a rate of change of an operation amount of an accelerator pedal. In this form of the invention, a desire of an operator of the vehicle is adequately reflected on the engine speed, so that the drivability of the vehicle is improved.

In a 15$^{th}$ form of this invention according to any one of the 12$^{th}$ through 14$^{th}$ forms, the differential mechanism includes a differential-state switching device operable to switch the continuously-variable transmission portion between a differential state in which the continuously-variable transmission portion is operable as the electrically controlled continuously variable transmission, and a non-differential state in which the continuously-variable transmission portion is not operable as the electrically controlled continuously variable transmission. In this form of the invention, the continuously-variable transmission portion is not only operable to function as the electrically controlled continuously variable transmission, but also switchable by the differential-state switching device, to the non-differential state in which the continuously-variable transmission portion is not operable as the electrically controlled continuously variable transmission, namely, to a state in which the continuously-variable transmission portion establishes a mechanical power transmitting path.

According to a 16$^{th}$ form of this invention, there is provided a control device for a vehicular drive system comprising a continuously-variable transmission portion including a differential mechanism operable to distribute an output of an engine to a first electric motor and a power transmitting member, and further including a second electric motor disposed in a power transmitting path between the power transmitting member and a drive wheel of a vehicle, the continuously-variable transmission portion functioning as an electrically controlled continuously variable transmission, and a step-variable transmission portion constituting a portion of the power transmitting path and functioning as a step-variable automatic transmission, the control device being characterized by comprising (a) a differential-state switching device provided in the differential mechanism and operable to switch the continuously-variable transmission portion between a differential state in which the continuously-variable transmission portion is operable as the electrically controlled continuously variable transmission, and a non-differential state in which the continuously-variable transmission portion is not operable as the electrically controlled continuously variable transmission, and (b) engine speed control means operable during a shifting control of the step-variable transmission portion, for controlling a speed of the engine during the shifting control of the step-variable transmission portion in one of two engine speed control methods which is selected depending upon whether the power distributing mechanism is placed in the differential state or the non-differential state upon initiation of the shifting control of the step-variable transmission portion.

The control device described above is provided for controlling the drive system wherein the differential mechanism is switchable by the differential-state switching device, between the differential state in which the continuously-variable transmission portion is operable as the electrically controlled continuously variable transmission, and the non-differential state in which the continuously-variable transmission portion is not operable as the electrically controlled continuously variable transmission. In this control device, the engine speed control means is operated during a shifting control of the step-variable transmission portion, to control the speed of the engine during the shifting control of the step-variable transmission portion, in one of the two engine speed control methods which is selected depending upon whether the differential mechanism is placed in the differential state or the non-differential state upon initiation of the shifting control of the step-variable transmission portion. Accordingly, the engine speed is rapidly changed with improved response. When the differential mechanism is placed in the differential state, for example, the engine speed control means controls the engine speed during the shifting control of the step-variable transmission portion by utilizing the function of the continuously-variable transmission portion as the electrically controlled continuously variable transmission, that is, by utilizing the differential function of the differential mechanism, so that the engine speed is rapidly changed with improved response, irrespective of the moment of initiation of a shifting action of the step-variable transmission portion.

In a 17$^{th}$ form of this invention according to the 16$^{th}$ form, the engine speed control means controls the speed of the engine by controlling an electric continuously-variable shifting action of the continuously-variable transmission portion if the differential mechanism is placed in the differential state upon initiation of the shifting control of the step-variable transmission portion. In this form of the invention, the engine speed is rapidly changed with improved response irrespective of the moment of initiation of a shifting action of the step-variable transmission portion, and the shifting control of the step-variable transmission portion is rapidly completed since the shifting control is implemented simultaneously with the engine speed control. When the step-variable transmission portion is shifted down in response to a depression operation of an accelerator pedal, for example, the engine speed is rapidly raised following the depressing operation of the accelerator pedal, so that the engine output (power) is rapidly increased. Further, the shift-down action of the step-variable transmission portion is rapidly completed since the shift-down control is implemented simultaneously with the engine speed control.

In an 18$^{th}$ form of this invention according to the 16$^{th}$ or 17$^{th}$ form, the engine speed control means controls the speed of the engine by utilizing a change of the speed of the engine due to a shifting action of the step-variable transmission portion if the differential mechanism is placed in the non-differential state upon initiation of the shifting control of the step-variable transmission portion. In this form of this invention, the engine speed is rapidly changed with improved response during the shifting action of the step-variable transmission portion, without switching the differential mechanism from the non-differential state to the differential state.

In a 19$^{th}$ form of this invention according to the 18$^{th}$ form, the engine speed control means controls the speed of the engine during the shifting control of the step-variable transmission portion, by utilizing the electric motor while the differential mechanism is held in the non-differential state, if said differential mechanism is placed in the non-differential state upon initiation of the shifting control of the step-variable transmission portion. In this form of the invention, the engine speed is rapidly changed during the shifting action of the step-variable transmission portion, without switching the differential mechanism from the non-differential state to the differential state, and is controlled with a further improvement of its response, by utilizing the electric motor, so as to be made equal to a target engine speed value upon completion of the shifting action of the step-variable transmission portion.

According to a 20$^{th}$ form of this invention, there is provided a control device for a vehicular drive system comprising a continuously-variable transmission portion including a differential mechanism operable to distribute an output of an engine to a first electric motor and a power transmitting member, and further including a second electric motor disposed in a power transmitting path between the power transmitting member and a drive wheel of a vehicle, the continuously-variable transmission portion functioning as an electrically controlled continuously variable transmission, and a step-variable transmission portion constituting a portion of the power transmitting path and functioning as a step-variable automatic transmission, the control device being characterized by comprising (a) a differential-state switching device provided in the differential mechanism and operable to switch the continuously-variable transmission portion between a differential state in which the continuously-variable transmission portion is operable as the electrically controlled continuously variable transmission, and a non-differential state in which the continuously-variable transmission portion is not operable as the electrically controlled continuously variable transmission, and (b) engine speed control means operable during a shifting control of the step-variable transmission portion, for controlling a speed of the engine during the shifting control of the step-variable transmission portion, by changing a method of the shifting control of the step-variable transmission portion depending upon whether the power distributing mechanism is placed in the differential state or the non-differential state upon initiation of the shifting control of the step-variable transmission portion.

The control device described above is provided for controlling the drive system wherein the differential mechanism is switchable by the differential-state switching device, between the differential state in which the continuously-variable transmission portion is operable as the electrically controlled continuously variable transmission, and the non-differential state in which the continuously-variable transmission portion is not operable as the electrically controlled continuously variable transmission. In this control device, the engine speed control means is operated during a shifting control of the step-variable transmission portion, to control the speed of the engine during the shifting control of the step-variable transmission portion, by changing the method the shifting control of the step-variable transmission portion depending upon whether the differential mechanism is placed in the differential state or the non-differential state upon initiation of the shifting control of the step-variable transmission portion. Accordingly, the engine speed is rapidly changed with improved response. When the differential mechanism is placed in the differential state, for example, the engine speed control means controls the engine speed by utilizing the function of the continuously-variable transmission portion as the electrically controlled continuously variable transmission, that is, by utilizing the differential function of the differential mechanism, so that the engine speed is rapidly changed with improved response, irrespective of the moment of initiation of a shifting action of the step-variable transmission portion.

In a 21$^{st}$ form of this invention according to the above 20$^{th}$ form, the engine speed control means control portion_controls the speed of the engine by controlling an electric continuously-variable shifting action of the continuously-variable transmission portion and implements the shifting control of the step-variable transmission portion, if the differential mechanism is placed in the differential state upon initiation of the shifting control of the step-variable transmission portion. In this form of the invention, the engine speed is rapidly changed with improved response irrespective of the moment of initiation of a shifting action of the step-variable transmission portion. When the step-variable transmission portion is shifted down in response to a depression operation of an accelerator pedal, for example, the engine speed is rapidly raised following the depressing operation of the accelerator pedal, so that the engine output (power) is rapidly increased. Further, the shift-down action of the step-variable transmission portion is rapidly completed since the shift-down control is implemented simultaneously with the engine speed control.

In a 22$^{nd}$ form of this invention according to the 20$^{th}$ or 21$^{st}$ form, if the differential mechanism is placed in the non-differential state upon initiation of the shifting control of the step-variable transmission portion, said engine speed control means implements the shifting control of the step-variable transmission portion, such that the speed of the engine is changed by utilizing a change of the speed of the engine due to a shifting action of the step-variable transmission portion, while the step-variable transmission portion is held in the non-differential state. In this form of the invention, the engine speed is rapidly changed with improved response during the shifting action of the step-variable transmission portion, without switching the differential mechanism from the non-differential state to the differential state.

According to a preferred 23$^{rd}$ form of this invention according any one of the 15$^{th}$ through 22$^{nd}$ forms, wherein the differential mechanism has a first element connected to the engine, a second element connected to the first electric motor, and a third element connected to the power transmitting member, and the differential-state switching device is operable to permit the first through third elements to be rotated relative to each other, for establishing the differential state, and to permit the first through third elements to be rotated as a unit or hold the second element stationary, for establishing said non-differential state. In this form of the invention, the differential mechanism is switchable between the differential state and the non-differential state.

In a 24$^{th}$ form of this invention according to the 23$^{rd}$ form, the differential-state switching device includes a clutch operable to connect any two of the first through third elements to each other for rotating the first through third elements as a unit, and/or a brake operable to fix the second element to a stationary member for holding the second element stationary. In this form of the invention, the differential mechanism is easily switchable between the differential state and the non-differential state.

OTHER FORMS OF THE INVENTION

Preferably, the continuously-variable transmission portion includes a differential mechanism operable to distribute an output of the engine to the first electric motor and the power transmitting member, and a second electric motor disposed in a power transmitting path between the power transmitting member and a drive wheel of the vehicle. In this case, the speed ratio of the drive system is changed to drive the vehicle while keeping the engine in its optimum operating state, so that the fuel economy is improved.

Preferably, the differential mechanism is provided with a differential-state switching device operable to switch the differential mechanism in a differential state in which a differential function of the differential mechanism is available and a locked state in which the differential function is not available. In this case, the differential mechanism is switchable by the differential-state switching device, between the differential state in which the differential function is available and the locked state in which the differential function is not available, so that the drive system has not only an advantage of an improvement in the fuel economy owing to the function of a transmission the speed ratio of which is electrically variable, but also an advantage of high power transmitting efficiency owing to the function of a power transmission device of gear type capable of mechanically transmitting a vehicle drive force. When the engine is in a normal output range for low- or medium-speed running or low- or medium-output running of the vehicle, for example, the differential mechanism is placed in the continuously-variable shifting state, so that the fuel economy of the vehicle is improved. When the vehicle is in a high-speed running state, on the other hand, the differential mechanism is placed in the locked state in which the output of the engine is transmitted to the drive wheel primarily through a mechanical power transmitting path, so that the fuel economy is improved owing to reduction of a loss of energy conversion between mechanical and electric energies, which would take place when the differential mechanism is operated as the transmission the speed ratio of which is electrically changed. When the vehicle is in a high-output running state, the differential mechanism is placed in the locked state. Thus, the differential mechanism is operated as the transmission the speed ratio of which is electrically variable, only when the vehicle is in the low- or medium-speed running state or in the low- or medium-output running state, so that the required amount of electric energy generated by the electric motor, that is, the maximum amount of electric energy that must be transmitted from the electric motor can be reduced, making it possible to minimize the required size of the electric motor, and the required size of the drive system including the electric motor.

Preferably, the continuously-variable transmission portion is switchable by the differential-state switching device between the differential state in which the differential function is available and the locked state in which the differential function is not available, so that the continuously-variable transmission portion is switchable between the continuously-variable shifting state in which an electric continuously-variable shifting action is possible, and the step-variable shifting state in which the electric continuously-variable shifting action is not possible. In this way, the continuously-variable transmission portion is switchable between the continuously-variable shifting state and the step-variable shifting state.

Preferably, the differential mechanism has a first element connected to the engine, a second element connected to the first electric motor and a third element connected to the power transmitting member, and the differential-state switching device is arranged to permit the first through third elements to be rotated relative to each other for establishing the differential state, and permit the first through third elements to be rotated as a unit or hold the second element stationary for establishing the locked state. In this case, the differential mechanism is switchable between the differential state and the locked state.

Preferably, the differential-state switching device includes a clutch operable to connect any two of the first through third elements to each other for rotating the first through third elements as a unit, and/or a brake operable to fix the second element to a stationary member for holding the second element stationary. In this case, the differential mechanism is easily switchable between the differential state and the locked state.

Preferably, the clutch and the brake are released to place the differential mechanism in the differential state in which the first through third elements are rotatable relative to each other and the differential mechanism is operable as an electrically controlled differential device, and the clutch is engaged to permit the differential mechanism to be operable as a transmission having a speed ratio of 1, or the brake is engaged to permit the differential mechanism to be operable as a speed-increasing transmission having a speed ratio lower than 1. In this case, the differential mechanism is switchable between the differential state and the locked state, and operable as a transmission having a single gear position with a single fixed speed ratio or a plurality of gear positions having respective fixed speed ratios.

Preferably, the differential mechanism is a planetary gear set, and the first element is a carrier of the planetary gear set, and the second element is a sun gear of the planetary gear set, while the third element is a ring gear of the planetary gear set. In this case, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

Preferably, the overall speed ratio of the vehicular drive system is defined by the speed ratio of the above-described continuously-variable transmission portion and the speed ratio of the above-described transmission portion. In this case, the vehicle drive force can be obtained over a relatively wide range of the overall speed ratio, by utilizing the speed ratio of the transmission portion, so that the efficiency of the electric continuously-variable shifting control of the continuously-variable transmission portion is further improved.

Preferably, the overall speed ratio of the vehicular drive system is defined by the speed ratio of the above-described continuously-variable transmission portion and the speed ratio of the above-described step-variable transmission portion. In this case, the vehicle drive force can be obtained over a relatively wide range of the overall speed ratio, by utilizing the speed ratio of the step-variable transmission portion, so that the efficiency of the electric continuously-variable shifting control of the continuously-variable transmission portion is further improved.

A continuously variable transmission is constituted by the step-variable transmission portion and the continuously-variable transmission portion placed in its continuously-variable shifting state, while a step-variable transmission is constituted by the step-variable transmission portion and the continuously-variable transmission portion placed in a state in which an electric continuously-variable shifting action is not available.

Preferably, the differential mechanism is operable as a transmission having a speed ratio of 1 while the above-described clutch is engaged, and as a speed-increasing transmission having a speed ratio lower than 1 while the above-described brake is engaged. In this case, the differential mechanism is operable as a transmission having a single gear position with a single fixed speed ratio or a plurality of gear positions having respective fixed speed ratios.

Preferably, the differential mechanism is a planetary gear set, and the first element is a carrier of the planetary gear set, and the second element is a sun gear of the planetary gear set, while the third element is a ring gear of the planetary gear set.

In this case, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

Preferably, the differential mechanism is placed in the non-differential state when the vehicle speed has exceeded an upper limit value provided to determine a high-speed running state of the vehicle. In this case, when the actual vehicle speed has exceeded the upper limit value, the output of the engine is transmitted to the drive wheel primarily through a mechanical power transmitting path, so that the fuel economy is improved owing to reduction of a loss of energy conversion between mechanical and electric energies, which would take place when the differential mechanism is operated as an electrically controlled continuously-variable transmission. The upper limit value of the vehicle speed is a predetermined value for determining whether the vehicle is in the high-speed running state.

Preferably, the differential mechanism is placed in the non-differential state when a drive-force-related value of the vehicle has exceeded an upper output limit value provided for determining a high-output running state of the vehicle. In this case, when the required vehicle drive force or actual vehicle drive force has exceeded the upper output limit value, the output of the engine is transmitted to the drive wheel primarily through a mechanical power transmitting path, so that the maximum amount of electric energy that must be generated when the continuously-variable transmission portion is operated as an electrically controlled continuously variable transmission can be reduced, whereby the required size of the electric motor and the required size of the drive system including the electric motor can be reduced. The drive-force-related value is a parameter directly or indirectly relating to the drive force of the vehicle, such as an output torque of the engine, an output torque of the transmission, a drive torque of the drive wheel, and any other torque or rotary force in the power transmitting path, or an angle of opening of a throttle valve of the engine. The upper output limit value is predetermined to determine whether the vehicle is in the high-output running state.

Preferably, the differential mechanism is placed in the non-differential state upon detection of a failure or functional deterioration of any electric control component such as the electric motor operable to enable the continuously-variable transmission mechanism to operate as an electrically controlled continuously variable transmission. In this case, the differential mechanism is normally placed in the differential state, and is switched to the non-differential state in the event of the above-indicated failure or functional deterioration, to permit running of the vehicle.

NOMENCLATURE OF ELEMENTS

Figures 1, 2:
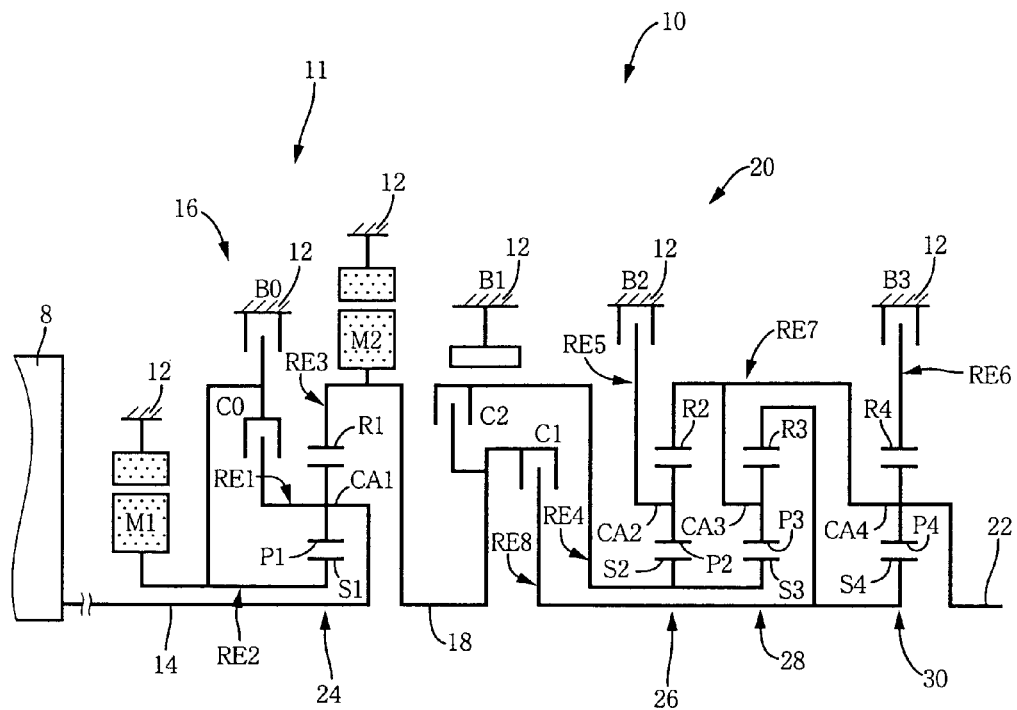
FIG. 1 is a schematic view showing an arrangement of a drive system of a hybrid vehicle according to one embodiment of the present invention.
FIG. 2 is a table indicating shifting actions of the hybrid vehicle drive system of the embodiment of FIG. 1, which is operable in a selected one of a continuously-variable shifting state and a step-variable shifting state, in relation to different combinations of operating states of hydraulically operated frictional coupling devices to effect the respective shifting actions.

8: Engine
10, 70: Transmission mechanism (Drive system)
11: Continuously-variable shifting portion
16: Power distributing mechanism (Differential mechanism)
18: Power transmitting member
20, 72: Step-variable transmission portion (Transmission portion)
38: Drive wheels
40: Electronic control device (Control device)
52: Hybrid control means (Continuously-variable shifting control means)
82: Torque-reduction control means
104: Engine-speed control means
M1: First electric motor
M2: Second electric motor
C0: Switching clutch (Differential-state switching device)
B0: Switching brake (Differential-state switching device)

BEST MODE FOR CARRYING OUT THE INVENTION

Embodiment 1

Referring to the drawings, there will be described in detail the preferred embodiments of the present invention.

Figure 5:
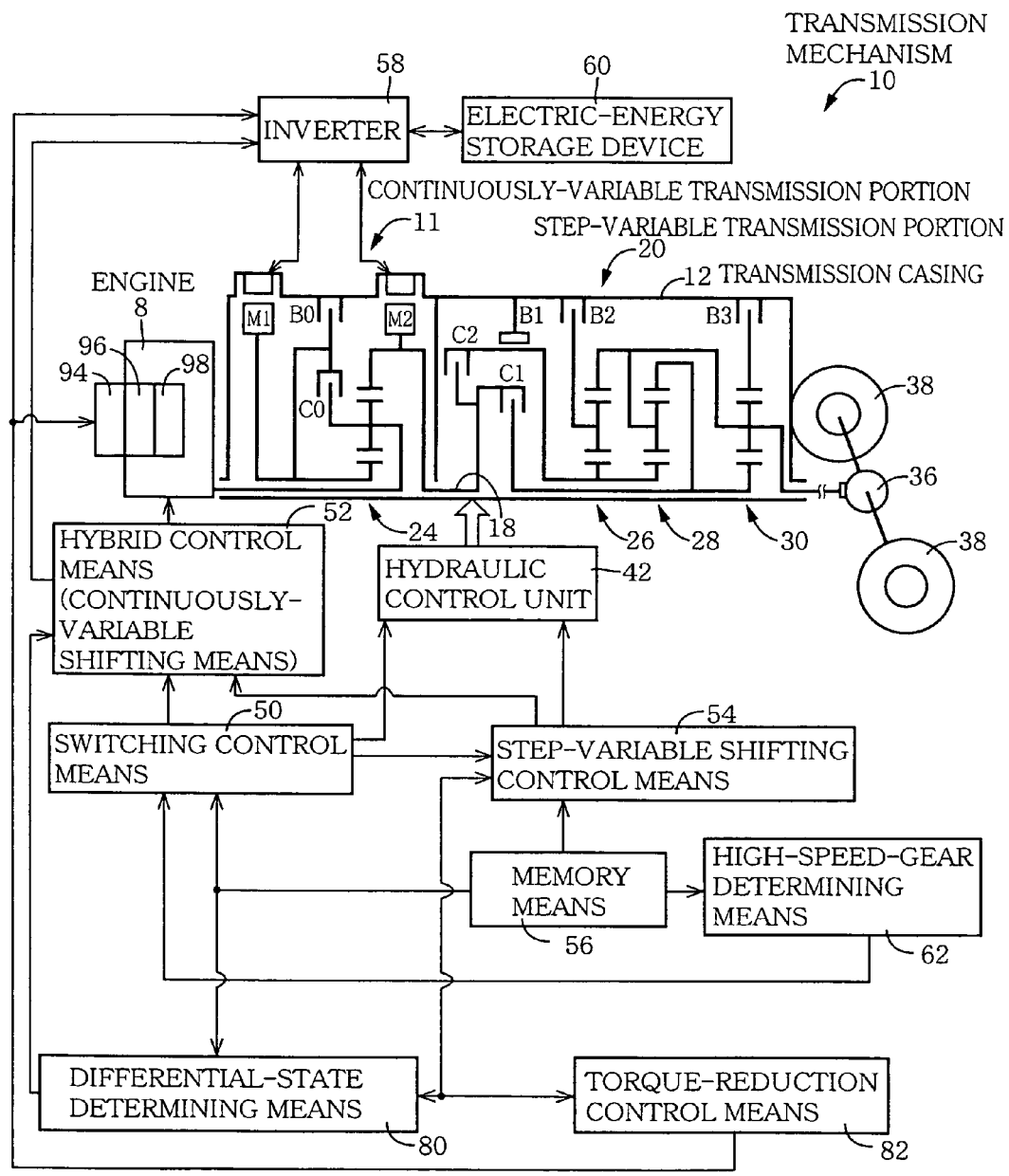
FIG. 5 is a functional block diagram illustrating major control functions of the electronic control device of FIG. 4.

FIG. 1 is a schematic view explaining a transmission mechanism 10 constituting a part of a drive system for a hybrid vehicle, which drive system is controlled by a control device according to one embodiment of this invention. In FIG. 1, the transmission mechanism 10 includes: an input rotary member in the form of an input shaft 14 disposed on a common axis in a transmission casing 12 functioning as a stationary member attached to a body of the vehicle; a continuously-variable transmission portion 11 connected to the input shaft 14 either directly, or indirectly via a pulsation absorbing damper (vibration damping device) not shown; a step-variable or multiple-step transmission portion 20 disposed between the continuously-variable transmission portion 11 and drive wheels 38 (shown in FIG. 5) of the vehicle, and connected in series via a power transmitting member 18 (power transmitting shaft) to the transmission portion 11 and the drive wheels 38; and an output rotary member in the form of an output shaft 22 connected to the step-variable transmission portion 20. The input shaft 12, continuously-variable transmission portion 11, step-variable transmission portion 20 and output shaft 22 are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper. It is noted that a lower half of the transmission mechanism 10, which is constructed symmetrically with respect to its axis, is omitted in FIG. 1. This is also true in the other embodiments described below. In the present transmission mechanism 10, the engine 8 and the continuously-variable transmission portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above.

The continuously-variable transmission portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho1$ of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma0$ (rotating speed of the input shaft 14/rotating speed of the power transmitting member 18) of the power distributing mechanism 16 is continuously changed from a minimum value $\gamma0min$ to a maximum value $\gamma0max$, that is, in the continuously-variable shifting state in which the power distributing mechanism 16 functions as an electrically controlled continuously variable transmission the speed ratio $\gamma0$ of which is continuously variable from the minimum value $\gamma0min$ to the maximum value $\gamma0max$.

When the switching clutch C0 or brake B0 is engaged while the power distributing mechanism 16 is placed in the continuously-variable shifting state, the mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a first non-differential state in which the differential function is not available, so that the continuously-variable transmission portion 11 is also placed in a non-differential state. In this non-differential state, the rotating speed of the engine 8 and the rotating speed of the power transmitting member 18 are made equal to each other, so that the continuously-variable transmission portion 11 (power distributing mechanism 16) is placed in a fixed-speed-ratio shifting state or step-variable shifting state in which the mechanism 16 functions as a transmission having a fixed speed ratio $\gamma0$ equal to 1.

When the switching brake B0 is engaged in place of the switching clutch C0, the first sun gear S1 is fixed to the transmission casing 12, so that the power distributing mechanism 16 is placed in the locked state in which the first sun gear S1 is not rotatable, namely, placed in a second non-differential state in which the differential function is not available, so that the continuously-variable transmission portion 11 is also placed in the non-differential state. Since the rotating speed of the first ring gear R1 is made higher than that of the first carrier CA1, the continuously-variable transmission portion 11 is placed in the fixed-speed-ratio shifting state or step-variable shifting state in which continuously-variable transmission portion 11 (the power distributing mechanism 16) functions as a speed-increasing transmission having a fixed speed ratio $\gamma0$ smaller than 1, for example, about 0.7.

Thus, the frictional coupling devices in the form of the switching clutch C0 and brake B0 function as a differential-state switching device operable to selectively switch the continuously-variable transmission portion 11 (power distributing mechanism 16) between the differential state (namely, non-locked state) and the no-differential state (namely, locked state), that is, between the continuously-variable shifting state in which the continuously-variable transmission portion 11 (the power distributing mechanism 16) is operable as an electrically controlled continuously variable transmission the speed ratio of which is continuously variable, and the locked state in which the continuously-variable transmission portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

The step-variable transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the step-variable transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/Output shaft speed $N_{OUT}$) which change as geometric series. In particular, it is noted that the power distributing mechanism 16 is provided with the switching clutch C0 and brake B0 so that the continuously-variable transmission portion 11 can be selectively placed by engagement of the switching clutch C0 or switching brake B0, in the fixed-speed-ratio shifting state in which the transmission portion 11 is operable as a transmission the speed ration of which is held fixed, as well as in the continuously-variable shifting state in which the transmission portion 11 is operable as a continuously variable transmission, as described above. In the present transmission mechanism 10, therefore, a step-variable transmission is constituted by the transmission portion 20, and the continuously-variable transmission portion 11 which is placed in the fixed-speed-ratio shifting state by engagement of the switching clutch C0 or switching brake B0. Further, an electrically controlled continuously variable transmission is constituted by the transmission portion 20, and the continuously-variable transmission portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The continuously-variable transmission portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the transmission portion 20 connected in series to the continuously-variable transmission portion 11 functions as the step-variable transmission, whereby the speed of the rotary motion transmitted to the transmission portion 20 placed in one of the first through fourth gear positions, namely, the rotating speed of the power transmitting member 18 is continuously changed, so that the speed ratio of the drive system when the transmission portion 20 is placed in one of those gear positions is continuously variable over a predetermined range. Accordingly, the speed ratio γT determined by the continuously-variable transmission portion 11 and the step-variable transmission portion 20, that is, the overall speed ratio (hereinafter referred to as "total speed ratio") γT of the transmission mechanism 10 determined by the speed ratio $\gamma 0$ of the continuously-variable transmission portion 11 and the speed ratio $\gamma$ of the step-variable transmission portion 20 is continuously variable across the adjacent gear positions.

Figure 3:
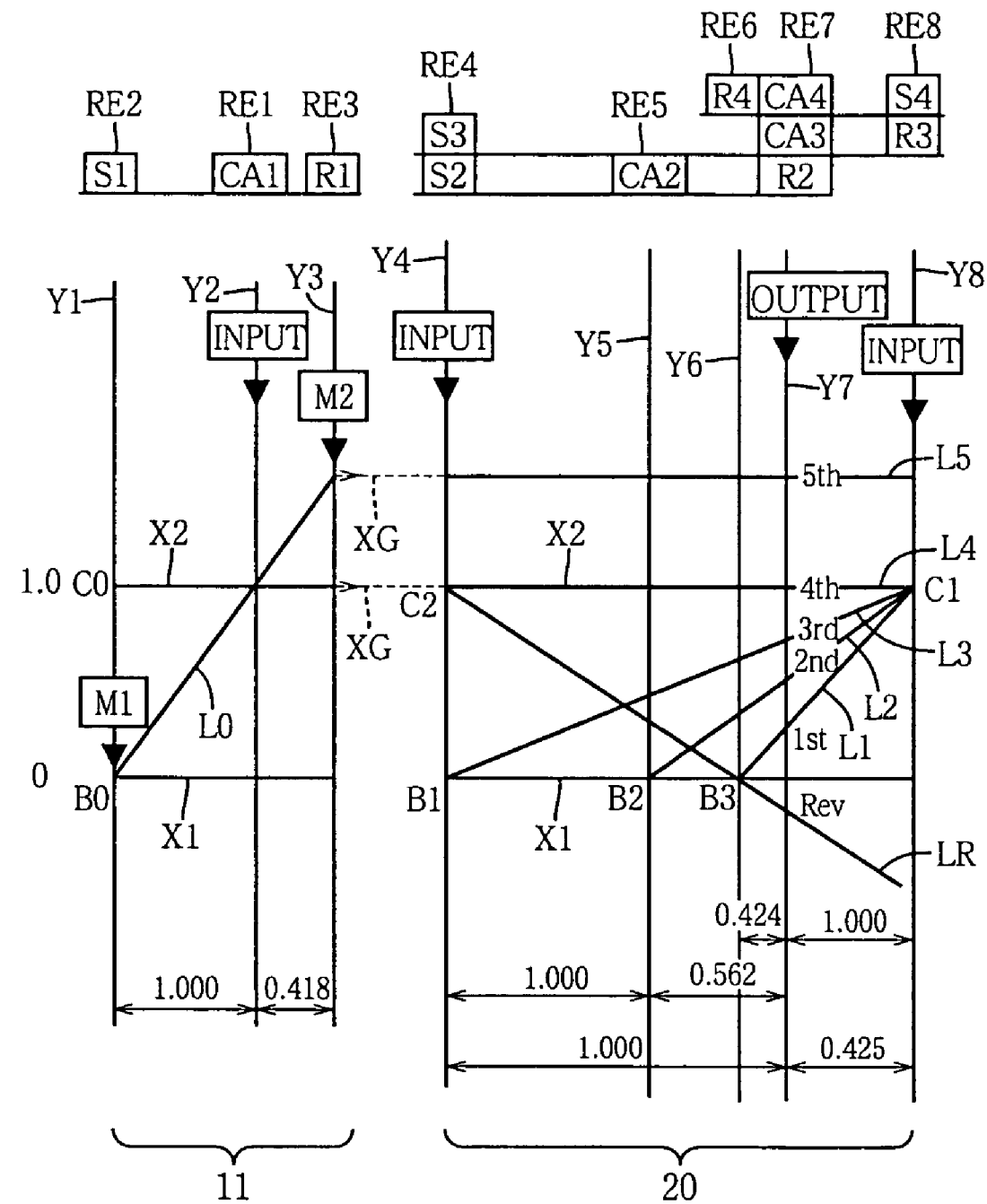
FIG. 3 is a collinear chart indicating relative rotating speeds of the hybrid vehicle drive system of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the continuously-variable transmission portion 11 functioning as the continuously-variable shifting portion or first shifting portion, and the step-variable transmission portion 20 functioning as the step-variable shifting portion (automatic transmission portion) or second shifting portion. The collinear chart of FIG. 3 is a rectangular two-dimensional coordinate system in which the gear ratios $\rho$ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the continuously-variable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio $\rho 1$ of the first planetary gear set 24. That is, the distance between the vertical lines Y1 and Y2 corresponds to "1", while the distance between the vertical lines Y2 and Y3 corresponds to the gear ratio $\rho 1$. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios $\rho 2$, $\rho 3$ and $\rho 4$ of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio $\rho$. In the continuously-variable transmission portion 11, the distance between the vertical lines Y1 and Y2 corresponds to "1", while the distance between the vertical lines Y2 and Y3 corresponds to the gear ratio $\rho$. In the step-variable transmission portion 30, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio $\rho$.

Referring to the collinear chart of FIG. 3, the power distributing mechanism 11 (continuously-variable transmission portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the step-variable transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the power distributing mechanism 16 is placed in the first non-differential state in which the above-indicated three rotary elements are rotated as a unit, so that the line L0 is aligned with the horizontal line X2, so that the power transmitting member 18 is rotated at a speed equal to the engine speed $N_E$. When the switching brake B0 is engaged, on the other hand, the rotation of the first sun gear S1 is stopped, and the power distributing mechanism 16 is placed in the second non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the transmission portion 20.

In the step-variable transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the step-variable transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the continuously-variable transmission portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
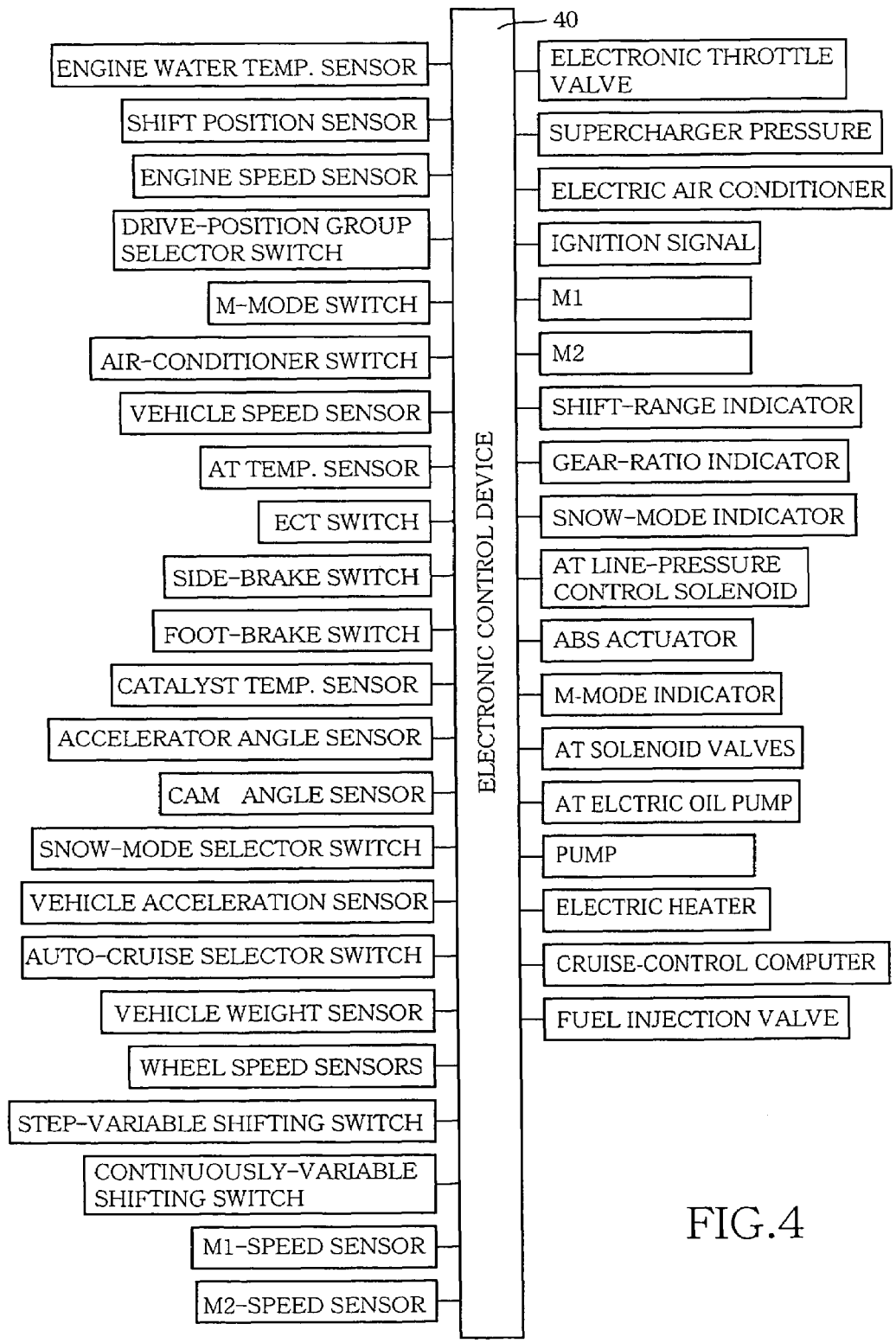
FIG. 4 is a view indicating input and output signals of the electronic control device provided to control the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive, from various sensors and switches shown in FIG. 4, various signals such as: a signal indicative of a temperature $TEMP_W$ of cooling water of the engine; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the step-variable transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the continuously-variable transmission portion 11 (power distributing mechanism 16) in the fixed-speed-ratio shifting state (non-differential state) in which the transmission mechanism 10 functions as a step-variable transmission; a signal indicative of a continuously-variable shifting switch provided to place the continuously-variable transmission portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$); and a signal indicative of a rotating speed $N_{M2}$ of the second electric motor M2 (hereinafter referred to as "second electric motor speed $N_{M2}$).

The electronic control device 40 is further arranged to generate various signals such as: a signal to drive an electronic throttle actuator 94 for controlling an angle of opening $\theta_{TH}$ of a throttle valve; a signal to control an amount of supply of a fuel by a fuel injection device 96 to the engine 8; a signal to adjust a pressure of a supercharger; a signal to operate the electric air conditioner; a signal for controlling an ignition timing of the engine 8 by an ignition device 98; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the continuously-variable transmission portion 11 and step-variable transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram of FIG. 5 for explaining major control functions of the electronic control device 40. Step-variable shifting control means 54 shown in FIG. 5 is arranged to determine whether a shifting action of the step-variable transmission portion 20 should take place, that is, to determine the gear position to which the transmission portion 20 should be shifted. This determination is made on the basis of a condition of the vehicle in the form of the vehicle speed V and an output torque $T_{OUT}$ of the step-variable transmission portion 20, and according to a shifting boundary line map (shifting control map or relation) which is stored in memory means 56 and which is indicated by solid lines in FIG. 5 and shift-down boundary lines indicated by one-dot chain lines in FIG. 5. The step-variable shifting control means 54 generates commands (shifting commands) to be applied to the hydraulic control unit 42, to selectively engage and release the hydraulically operated frictional coupling devices (except the switching clutch C0 and brake B0), for establishing the determined gear position according to the table of FIG. 2.

Hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the continuously-variable transmission portion 11 operating as the electrically controlled continuously variable transmission, while the transmission mechanism 10 is placed in the continuously-variable shifting state, that is, while the continuously-variable transmission portion 11 is placed in the differential state. For instance, the hybrid control means 52 calculates a target (required) vehicle output at the present running speed of the vehicle, on the basis of the operating amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque of the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the step-variable transmission portion 20, so as to improve the drivability of the vehicle and the fuel economy of the engine 8. In the hybrid control, the continuously-variable transmission portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio γT of the transmission mechanism 10, so that the engine 8 is operated according to a stored highest-fuel-economy curve (fuel-economy map or relation). The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio γ0 of the continuously-variable transmission portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

When the shifting operation of the step-variable transmission portion 20 is controlled by the step-variable shifting control means 54, in particular, the total speed ratio γT of the transmission mechanism 10 is changed in steps before and after the speed ratio of the step-variable transmission portion 20 is changed in steps. When the total speed ratio γT is changed in steps, that is, non-continuously, the drive torque can be changed more rapidly than when the total speed ratio γT is changed continuously, but there is a possibility of a shifting shock, or a deterioration of the fuel economy due to a failure to control the engine speed $N_E$ along the highest-fuel-economy curve.

In view of the above-described possibility, the hybrid control means 52 is arranged to control the shifting operation of the continuously-variable transmission portion 11 in synchronization with the shifting operation of the step-variable transmission portion 20, such that the speed ratio of the continuously-variable transmission portion 11 changes in a direction opposite to the direction in which the speed ratio of the step-variable transmission portion 20 is changed. In other words, the hybrid control means 52 implements the shifting control of the continuously-variable transmission portion 11 in synchronization with the shifting control of the step-variable transmission portion 20, so that the total speed ratio γT of the transmission mechanism 10 is changed continuously before and after a shifting action of the step-variable transmission portion 20. For example, the hybrid control means 52 is arranged to implement the shifting control of the continuously-variable transmission portion 11 in synchronization with the shifting control of the step-variable transmission portion 20, such that the speed ratio of the transmission portion 11 is changed by an amount of stepping change of the speed ratio of the transmission portion 20, in the direction opposite to the direction of the stepping change of the speed ratio of the transmission portion 20, for preventing a transient change of the total speed ratio γT of the transmission mechanism 10 before and after the shifting action of the step-variable transmission portion 20.

Figure 7:
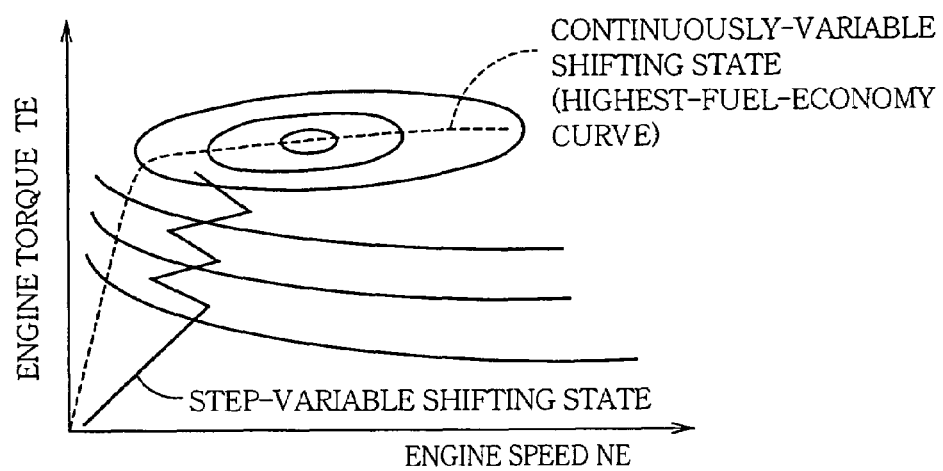
FIG. 7 is a view illustrating an example of a fuel consumption map defining a highest-fuel-economy curve of an engine, and explaining a difference between an operation of the engine in a continuously-variable shifting state (indicated by broken line) and an operation of the engine in a step-variable shifting state (indicated by one-dot chain line)

Described in another way, the engine 8 is generally operated as indicated by one-dot chain line in FIG. 7 when the engine 8 is operatively connected to a step-variable transmission, and operated along the highest-fuel-economy curve indicated by broken line in FIG. 7, or along a curve comparatively closer to the highest-fuel-economy curve, when the engine 8 is operatively connected to a continuously variable transmission. When the engine 8 is connected to the continuously variable transmission, therefore, the engine torque $T_E$ for obtaining the required vehicle drive torque (drive force) can be realized at the engine speed $N_E$ closer to the highest-fuel-economy curve than when the engine 8 is connected to the step-variable transmission. Accordingly, the fuel economy is improved with the continuously variable transmission than with the step-variable transmission. In view of this, the hybrid control means 52 is arranged to control the speed ratio γ0 of the continuously-variable transmission portion 11 so that the engine 8 is operated along the highest-fuel-economy curve indicated by the broken line in FIG. 7, for preventing deterioration of the fuel economy when the speed ratio of the step-variable transmission portion 20 is changed in steps.

As described above, the hybrid control means 52 implements the shifting control of the continuously-variable transmission portion 11 in synchronization of the shifting control of the step-variable transmission portion 20, that is, implements a synchronous shifting control of the transmission portion 11. This synchronous shifting control of the continuously-variable transmission portion 11 is initiated when a response delay time has passed after the moment of determination by the step-variable shifting control means 54 that a shifting action of the step-variable transmission portion 20 should take place. The response delay time is a time from the above-indicated moment of determination to a moment at which the input speed of the transmission portion 20, that is, the rotating speed of the power transmitting member 18 (second electric motor M2) has changed as a result of engaging or releasing actions of the appropriate frictional coupling devices, namely, to a moment at which the transmission portion 20 has entered a so-called "inertial phase" in which the rotating speed of the power transmitting member 18 changes in the process of the shifting action of the transmission portion 20. The response delay time may be obtained by experimentation and stored in memory, or the hybrid control means 52 may be arranged to initiate the synchronous shifting control of the continuously-variable transmission portion 11 when an actual change of the speed of the power transmitting portion 18 has been detected. The synchronous shifting control of the continuously-variable transmission portion 11 is terminated at a moment when the inertial phase in the process of the shifting action of the transmission portion 20 is terminated. A synchronous control time up to this moment of termination may be obtained by experimentation and stored in memory, or the hybrid control means 52 may be arranged to terminate the synchronous shifting control of the transmission portion 11 when an actual change of the speed of the power transmitting member 18 has been zeroed. Thus, the hybrid control means 52 implements the above-described shifting control of the continuously-variable transmission portion 11 while the step-variable transmission portion 20 is in the inertial phase of its shifting process, such that the synchronous shifting control is continued for a predetermined period of time obtained by experimentation, or until the generated actual change of the speed of the power transmitting member 18 has been zeroed.

The hybrid control means 52 includes engine output control means functioning to control the engine 8 so as to provide a required output, by controlling the throttle actuator to open and close the electronic throttle valve 94, and controlling an amount and time of fuel injection by the fuel injection device 96 into the engine 8, and/or a timing of ignition of an igniter by the ignition device 98, alone or in combination. For instance, the hybrid control means 52 is basically arranged to control the throttle actuator on the basis of the operating amount $A_{CC}$ of the accelerator pedal and according to a predetermined stored relationship (not shown) between the operating amount $A_{CC}$ and an opening angle $\theta_{TH}$ of the throttle valve such that the opening angle $\theta_{TH}$ increases with an increase of the operating amount $A_{CC}$.

Figure 6:
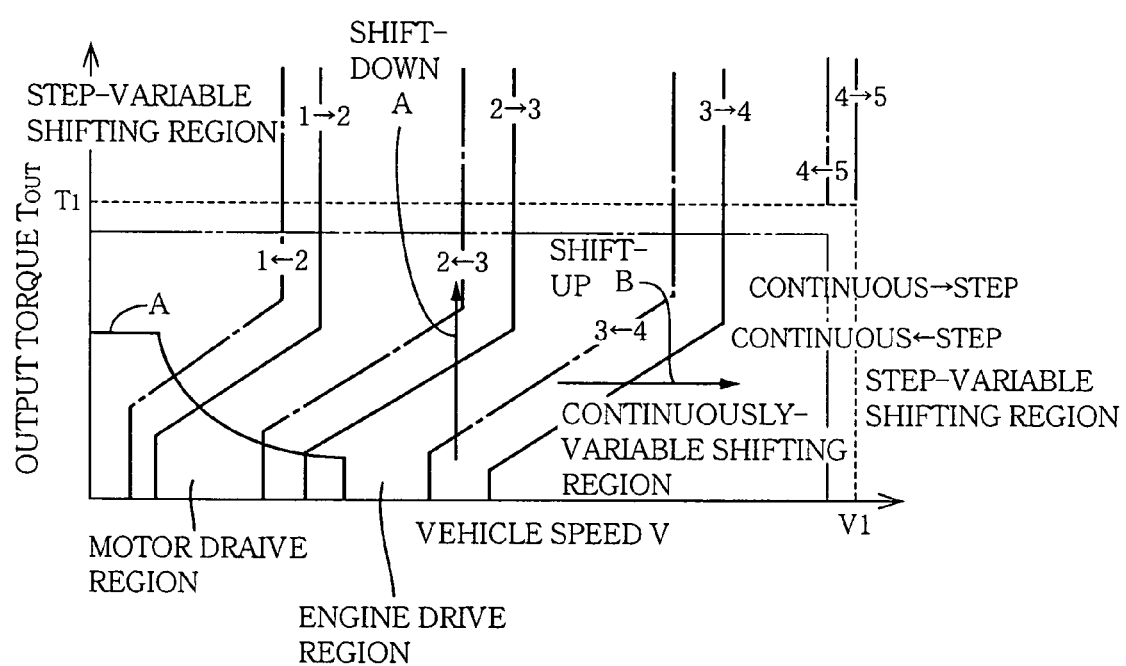
FIG. 6 is a view illustrating an example of a stored shifting boundary line map used for determining a shifting action of a step-variable transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode in which the vehicle is driven by the electric motor M2, by utilizing the electric CVT function of the continuously-variable transmission portion 11, irrespective of whether the engine 8 is in the non-operated state or in the idling state. Solid line A in FIG. 6 represents an example of a boundary line defining an engine-drive region and a motor-drive region for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6. The memory means 56 functions as shifting-map memory means and as drive-power-source-map memory means.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque T, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the differential function of the continuously-variable transmission portion 11, that is, by controlling the transmission portion 11 to perform its electric CVT function (differential function), so that the first electric motor is controlled, for example, freely rotated, so as to have a negative speed $N_{M1}$. A so-called "torque assist" to assist the engine 8 is possible by supplying an electric energy from the first electric motor M1 or the electric-energy storage device 60 to the second electric motor M2, so that the second electric motor M2 is operated to transmit a drive torque to the drive wheels 38. Thus, the electric motor may be used in addition to the engine, in the engine-drive mode.

The hybrid control means 52 is arranged to hold the engine 8 in an operated state owing to the electric CVT function of the continuously-variable transmission portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where an electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to hold the engine speed $N_E$ constant or control the engine speed $N_E$ as desired, owing to the electric CVT function of the continuously-variable transmission portion 11, by controlling the operating speed $N_{M1}$ of the first electric motor M1 and/or the operating speed $N_{M2}$ of the second electric motor M2, irrespective of whether the vehicle is stationary or running at a relatively low speed. In other words, the hybrid control means 52 is arranged to control the operating speed $N_{M1}$ of the first electric motor M1 or the operating speed $N_{M2}$ of the second electric motor M2, as desired, while holding the engine speed $N_E$ constant or controlling the engine speed $N_E$ as desired. To raise the engine speed $N_E$ during running of the vehicle, for example, the hybrid control means 52 raise the operating speed $N_{M2}$ of the first electric motor M12 while the operating speed $N_{M2}$ of the second electric motor M2 determined by the vehicle speed V (speed of the drive wheels 38) is held substantially constant, as is apparent from the collinear chart of FIG. 3.

The continuously-variable transmission portion 11 is switchable to the non-differential state (fixed-speed-ratio shifting state) in which the mechanical power transmitting path is established. In this non-differential state, it is not necessary to operate the first electric motor M1 as the electric generator to generate a reaction torque, so that a drive torque generated by the first electric motor M1 operated as the electric generator under the control of the hybrid control means 52 can be transmitted to the power transmitting member 18. Accordingly, the hybrid control means 52 may be arranged to operate the first electric motor M1 alone or together with the second electric motor M2, for controlling the engine speed NE, while the continuously-variable transmission portion 11 is placed in the step-variable shifting state (fixed-speed-ratio shifting state). In the step-variable shifting state of the continuously-variable transmission portion 11, however, the speed of the second rotary element RE2 (first sun gear S1) of the power distributing mechanism 16 is also influenced by the vehicle speed V, so that the rate of change of the engine speed $N_E$ is lower than in the continuously-variable shifting state of the transmission portion 11. In the non-differential state of the continuously-variable transmission portion 11 established by the engaging action of the switching brake B0, the first electric motor M1 is fixed to the casing 12 and is not rotatable to control the engine speed $N_E$.

High-speed-gear determining means 62 is arranged to determine whether the gear position to which the transmission mechanism 10 should be shifted on the vehicle condition and according to the shifting boundary line map stored in the memory means 56 and indicated in FIG. 6 by way of example is a high-speed-gear position, for example, the fifth gear position. This determination is made to determine which one of the switching clutch C0 and brake B0 should be engaged to place the transmission mechanism 10 in the step-variable shifting state.

Switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (continuously-variable transmission portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously variable shifting region for placing the transmission mechanism 10 in the continuously-variable shifting state, or in the step-variable shifting region for placing the transmission mechanism 10 in the step-variable shifting state.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the step-variable transmission portion 20. In the step-variable shifting state, the transmission mechanism 10 as a whole constituted by the continuously-variable transmission portion 11 and the step-variable transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the continuously-variable transmission portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the continuously-variable transmission portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the continuously-variable transmission portion 11 operable as the auxiliary transmission is placed in a selected one of two gear positions under the control of the switching control means 50 while the step-variable transmission portion 20 connected in series to the continuously-variable transmission portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the continuously-variable transmission portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the step-variable transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the continuously-variable transmission portion 11 switched to the continuously-variable shifting state under the control of the switching control means 50 functions as the continuously variable transmission while the step-variable transmission portion 20 connected in series to the continuously-variable transmission portion 11 functions as the step-variable transmission, so that the transmission mechanism 10 provides a sufficient vehicle drive force, such that the speed of the rotary motion transmitted to the transmission portion 20 placed in one of the first through fourth gear positions, namely, the rotating speed of the power transmitting member 18 is continuously changed, so that the speed ratio of the transmission mechanism 10 when the transmission portion 20 is placed in one of those gear positions is continuously variable over a predetermined range. Accordingly, the speed ratio of the transmission portion 20 is continuously variable across the adjacent gear positions, whereby the total speed ratio $\gamma T$ of the transmission mechanism 10 is continuously variable.

Differential-state determining means 80 is arranged to determine whether the power distributing mechanism 16 is placed in the differential state, that is, whether the continuously-variable transmission portion 11 is placed in the continuously-variable shifting state. This determination is made when it is determined that the step-variable transmission portion 20 should be shifted, for example, when the step-variable shifting control means 54 has determined the gear position to which the step-variable transmission portion 20 should be shifted, on the basis of the vehicle condition and according to the shifting boundary line map of FIG. 6. For instance, the differential-state determining means 80 makes the determination as to whether the continuously-variable transmission portion 11 is in the continuously-variable shifting state or not, depending upon the determination by the switching control means 50 as to whether the vehicle condition represented by the vehicle speed V and the output torque $T_{OUT}$ is in the step-variable shifting region for placing the transmission mechanism 10 in the step-variable shifting state, or in the continuously-variable shifting region for placing the transmission mechanism 10 in the continuously-variable shifting state, according to the switching boundary line map indicated in FIG. 6 by way of example.

The differential-state determining means 80 is provided to determine that the continuously-variable transmission portion 11 is placed in the differential state, so that the shifting control of the continuously-variable transmission portion 11 is implemented in synchronization with the shifting control of the step-variable transmission portion 20, to reduce an amount of stepping change of the total speed ratio $\gamma T$ of the transmission mechanism 10 due to a shifting action of the step-variable transmission portion 20 while the continuously-variable transmission portion 11 is placed in the differential state.

Torque-reduction control means 82 is arranged to reduce a torque to be transmitted to the drive wheels 38. For example, the torque-reduction control means 82 reduces an input torque $T_{IN}$ of the step-variable transmission portion 20 to reduce the torque to be transmitted to the drive wheels 38, by implementing an engine-torque reducing control of reducing the engine torque $T_E$ by reducing the angle of opening of the electronic throttle valve 94 or the amount of fuel supply by the fuel injection device 96, or retarding the timing of ignition of the engine 8 by the ignition device 98. The torque-reduction control means 82 is further arranged to reduce the input torque $T_{IN}$, by implementing an electric-motor-torque reducing control in place of or in addition to the engine-torque reducing control. In the electric-motor-torque reducing control, the second electric motor M2 is controlled through the inverter 58, so as to temporarily generate a reverse vehicle driving torque, or a regenerative braking torque while charging the electric-energy storage device 60.

Where the step-variable transmission portion 20 is shifted up under the control of the step-variable shifting control means 54 while the transmission mechanism 10 as a whole placed in the step-variable shifting state under the control of the switching control means is functioning as the step-variable automatic transmission, there is a possibility that the transmission portion 20 suffers from a shifting shock due to a so-called. "inertial torque" which increases the input torque $T_{IN}$ and consequently the output torque $T_{OUT}$ and which is generated by an energy temporarily generated by the engine 8 due to a drop of the engine speed $N_E$ in the inertial phase in the process of the shift-up action of the step-variable transmission portion 20 which involves a change of the input speed of the transmission portion 20 or the speed of the power transmitting member 18.

If the step-variable transmission portion 20 is shifted under the control of the step-variable shifting control means 54 while the transmission mechanism 10 as a whole placed in the continuously-variable shifting state under the control of the switching control means 50, the shifting control of the continuously-variable transmission portion 11 is implemented under the control of the hybrid control means 52, to prevent a change of the total speed ratio $\gamma T$ of the transmission mechanism 10 before and after the shifting action of the transmission portion 20, or to reduce the amount of change of the total speed ratio $\gamma T$ for assuring a continuous change of the total speed ratio $\gamma T$, for thereby preventing or reducing a change of the engine speed $N_E$ in the process of the shifting action of the transmission portion 20. However, this shifting action of the step-variable transmission portion 20 also has the so-called inertial phase which involves a change of the input speed of the transmission portion 20 or the speed of the power transmitting member 18, and an inertial torque which increases the output torque $T_{OUT}$ and which is generated due to a speed drop of at least one of the fourth through eighth rotary elements RE4-RE8 of the step-variable transmission portion 20. In this case, too, there is a possibility that the transmission portion 20 suffers from a shifting shock due to the inertial torque.

Like the step-variable transmission portion 20, the continuously-variable transmission portion 11 may suffer from a shifting shock due to an inertial torque which increases the output torque $T_{OUT}$ and which is generated due to a speed drop of the second and/or third rotary element RE2, RE3 of the transmission portion 11 in the inertial phase in the process of the shifting action of the transmission portion 20.

In view of the above-described possibilities, the torque-reduction control means 82 is provided to reduce the input torque $T_{IN}$ of the step-variable transmission portion 20 during its shifting action under the control of the step-variable shifting control means 54. Described more specifically, the torque-reduction control means 82 is arranged to reduce the input torque $T_{IN}$ of the step-variable transmission portion 20 by an amount corresponding to the above-described inertial torque, for reducing the shifting shock due to the inertial torque, by implementing one or both of the above-described engine-torque reducing control and electric-motor-torque reducing control. The reduction of the input torque $T_{IN}$ by the torque-reducing control means 82 is effected in the inertial phase of the shifting action of the step-variable transmission portion 20, like the synchronous shifting control of the continuously-variable transmission portion 11 by the hybrid control means 52. Alternatively, the torque-reduction control means 82 is arranged to reduce the input torque $T_{IN}$ of the step-variable transmission portion 20, so as to reduce an amount of an oscillatory change of the torque upon completion of the engaging actions of the appropriate frictional coupling devices engaged to shift the transmission portion 20 under the control of the step-variable shifting control means 54, for thereby reducing an engaging shock of the frictional coupling devices.

The maps of FIG. 6 will be described in detail. The shifting boundary line map (shifting control map or relation) shown in FIG. 6 by way of example and stored in the memory means 56 is used for determining whether the step-variable transmission portion 20 should be shifted, is defined by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the step-variable transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state, when the actual vehicle speed V has exceeded the upper limit V1, or when the output torque $T_{OUT}$ of the step-variable transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the continuously-variable transmission portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the step-variable transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
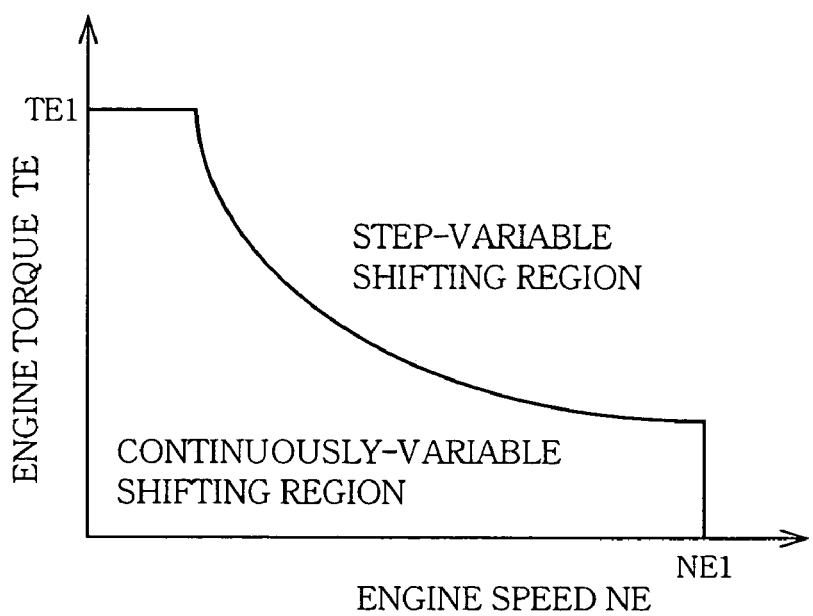
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.
Figure 9:
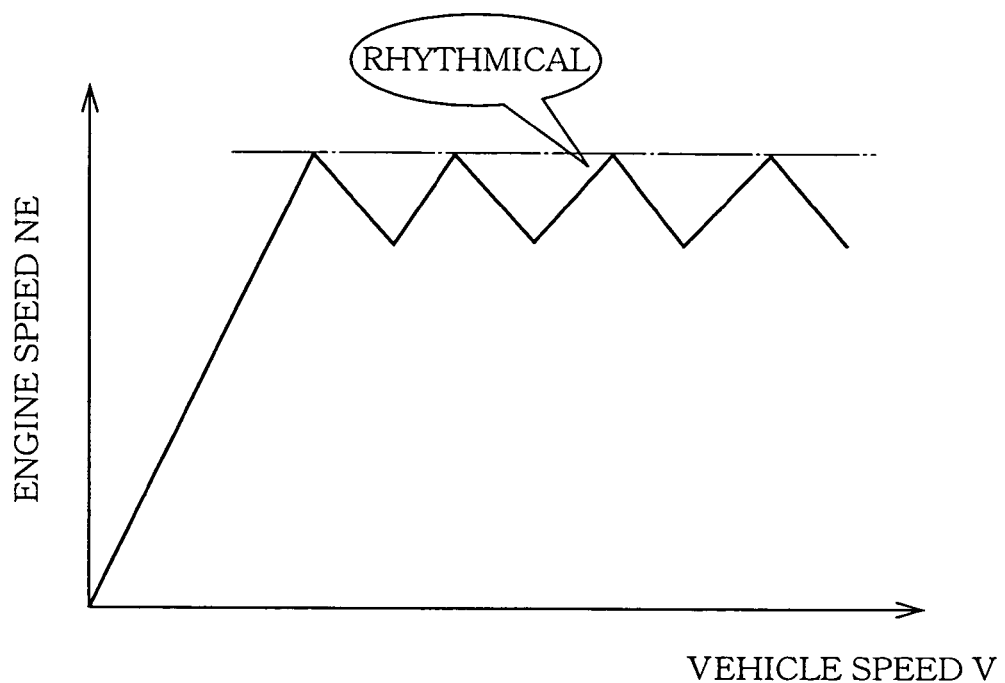
FIG. 9 is a view indicating an example of a change of the engine speed as a result of a shift-up action of the step-variable transmission.

Referring to FIG. 8, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the continuously-variable transmission portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the continuously-variable transmission portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

In the high-output running state of the vehicle in which the vehicle operator has a stronger desire for improved drivability of the vehicle rather than improved fuel economy, the transmission mechanism 10 is placed in the step-variable shifting state (fixed-speed-ratio shifting state), rather than in the continuously-variable shifting state, so that the engine speed $N_E$ changes with a shift-up action of the step-variable transmission portion 20, assuring a comfortable rhythmic change of the engine speed $N_E$ as the transmission portion 20 is shifted up, as indicated in FIG. 8.

Figure 10:
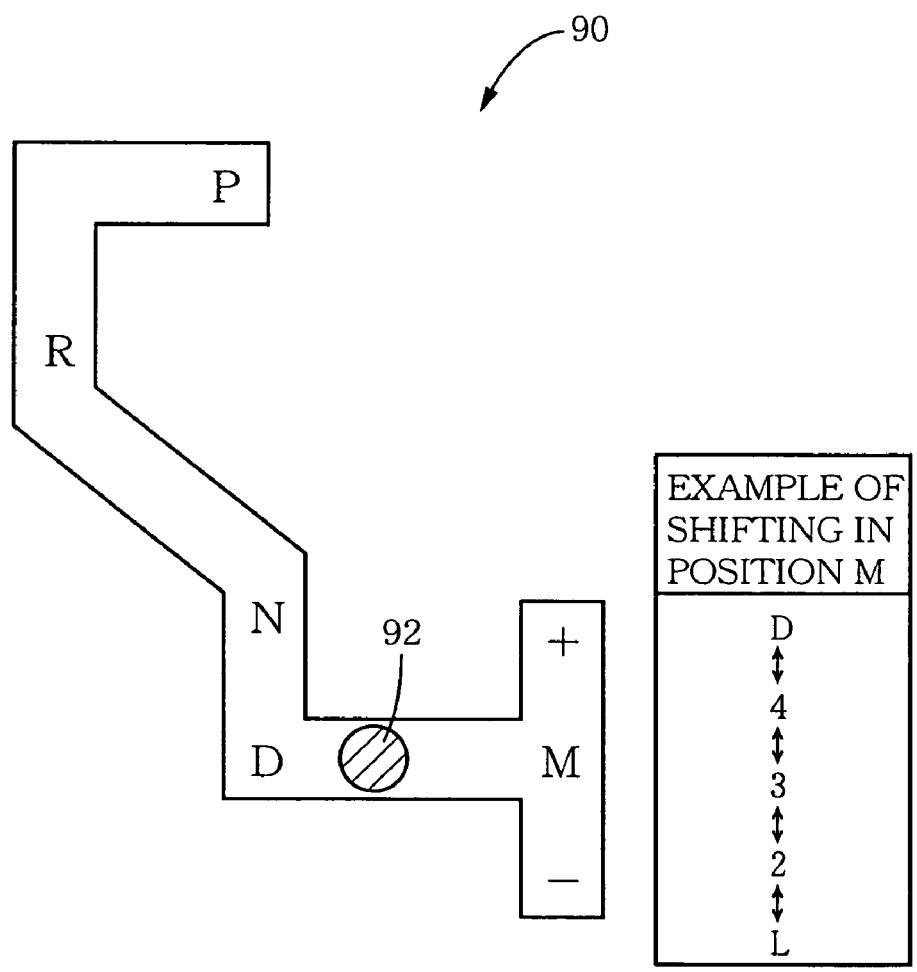
FIG. 10 is a view indicating an example of a shifting device which is provided with a shift lever and which is operated to select one of a plurality of shift positions.

FIG. 10 shows an example of a manually operable shifting device in the form of a shifting device 90 which is manually operated to select one of a plurality of shift positions. This shifting device 90 includes a shift lever 92 which is disposed laterally adjacent to the vehicle operator's seat and which is operated to select one of the shift positions consisting of a parking position P for placing the transmission mechanism 10 (namely, step-variable transmission portion 20) in a neutral state in which a power transmitting path is disconnected with both of the switching clutch C0 and brake B0 placed in the released state, and at the same time the output shaft 22 of the transmission portion 20 is in the locked state; a reverse-drive position R for driving the vehicle in the rearward direction; a neutral position N for placing the transmission mechanism 10 in the neutral state in which the power transmitting path within the transmission mechanism 10 is disconnected; an automatic forward-drive shifting position D; and a manual forward-drive shifting position M.

For example, the shift lever 92 is mechanically connected to a manual valve incorporated in the hydraulic control unit 42, such that the manual valve is operated in response to a manual operation of the shift lever 92 to a selected one of the shift positions, so that the hydraulic control unit 42 is mechanically operated to establish the corresponding rear-drive position R, neutral position N or forward-drive shifting position D, according to the table of engagement of the frictional coupling devices. In the forward-drive shifting position D or M, the first gear position "$1^{st}$" through the fifth gear position "$5^{th}$" are established by electrically controlling solenoid-operated valves incorporated within the hydraulic control unit 42.

The parking position P and the neutral position N are non-driving positions which are selected when the vehicle is not driven and in which the power transmitting path within the step-variable transmission portion 20 is in a power disconnecting state with the first and second clutches C1, C2 being both held in the released state, as indicated in the table of FIG. 2. The reverse-drive position R, and the automatic and manual forward-drive shifting positions D, M are driving positions which are selected when the vehicle is driven and in which the power transmitting path within the transmission portion 20 is in a power transmitting state with at least one of the first and second clutches C1, C2 being placed in the engaged state, as indicated in the table of FIG. 2.

Described in detail, when the shift lever 92 is manually operated from the parking position P or neutral position N to the reverse-drive position R, the second clutch C2 is engaged to switch the power transmitting path within the transmission portion 20 from the power disconnecting state to the power transmitting state. When the shift lever 92 is manually operated from the neutral position N to the automatic forward-drive shifting position D, at least the first clutch C1 is engaged to switch the power transmitting path within the transmission portion 20 from the power disconnecting state to the power transmitting state. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 92 is operated to the manual forward-drive shifting position M, for manually selecting one of the positions "D" through "L". Described in detail, the shift lever 92 is movable from the manual forward-drive shifting position M to a shift-up position "+" and a shift-down position "−", which are spaced from each other in the longitudinal direction of the vehicle. Each time the shift lever 92 is moved to the shift-up position or the shift-down position "−", the presently selected position is changed by one position. The five positions "D" through "L" have respective different lower limits of a range in which the overall speed ratio γT of the transmission mechanism 10 is aut6omatically variable, that is, respective different lowest values of the overall speed ratio γT which corresponds to the highest output speed of the transmission mechanism 10. Namely, the five positions "D" through "L" select respective different numbers of the speed positions or gear positions of the step-variable transmission portion 20 which are automatically selectable, so that the lowest overall speed ratio γT available is determined by the selected number of the selectable gear positions. The shift lever 48 is biased by biasing means such as a spring so that the shift lever 92 is automatically returned from the shift-up position "+" and shift-down position "−" back to the manual forward-drive shifting position M. The shifting device 90 is provided with shift-position sensors operable to detect the presently selected position of the shift lever 92, so that signals indicative of the presently selected operating position $P_{SH}$ of the shift lever 48 and the number of shifting operations of the shift lever 92 in the manual forward-shifting position M are supplied to the electronic control device 40.

When the shift lever 92 is operated to the automatic forward-drive shifting position D, for example, the switching control means 50 implements an automatic switching control of the transmission mechanism 10 according to the stored switching boundary line map shown in FIG. 6, and the hybrid control means 52 implements the continuously-variable shifting control of the power distributing mechanism 16, while the step-variable shifting control means 54 implements an automatic shifting control of the step-variable transmission portion 20. When the transmission mechanism 10 is placed in the step-variable shifting state, for example, the shifting action of the transmission mechanism 10 is automatically controlled to select an appropriate one of the first-gear position through the fifth-gear position indicated in FIG. 2. When the transmission mechanism 10 is placed in the continuously-variable shifting state, the speed ratio of the power distributing mechanism 16 is continuously changed, while the shifting action of the step-variable transmission portion 20 is automatically controlled to select an appropriate one of the first-gear through fourth-gear positions, so that the total speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 92 is operated to the manual forward-drive shifting position M, on the other hand, the shifting action of the transmission mechanism 10 is automatically controlled by the switching control means 50, hybrid control means 52 and step-variable shifting control means 54, such that the total speed ratio γT is variable within a predetermined range the lower limit of which is determined by the gear position having the lowest speed ratio, which gear position is determined by the manually selected one of the positions "D" through "L". When the transmission mechanism 10 is placed in the step-variable shifting state, for example, the shifting action of the transmission mechanism 10 is automatically controlled within the above-indicated predetermined range of the total speed ratio γT. When the transmission mechanism 10 is placed in the continuously-variable shifting state, the speed ratio of the power distributing mechanism 16 is continuously changed, while the shifting action of the step-variable transmission portion 20 is automatically controlled to select an appropriate one of the gear positions the number of which is determined by the manually selected one of the positions "D" through "L", so that the total speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

Figure 11:
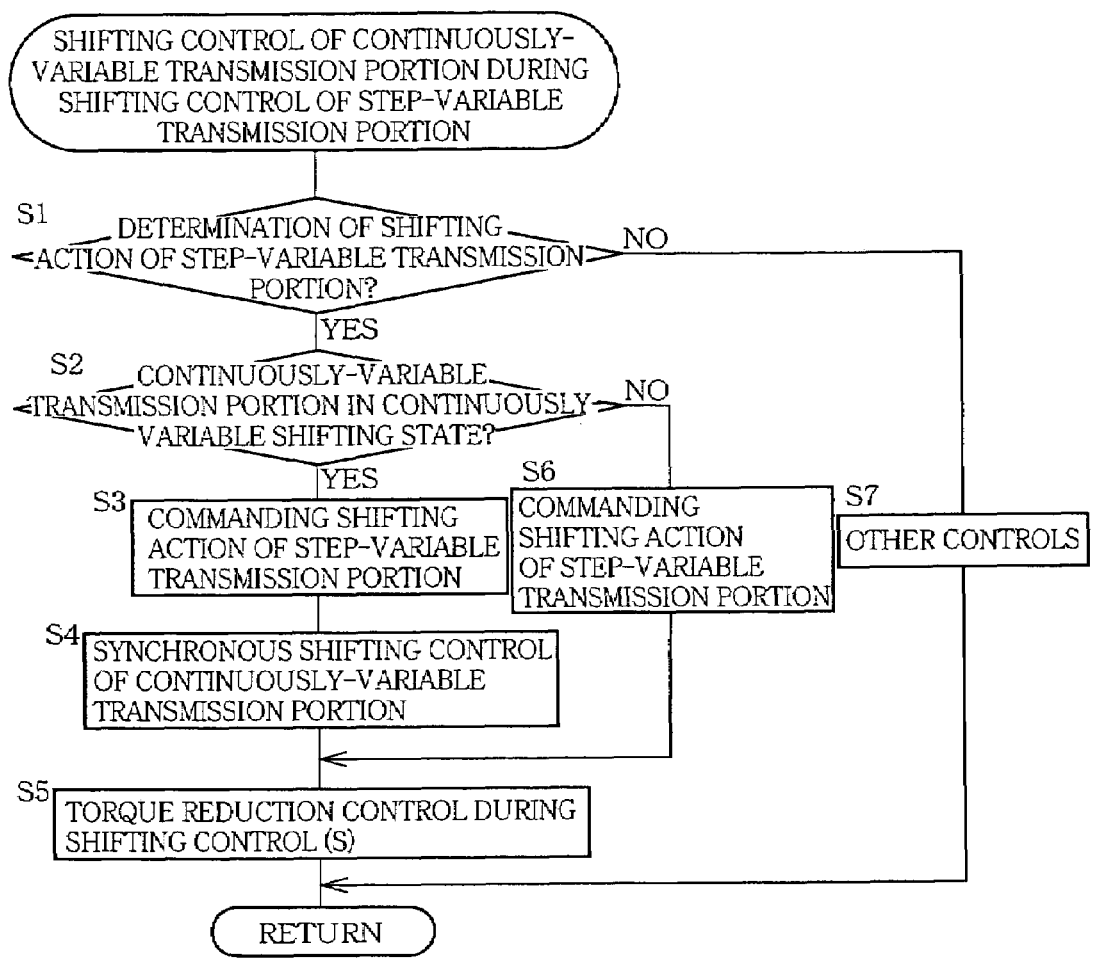
FIG. 11 is a flow chart illustrating a control operation of an electronic control device of FIG. 5, that is, a shifting control operation of a continuously-variable transmission portion during a shifting control of the step-variable transmission portion.
Figure 12:
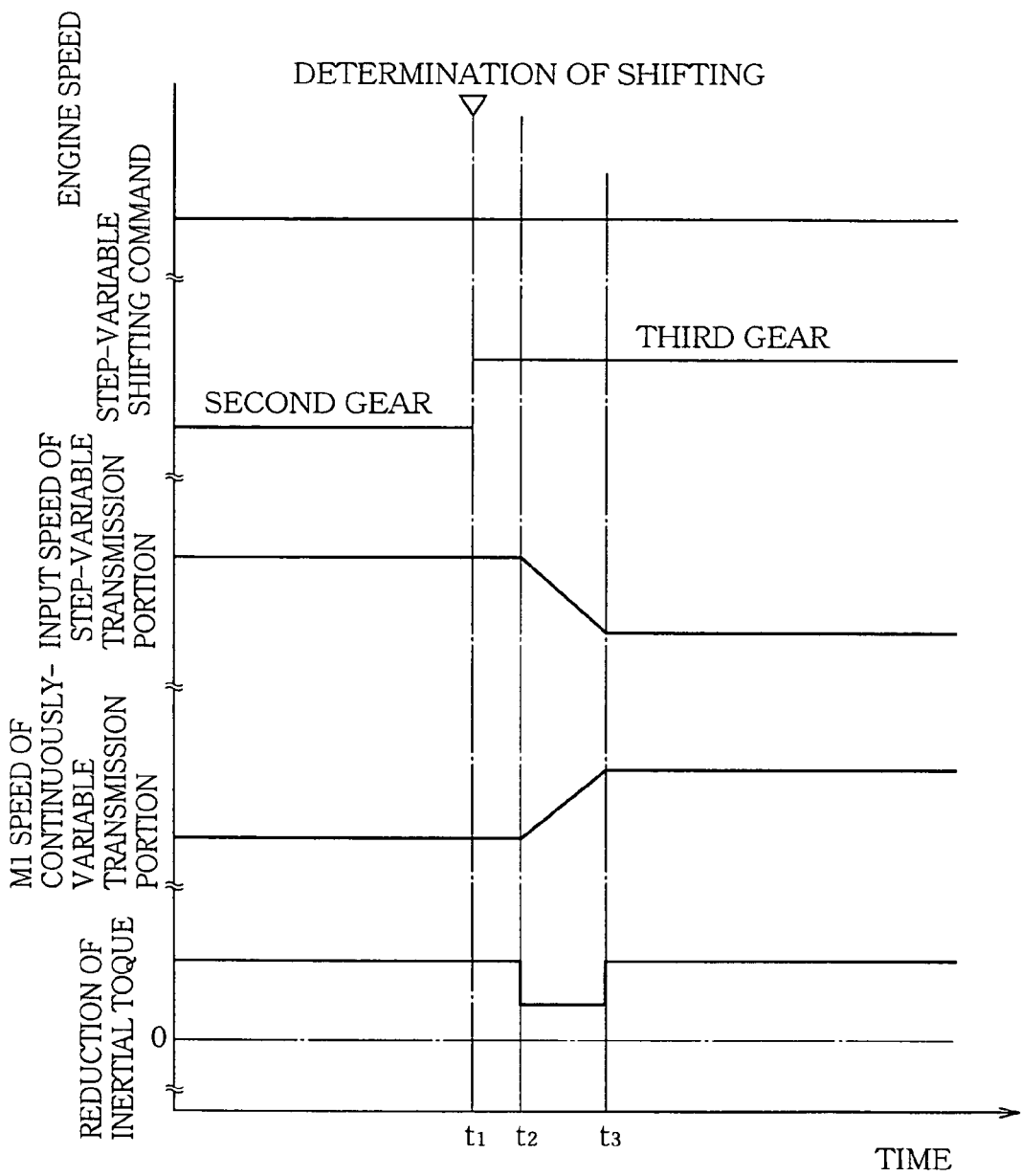
FIG. 12 is a time chart indicating the control operation of FIG. 11, when the step-variable transmission portion is shifted up from a second gear position to a third gear position in the continuously-variable shifting state of the transmission mechanism.

The flow chart of FIG. 11 illustrates a major control operation performed by the electronic control device 40, that is, a shifting control routine for controlling the shifting operation of the continuously-variable transmission portion 11 during a shifting control of the step-variable transmission portion 20. This shifting control routine is repeatedly executed with a short cycle time of about several microseconds to several tends of microseconds, for example. The time chart of FIG. 12 shows the control operation when the step-variable transmission portion 20 is shifted up from the second gear position to the third gear position while the transmission mechanism 10 is placed in the continuously-variable shifting state.

The shifting control routine is initiated with step S1 ("step" being omitted hereinafter) corresponding to the step-variable shifting control means 54, to determine whether a shifting action of the step-variable transmission portion 20 should take place. This determination is made by determining whether one of the gear positions to which the transmission portion 20 should be shifted is determined on the basis of the vehicle condition represented by the vehicle speed V and the output torque $T_{OUT}$ of the transmission portion 20, and according to the shifting boundary line map shown in FIG. 6 by way of example. In the example shown in FIG. 12, a determination that a shift-up action of the transmission portion 20 from the second gear position to the third gear position should take place is made at a point of time t1.

When an affirmative decision is obtained in S1, the control flow goes to S2 corresponding to the differential-state determining means 80, to determine whether the power distributing mechanism 16 is placed in the differential state, that is, whether the continuously-variable transmission portion 11 is placed in the continuously-variable shifting state. This determination is made depending upon whether the vehicle condition is in the continuously-variable shifting region which is defined by the shifting boundary line map shown in FIG. 6 by way of example and in which the transmission mechanism 10 should be placed in the continuously-variable shifting state.

If a negative decision is obtained in S2, the control flow goes to S6 corresponding to the step-variable shifting control means 54, to implement the shifting control for effecting the shifting action of the step-variable transmission portion 20 determined in S1. If an affirmative decision is obtained in S2, the control flow goes to S3 corresponding to the step-variable shifting control means 54, to implement the shifting control for effecting the shifting action of the transmission portion 20 determined in S1, and then to S4 corresponding to the hybrid control means 52, to implement the shifting control of the continuously-variable transmission portion 11 in synchronization with the shifting control of the step-variable transmission portion 20 in S3, such that the speed ratio of the transmission portion 11 is changed in the direction opposite to the direction of change of the speed ratio of the transmission portion 20 (during a time period from the point of time t1 to a point of time t3 indicated in FIG. 12). For example, the speed ratio of the continuously-variable transmission portion 11 is changed in steps in the direction opposite to the direction of stepping change of the speed ratio of the step-variable transmission portion 20, by an amount corresponding to the amount of this stepping change of the speed ratio of the transmission portion 20, in synchronization with the shifting control of the transmission portion in S3, for preventing a transient change of the total speed ratio γT of the transmission mechanism 10 before and after the shifting action of the transmission portion 20.

During the shifting controls in S3 and S4 or the shifting control in S6, a torque reduction control to reduce the input torque $T_{IN}$ of the step-variable transmission portion 20 is implemented in step S5 corresponding to the torque-reduction control means 82 (during a time period from the point of time t2 to the point of time t3 indicated in FIG. 12). During the shifting controls in S3 and S4, for example, the engine speed $N_E$ does not change as indicated in FIG. 12, but an inertial torque is generated to increase the output torque $T_{OUT}$ as a result of a speed drop of the rotary element(s) of the step-variable transmission portion 20 and a speed drop of the rotary element(s) of the step-variable transmission portion 11. During the shifting control in S6, an inertial torque is generated to increase the output torque $T_{OUT}$ as a result of a drop of the engine speed $N_E$. In view of the generation of the inertial torque described above, the input torque $T_{IN}$ is reduced in S5 by implementing the engine-torque reducing control to reduce the engine torque $T_E$, or the electric-motor-torque reducing control using the second electric motor M2, for reducing the amount of increase of the output torque $T_{OUT}$ due to the inertial torque generated.

If a negative decision is obtained in S1, the control flow goes to S7 to implement various controls by various control means of the electronic control device 40, other than the shifting control of the step-variable transmission portion 20, or to terminate one cycle of execution of the present shifting control routine. When the transmission mechanism 10 is placed in the continuously-variable shifting state, for example, the hybrid control means 52 implements the shifting control of the continuously-variable transmission portion 11 on the basis of the vehicle condition.

As described above, the present embodiment is arranged such that the speed ratio of the continuously-variable transmission portion 11 is changed under the control of the hybrid control means 52 (continuously-variable shifting control means) to reduce the amount of stepping change of the speed ratio of the step-variable transmission portion 20 during its shifting control, so that the total speed ratio (overall speed ratio) γT of the transmission mechanism 10 (drive system) determined by the speed ratio of the transmission portion 11 and the speed ratio of the transmission portion 20 is continuously varied. This arrangement reduces the amount of stepping change of the engine speed $N_E$ before and after the step-variable transmission portion 20, thereby reducing its shifting shock. Further, the present arrangement permits the transmission mechanism 10 as a whole to function as a continuously variable transmission, leading to an improvement of the fuel economy.

Further, the shifting control of the continuously-variable transmission portion 11 is implemented under the control of the hybrid control means 52, in the inertial phase of the shifting action of the step-variable transmission portion 20. That is, the shifting control of the transmission portion 11 is implemented in synchronization with the shifting control of the transmission portion 20. In addition, the shifting control of the continuously-variable transmission portion 11 is implemented to change the speed ratio of the transmission portion 11 by an amount corresponding to the amount of stepping change of the speed ratio of the step-variable transmission portion 20, in the direction opposite to the direction of the stepping change of the speed ratio of the transmission portion 20, for thereby reducing the amount of change of the total speed ratio γT of the transmission mechanism 10. Accordingly, the amount of change of the engine speed $N_E$ before and after the shifting action of the transmission portion 20 is reduced, so that the shifting shock is further reduced.

The present embodiment is further arranged such that the input torque $T_{IN}$ is reduced under the control of the torque-reduction control means 82, by an amount corresponding to the inertial torque generated due to a speed change of the rotary element(s) of the step-variable transmission portion 20 and the inertial torque generated due to a speed change of the rotary element(s) of the continuously-variable transmission portion 11, which inertial torques are generated during the shifting action of the transmission portion 20. Accordingly, the shifting shock is reduced.

The, other embodiments of the present invention will be described. In the following descriptions, the same reference as used in the preceding embodiment signs will be used to identify the corresponding elements.

Embodiment 2

In the preceding embodiment, the hybrid control means 52 is arranged to implement the shifting control of the continuously-variable transmission portion 11 in synchronization with the shifting control of the step-variable transmission portion 20, that is, in the inertial phase in the process of the shifting action of the transmission portion 20, so that the total speed ratio γT of the transmission mechanism 10 is continuously changed before and after the shifting action of the step-variable transmission portion 20. The present embodiment provides some examples clarifying the shifting control of the continuously-variable transmission portion 11 which takes place in the inertial phase in the process of the shifting action of the step-variable transmission portion 20, for assuring a continuous change of the total speed ratio γT of the transmission mechanism 10 before and after the shifting action of the transmission portion 20.

In the preceding embodiment, the shifting control of the continuously-variable transmission portion 11 by the hybrid control means 52 is effected such that the speed ratio of the transmission portion 11 is changed in the direction opposite to the direction of change of the speed ratio of the step-variable transmission portion 20, so that the total speed ratio γT of the transmission mechanism 10 is continuously changed before and after the shifting action of the transmission portion 20. For preventing a transient change of the total speed ratio γT of the transmission mechanism 10 before and after the shifting action of the transmission portion 20, the direction of change of the speed ratio of the transmission portion 11 is required to be opposite to the direction of change of the speed ratio of the transmission portion 20. For assuring merely a continuous change of the total speed ratio γT of the transmission mechanism 10 before and after the shifting action of the transmission portion 20, the above-described requirement relating to the directions of change of the speed ratios is not essential Namely, the shifting control of the continuously-variable transmission portion 11 for continuously changing the speed ratio of the total speed ratio T of the transmission mechanism 10 before and after the shifting action of the step-variable transmission portion 20 may be implemented such that the speed ratio of the transmission portion 11 is changed in the direction of change of the speed ratio of the transmission portion 20. In some specific examples of the present embodiment, the speed ratio of the transmission portion 11 is changed in the direction of change of the speed ratio of the transmission portion 20.

Figure 13:
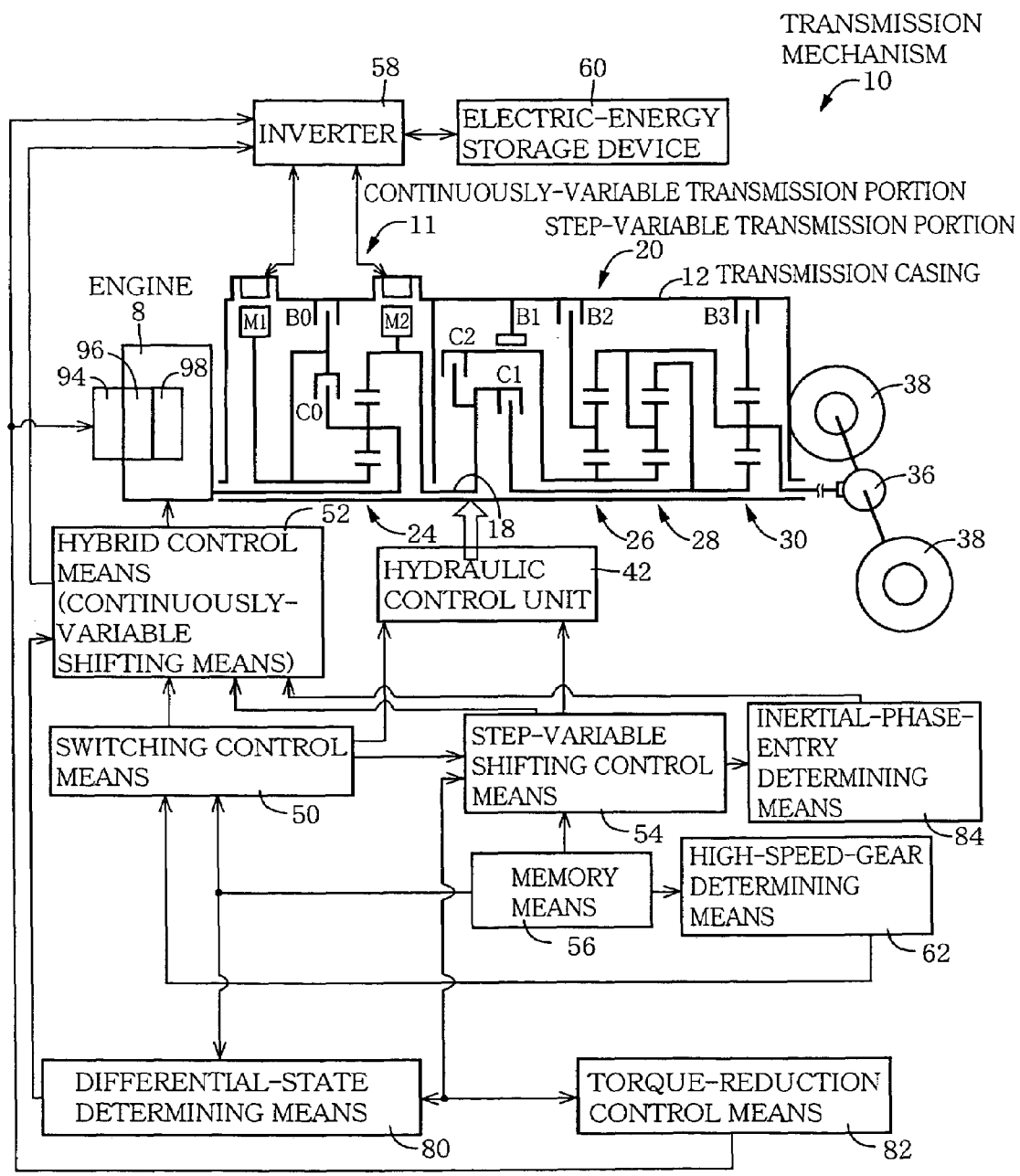
FIG. 13 is a functional block diagram corresponding to that of FIG. 5, illustrating major control functions of the electronic control device of FIG. 4, in another embodiment of this invention.

The functional block diagram of FIG. 13, which corresponds to that of FIG. 5, shows major control functions of the electronic control device 40 according to the present embodiment. The embodiment of FIG. 13 is different from the embodiment of FIG. 5 primarily in that the embodiment of FIG. 13 further includes inertial-phase-entry determining means 84 for determining whether the shifting action of the step-variable transmission portion 20 has entered the inertial phase.

The inertial-phase-entry determining means 84 is arranged to make the determination as to whether the shifting action of the step-variable transmission portion 20 has entered the inertial phase, depending upon whether a change of the speed of the power transmitting member 18 (second electric motor M2) is initiated due to initiation of generation of an engaging torque of the coupling device to be engaged for effecting the shifting action of the transmission portion 20 determined by the step-variable shifting control means 54, after a releasing action of the coupling device to be released for effecting the shifting action.

For instance, the determination by the inertial-phase-entry determining means 84 as to whether a change of the second electric motor speed $N_{M2}$ is initiated due to initiation of generation of the engaging torque of the coupling device to be engaged for effecting the shifting action of the step-variable transmission portion 20 under the control of the step-variable shifting control means 54 is made by determining whether the speed of the power transmitting member 18, that is, the second electric motor speed $N_{M2}$ has changed by more than a predetermined amount obtained by experimentation to detect the entry of the inertial phase, or by determining whether a length of time from the moment of determination by the step-variable shifting control means 54 to effect the shifting action of the step-variable transmission portion 20 to the moment of initiation of generation of the engaging torque of the coupling device to be engaged has exceeded a predetermined time which is obtained by experimentation and which corresponds to the above-described moment of initiation of generation of the engaging torque, or alternatively by determining whether the engaging hydraulic pressure of the coupling device to be engaged has increased to a predetermined transient pressure value $P_C$ which is obtained by experimentation and which corresponds to the above-described moment of initiation of generation of the engaging torque.

Figure 14:
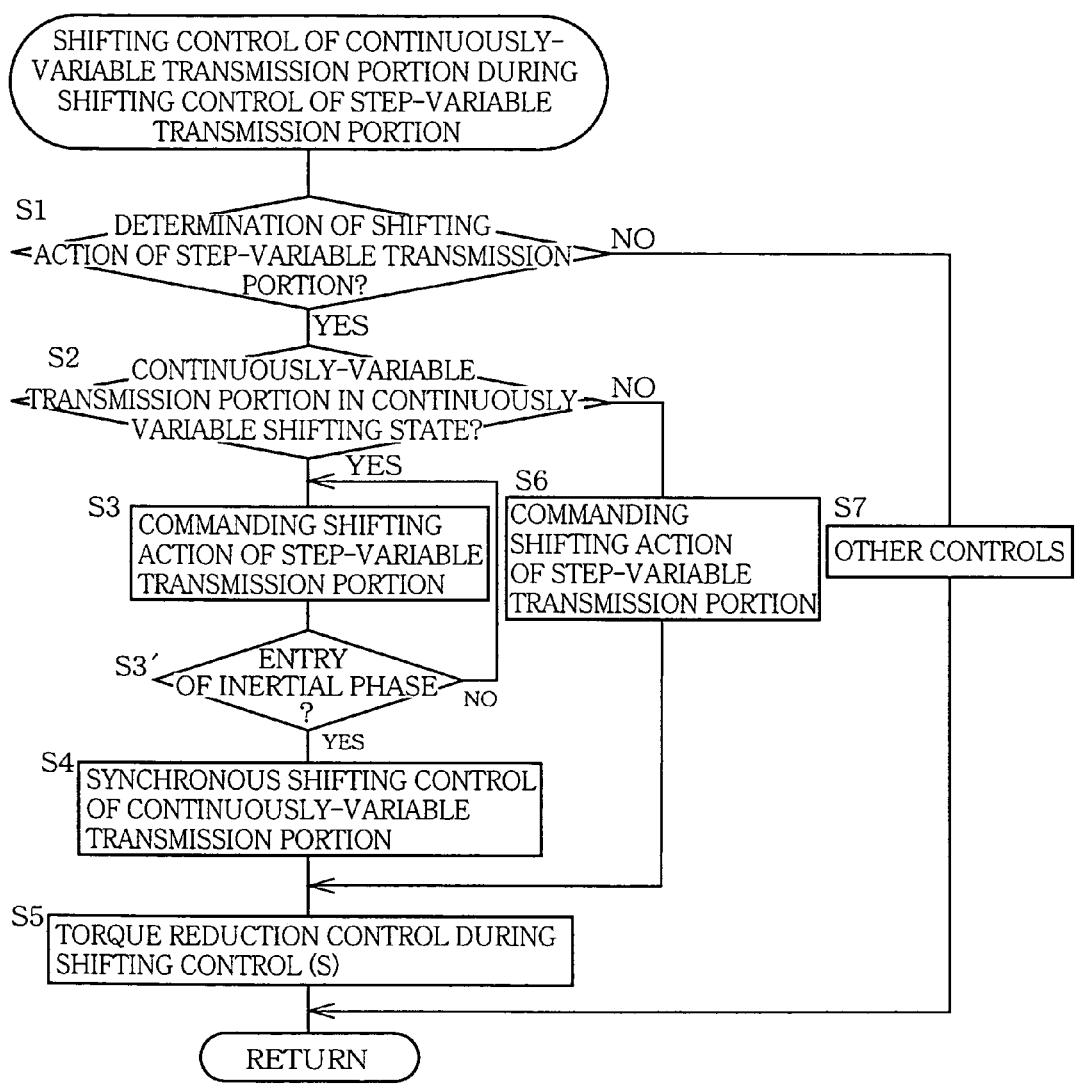
FIG. 14 is a flow chart corresponding to that of FIG. 11, illustrating a control operation of the electronic control device of FIG. 13, that is, a shifting control operation of the continuously-variable transmission portion during a shifting control of the step-variable transmission portion.

The flow chart of FIG. 14 illustrates a major control operation performed by the electronic control device 40, that is, a shifting control routine for controlling the shifting operation of the continuously-variable transmission portion 11 during the shifting control of the step-variable transmission portion 20. This shifting control routine is repeatedly executed with a short cycle time of about several microseconds to several tends of microseconds, for example. The flow chart of FIG. 14 corresponds to the flow chart of FIG. 11 and is different from the flow chart of FIG. 11 primarily in that S3' for determining the entry of the inertial phase of the shifting action of the transmission portion 20 is added in the flow chart of FIG. 14.

Figure 15:
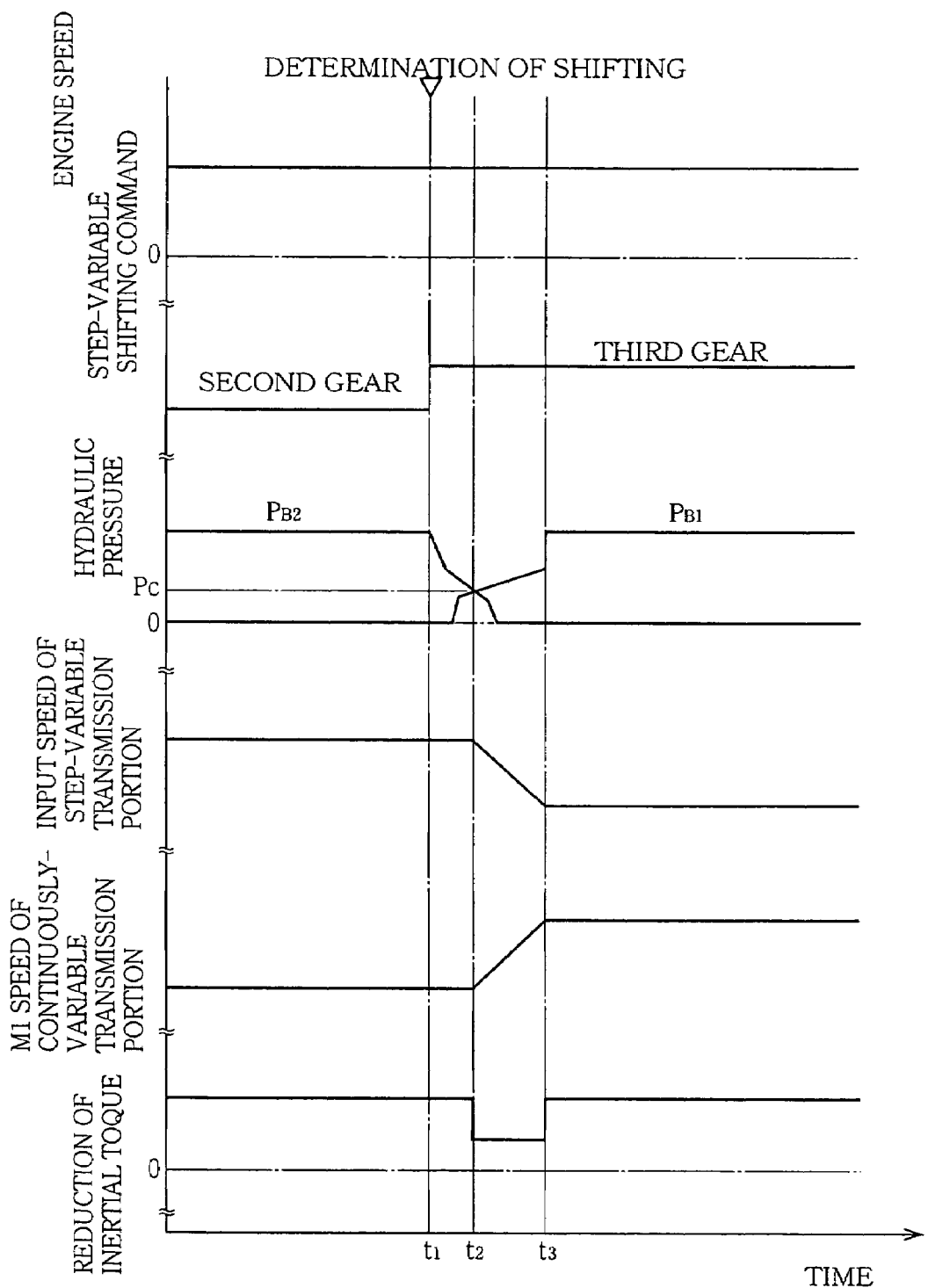
FIG. 15 is a time chart corresponding to that of FIG. 12, indicating the control operation shown in the flow chart of FIG. 14, when the step-variable transmission portion is shifted up from the second gear position to the third gear position in the continuously-variable shifting state of the transmission mechanism.

The time chart of FIG. 15 shows the control operation illustrated in the flow chart of FIG. 14, which is performed when the step-variable transmission portion 20 is shifted up from the second gear position to the third gear position while the transmission mechanism 10 is placed in the continuously-variable shifting state. The time chart of FIG. 15 corresponds to the time chart of FIG. 12, and is different from the time chart of FIG. 12 primarily in that a hydraulic signal output (hydraulic pressure) is added in the time chart of FIG. 15.

Figure 16:
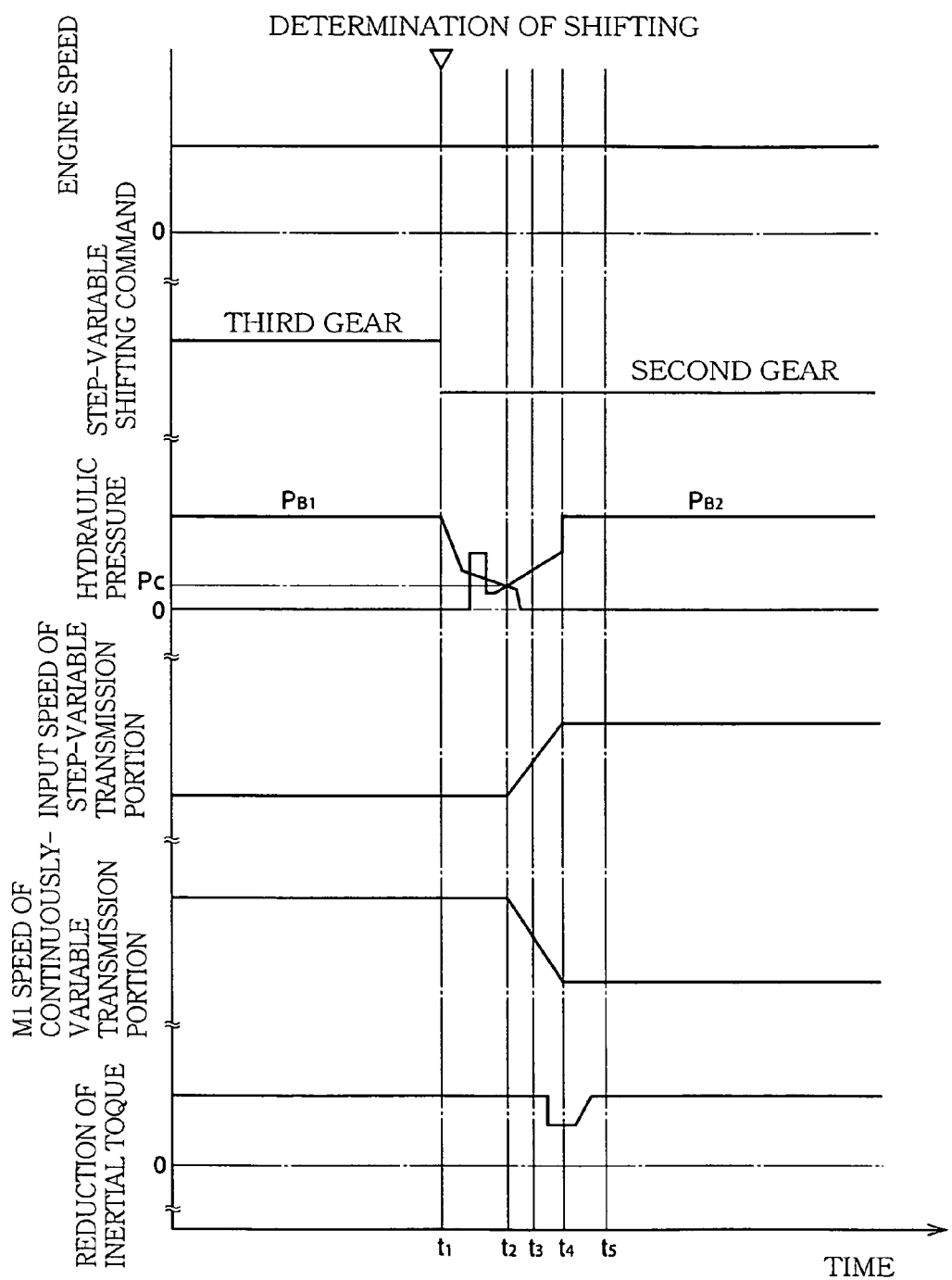
FIG. 16 is a time chart corresponding to that of FIG. 12, indicating the control operation shown in the flow chart of FIG. 14, when the step-variable transmission portion is shifted down from the third gear position to the second gear position in the continuously-variable shifting state of the transmission mechanism.

The time chart of FIG. 16 shows the control operation illustrated in the flow chart of FIG. 14, which is performed when the step-variable transmission portion 20 is shifted down from the third gear position to the second gear position during coasting of the vehicle while the transmission mechanism 10 is placed in the continuously-variable shifting state. The time chart of FIG. 16 corresponds to the time chart of FIG. 12.

Figure 17:
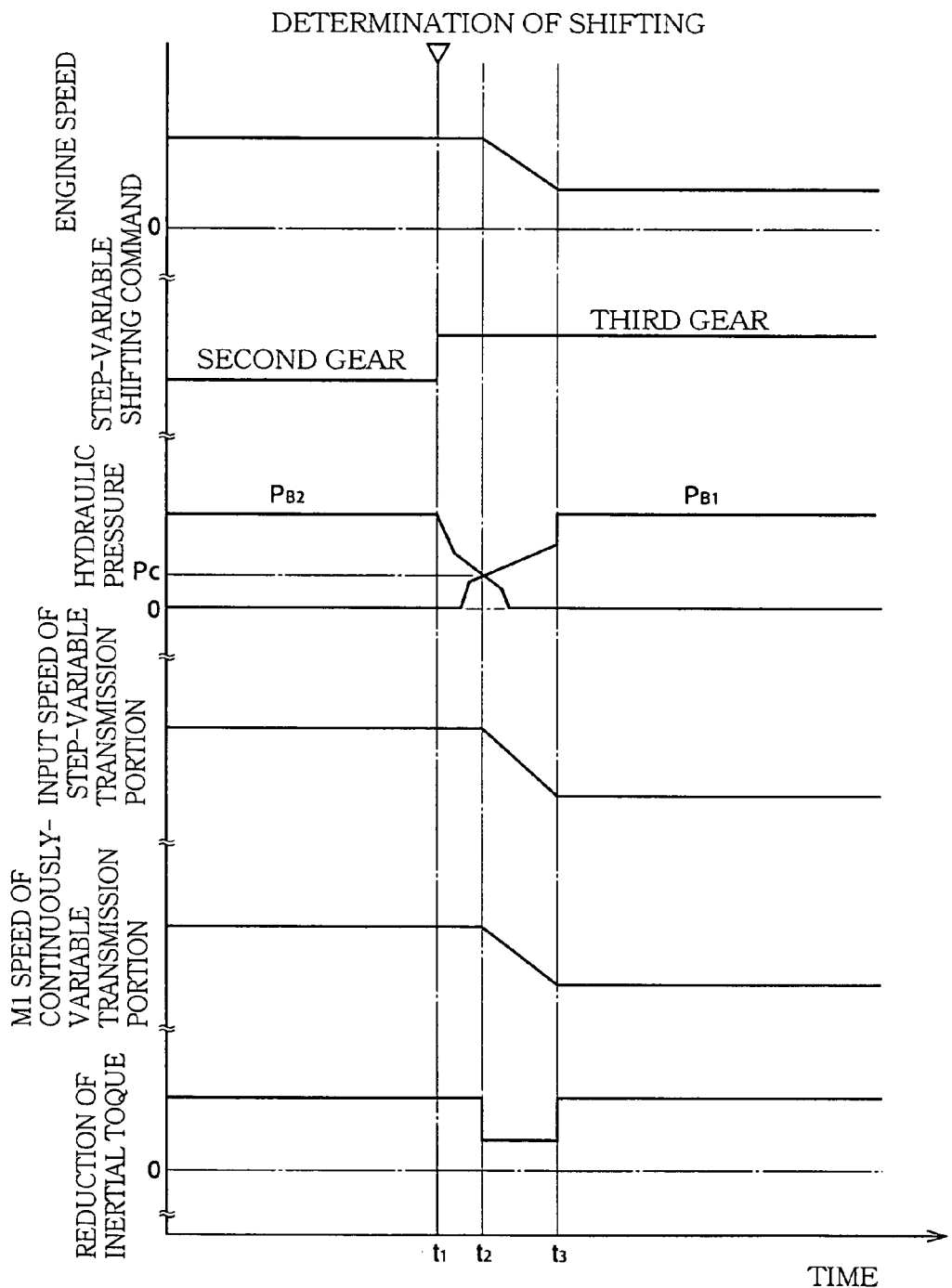
FIG. 17 is a time chart corresponding to that of FIG. 14, indicating the control operation shown in the flow chart of FIG. 14, when the step-variable transmission portion is shifted up from the second gear position to the third gear position in the continuously-variable shifting state of the transmission mechanism.

The time chart of FIG. 17 shows the control operation illustrated in the flow chart of FIG. 14, which is performed when the step-variable transmission portion 20 is shifted up from the second gear position to the third gear position while the transmission mechanism 10 is placed in the continuously-variable shifting state. The time chart of FIG. 17 corresponds to the time chart of FIG. 15, and is different from the time chart of FIG. 15 primarily in that the speed ratio of the continuously-variable transmission portion 11 is changed in the direction of change of the speed ratio of the step-variable transmission portion 20 in the time chart of FIG. 17.

Figure 18:
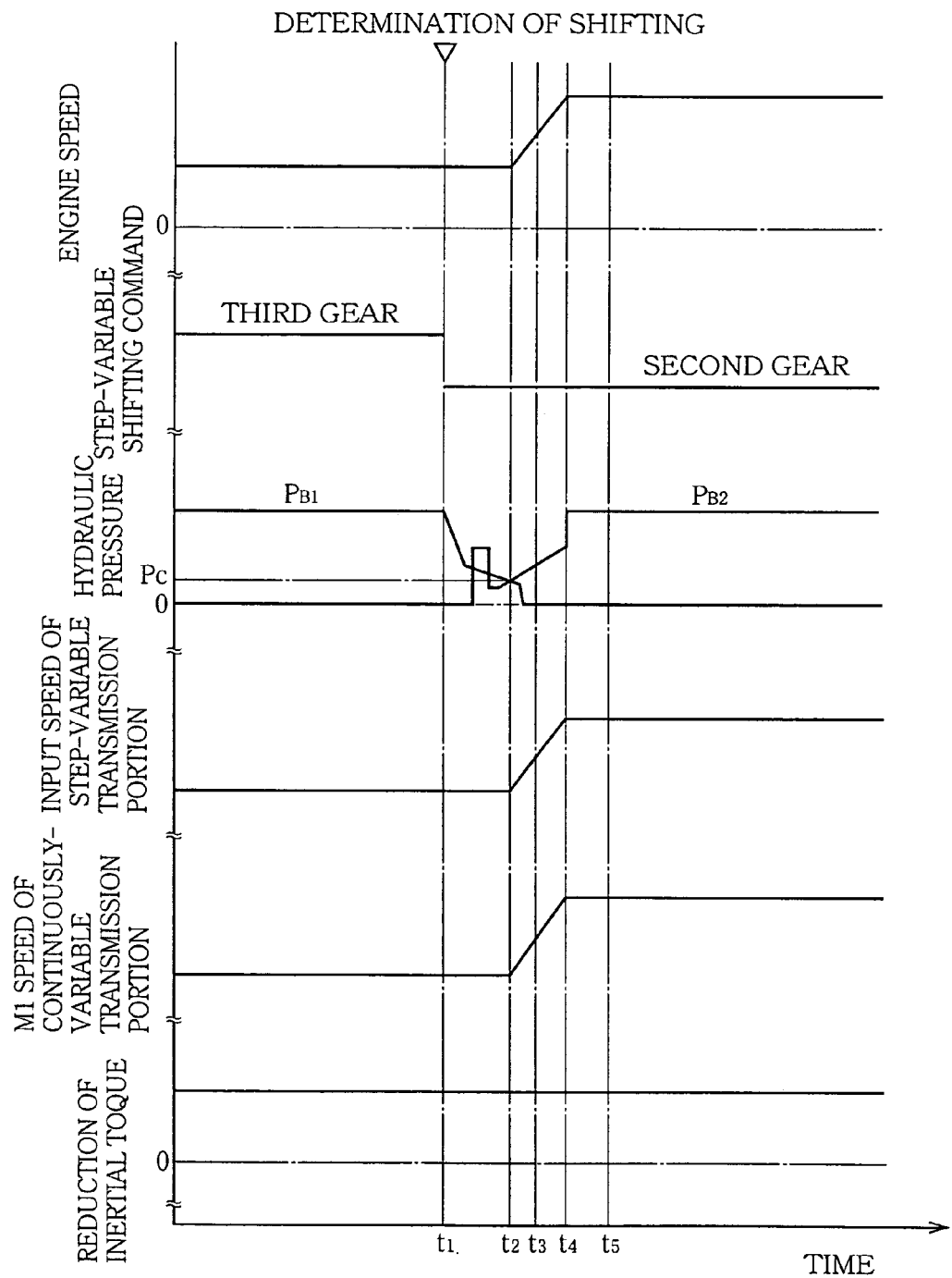
FIG. 18 is a time chart corresponding to that of FIG. 16, indicating the control operation shown in the flow chart of FIG. 14, when the step-variable transmission portion is shifted down from the third gear position to the second gear position in the continuously-variable shifting state of the transmission mechanism.

The time chart of FIG. 18 shows the control operation illustrated in the flow chart of FIG. 14, which is performed when the step-variable transmission portion 20 is shifted down from the third gear position to the second gear position during coasting of the vehicle while the transmission mechanism 10 is placed in the continuously-variable shifting state. The time chart of FIG. 18 corresponds to the time chart of FIG. 16, and is different from the time chart of FIG. 16 primarily in that the speed ratio of the continuously-variable transmission portion 11 is changed in the direction of change of the speed ratio of the step-variable transmission portion 20 in the time chart of FIG. 18.

Referring to FIGS. 14-18, there will be described only the aspects of the present embodiment which are different from those of the preceding embodiment of FIGS. 11 and 12, and the other aspects will not be described.

The shifting control routine is initiated with S1 corresponding to the step-variable shifting control means 54, to determine whether a shifting action of the step-variable transmission portion 20 should take place. This determination is made by determining whether one of the gear positions to which the transmission portion 20 should be shifted is determined on the basis of the vehicle condition represented by the vehicle speed V and the output torque $T_{OUT}$ of the transmission portion 20, and according to the shifting boundary line map shown in FIG. 6 by way of example.

In the examples shown in FIGS. 15 and 17, a determination that a shift-up action of the transmission portion 20 from the second gear position to the third gear position should take place is made at a point of time t1. In the examples shown in FIGS. 16 and 18, a determination that a shift-down action of the transmission portion 20 form the third gear position to the second gear position is made at the point of time t1.

When an affirmative decision is obtained in S1, the control flow goes to S2 corresponding to the differential-state determining means 80, to determine whether the power distributing mechanism 16 is placed in the differential state, that is, whether the continuously-variable transmission portion 11 is placed in the continuously-variable shifting state. This determination is made depending upon whether the vehicle condition is in the continuously-variable shifting region which is defined by the shifting boundary line map shown in FIG. 6 by way of example and in which the transmission mechanism 10 should be placed in the continuously-variable shifting state.

If a negative decision is obtained in S2, the control flow goes to S6 corresponding to the step-variable shifting control means 54, to implement the shifting control for effecting the shifting action of the step-variable transmission portion 20 determined in S1.

If an affirmative decision is obtained in S2, the control flow goes to S3 corresponding to the step-variable shifting control means 54, to implement the shifting control for effecting the shifting action of the transmission portion 20 determined in S1. In the examples of FIGS. 15 and 17, a shifting command to shift up the step-variable transmission portion 20 to the third gear position is generated at the point of time t1, at which a drop of a releasing pressure $P_{B2}$ of the second brake B2 (which is the coupling device to be released) is initiated. In the examples of FIGS. 16 and 18, a shifting command to shift down the transmission portion 20 to the second gear position is generated at the point of time t1, at which a drop of a releasing pressure $P_{B1}$ of the first brake B1 (which is the coupling device to be released) is initiated.

Then, the control flow goes to S3' corresponding to the inertial-phase-entry determining means 84, to determine whether the shifting action of the step-variable transmission portion 20 has entered the inertial phase. For instance, this determination as to whether the shifting action has entered the inertial phase is based on a determination as to whether a change of the second electric motor speed $N_{M2}$ is initiated, which determination is made depending upon whether the second electric motor speed $N_{M2}$ has changed by more than the predetermined amount obtained by experimentation to detect the entry of the inertial phase, or whether the length of time up to the moment of initiation of generation of the engaging torque of the coupling device to be engaged has exceeded the predetermined time which is obtained by experimentation and which corresponds to the above-indicated moment of initiation, or whether the engaging hydraulic pressure of the coupling device to be engaged has increased to the predetermined transient pressure value $P_C$ which is obtained by experimentation and which corresponds to the moment of initiation of generation of the engaging torque of the coupling device to be engaged.

In the examples of FIGS. 15, 16, 17 and 18, the entry of the inertial phase is determined at the point of time t1, as a result of the determination that the second electric motor speed $N_{M2}$ has changed by more than the predetermined amount obtained by experimentation to detect the entry of the inertial phase, or the determination that the predetermined time obtained by experimentation and corresponding to the moment of initiation of generation of the engaging torque of the coupling device to be engaged has passed, or the determination that the engaging hydraulic pressure of the coupling device has increased to the predetermined transient pressure value $P_C$ obtained by experimentation and corresponding to the above-described moment of initiation of generation of the engaging torque. In the examples of FIGS. 15 and 17, the coupling device to be engaged is the first brake B1 which has the engaging hydraulic pressure $P_{B1}$. In the examples of FIGS. 16 and 18, the coupling device to be engaged is the second brake B2 which has the engaging hydraulic pressure $P_{B2}$.

When a negative decision is obtained in S3', this step S3' is repeatedly implemented. When an affirmative decision is obtained in S3', the control flow goes to S4 corresponding to the hybrid control means 52, to implement the shifting control of the continuously-variable transmission portion 11 in synchronization with the shifting control of the step-variable transmission portion 20 in S3, so that the total speed ratio γT of the transmission mechanism 10 is continuously changed before and after the shifting action of the transmission portion 20.

In the examples of FIGS. 15 and 16, the speed ratio of the continuously-variable transmission portion 11 is changed in steps in the direction opposite to the direction of change of the speed ratio of the step-variable transmission portion 20, by an amount corresponding to the amount of stepping change of the speed ratio of the transmission portion 20, in the inertial phase of the shifting action of the transmission portion 20, during the time period from the point of time t2 to the point of time t3 (FIG. 15) or to the point of time t4 (FIG. 16), to prevent a change of the total speed ratio γT of the transmission mechanism 10 before and after the shifting action of the transmission portion 20, that is, to prevent a change of the engine speed $N_E$ before and after the shifting action of the transmission 20.

In the examples of FIGS. 17 and 18, the speed ratio of the continuously-variable transmission portion 11 is changed in the direction of change of the speed ratio of the step-variable transmission portion 20, in the inertial phase of the shifting action of the transmission portion 20, during the time period from the point of time t2 to the point of time t3 (FIG. 17) or to the point of time t4 (FIG. 18), so that the total speed ratio $\gamma T$ of the transmission mechanism 10 is continuously changed before and after the shifting action of the transmission portion 20. Accordingly, the engine speed $N_E$ is changed as a result of the change of the total speed ratio $\gamma T$ of the transmission mechanism 10, contrary to the engine speed $N_E$ in the examples of FIGS. 15 and 16.

During the shifting controls in S3 and S4 or the shifting control in S6, the torque reduction control to reduce the input torque $T_{IN}$ of the step-variable transmission portion 20 is implemented in step S5 corresponding to the torque-reduction control means 82. During the shifting control(s), an inertial torque is generated to increase the output torque $T_{OUT}$ as a result of a speed drop of the rotary element(s) of the step-variable transmission portion 20 and a speed drop of the rotary element(s) of the step-variable transmission portion 11, for example. Alternatively, an inertial torque is generated to increase the output torque $T_{OUT}$ as a result of a drop of the engine speed $N_E$ in the process of the shift-up action. In view of the generation of the inertial torque described above, the input torque $T_{IN}$ is reduced in S5 by implementing the engine-torque reducing control to reduce the engine torque $T_E$, or the electric-motor-torque reducing control using the second electric motor M2, for example, for reducing the amount of increase of the output torque $T_{OUT}$ due to the inertial torque generated. Alternatively, the input torque $T_{IN}$ is reduced to reduce an oscillatory change of the output torque $T_{OUT}$ upon completion of the engaging action of the frictional coupling device to effect the shifting action of the step-variable transmission portion 20, for thereby reducing an engaging shock of the coupling device. Where the shifting action is a shift-down action during deceleration of the vehicle without an operation of the accelerator pedal, that is, a shift-down action during a coasting run of the vehicle, the torque reduction control need not be implemented so as to reduce the amount of increase of the output torque $T_{OUT}$ due to the inertial torque.

In the example of FIG. 15, the input torque $T_{IN}$ is reduced during the time period from the point of time t2 to the point of time t3, to reduce the amount of increase of the output torque $T_{OUT}$ due to the inertial torque as a result of the speed drops of the rotary elements of the step-variable and continuously-variable transmission portions 20, 22 while the engine speed $N_E$ is held constant.

In the example of FIG. 16, the input torque $T_{IN}$ is reduced during the time period from the point of time t3 to a point of time t5, to reduce the oscillatory change of the output torque $T_{OUT}$ upon completion of the engaging action of the frictional coupling device to effect the shifting action of the step-variable transmission portion 20 while the engine speed $N_E$ is held constant, so that the engaging shock of the coupling device is reduced. In the example of FIG. 16 in which the transmission portion 20 is shifted down during a coasting run of the vehicle, the torque reduction control to reduce the amount of increase of the output torque $T_{OUT}$ due to the inertial torque is not implemented. Where the transmission portion 20 is shifted down during running of the vehicle with an operation of the accelerator pedal, however, the torque reduction control is implemented to reduce the amount of increase of the output torque due to the inertial torque, as in the example of FIG. 15.

In the example of FIG. 17, the input torque TIN is reduced during the time period from the point of time t2 to the point of time t3, to reduce the amount of increase of the output torque TOUT due to the inertial torque as a result of a change of the engine speed $N_E$ and speed drops of the rotary elements of the step-variable and continuously-variable transmission portions 20, 11.

In the example of FIG. 18 in which the transmission portion 20 is shifted down during a coasting run of the vehicle, the torque reduction control is not implement to reduce the amount of increase of the output torque due to the inertial torque. Where the transmission portion 20 is shifted down during running of the vehicle with an operation of the accelerator pedal, however, the torque reduction control is implemented to reduce the amount of increase of the output torque due to the inertial torque, as in the example of FIG. 17.

If a negative decision is obtained in S1, the control flow goes to S7 to implement various controls by various control means of the electronic control device 40, other than the shifting control of the step-variable transmission portion 20, or to terminate one cycle of execution of the present shifting control routine. When the transmission mechanism 10 is placed in the continuously-variable shifting state, for example, the hybrid control means 52 implements the shifting control of the continuously-variable transmission portion 11 on the basis of the vehicle condition.

As described above, the present embodiment has the same advantages as the preceding embodiment. For example, the shifting control of the continuously-variable transmission portion 11 is implemented under the control of the hybrid control means 52 (continuously-variable shifting control means), in synchronization with the shifting action of the step-variable transmission portion 20, that is, in the inertial phase of the shifting action of the transmission portion 20, to assure a continuous change of the total speed ratio (overall speed ratio) $\gamma T$ of the transmission mechanism 10 (drive system) determined by the speed ratio of the transmission portion 11 and the speed ratio of the transmission portion 20, that is, to reduce the amount of stepping change of the total speed ratio $\gamma T$ during the shifting action of the step-variable transmission portion 20 speed $N_E$ before and after the step-variable transmission portion 20, thereby reducing its shifting shock. Further, the present arrangement permits the transmission mechanism 10 as a whole to function as a continuously variable transmission, leading to an improvement of the fuel economy.

Embodiment 3

Figures 19, 20:
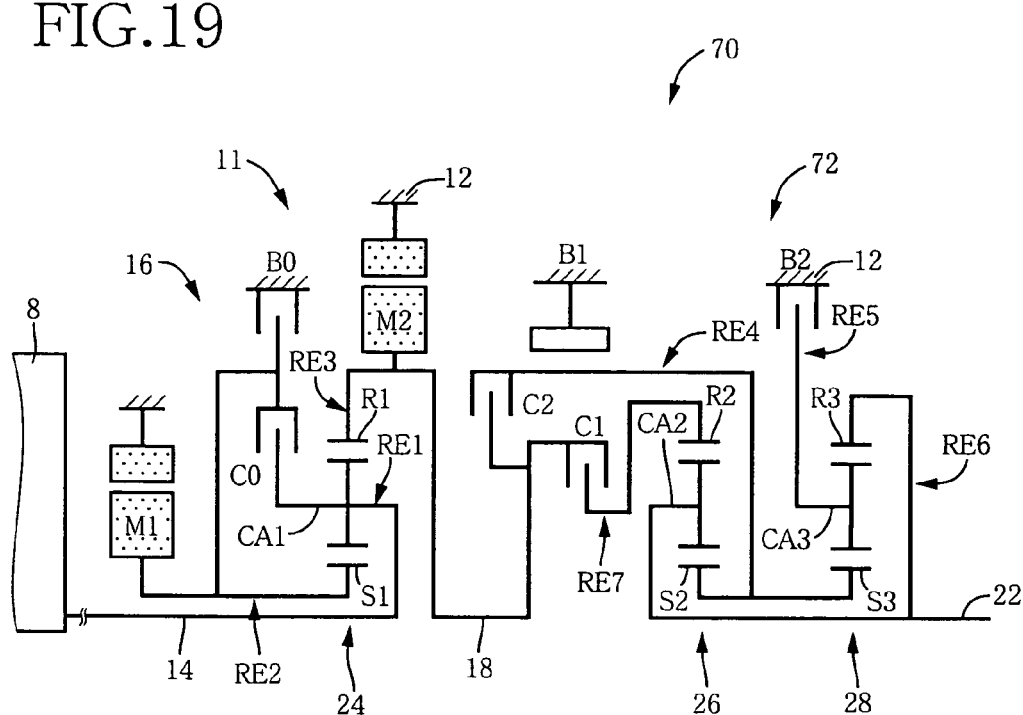
FIG. 19 is a schematic view corresponding to that of FIG. 1, showing an arrangement of a drive system of a hybrid vehicle according to a further embodiment of the present invention.
FIG. 20 is a table corresponding to that of FIG. 2, indicating shifting actions of the hybrid vehicle drive system of FIG. 19, which is operable in a selected one of the continuously-variable and step-variable shifting states, in relation to different combinations of operating states of hydraulically operated frictional coupling devices to effect the respective shifting actions.
Figure 21:
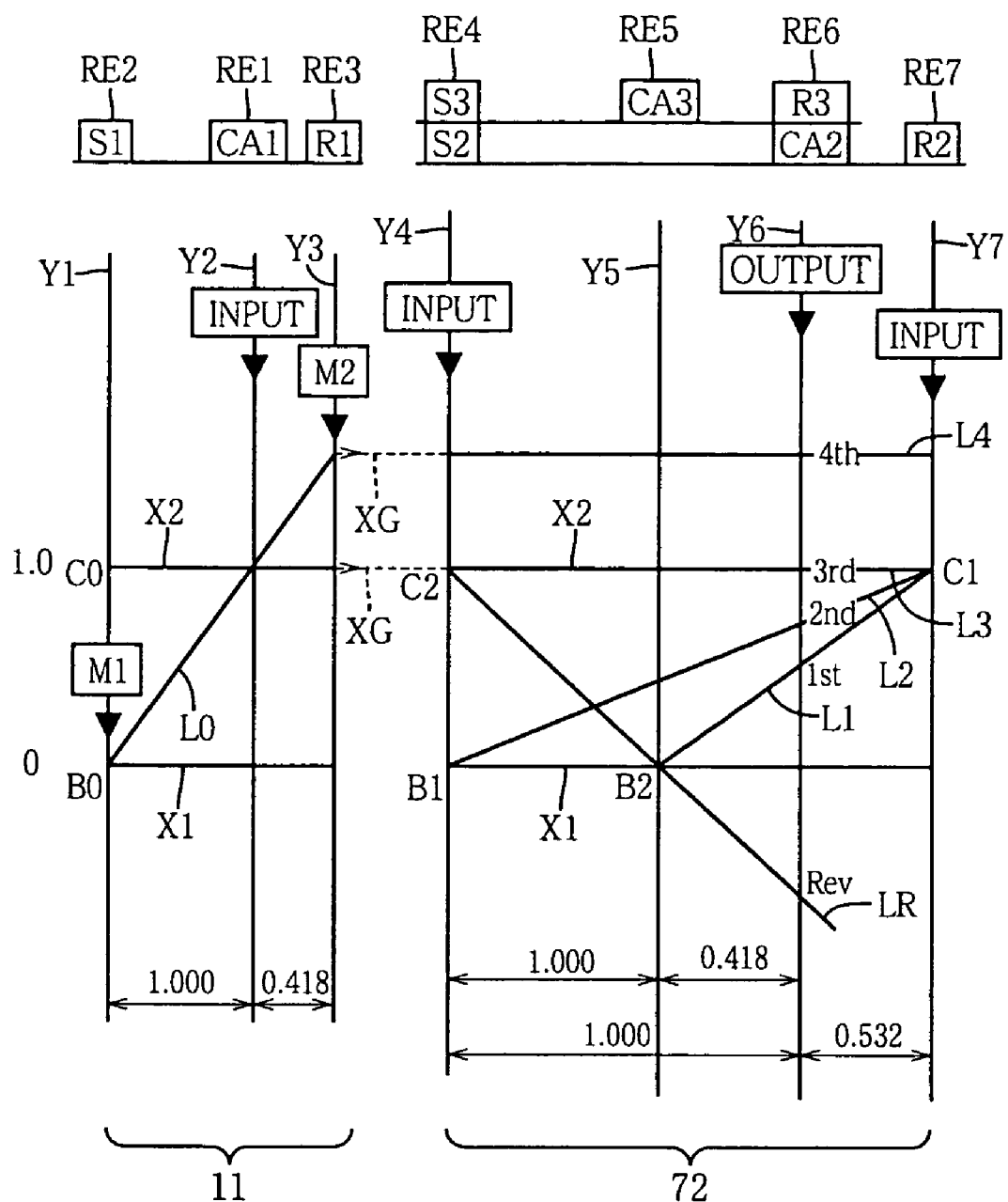
FIG. 21 is a collinear chart corresponding to that of FIG. 3, indicating relative rotating speeds of the rotary elements of the hybrid vehicle drive system of FIG. 19 in the step-variable shifting state, in the different gear positions.

Referring to the schematic view of FIG. 19, there is shown an arrangement of a transmission mechanism 70 in another embodiment of this invention, and FIG. 20 a table indicating a relationship between the gear positions of the transmission mechanism 70 and different combinations of engaged states of the hydraulically operated frictional coupling devices for respectively establishing those gear positions, while FIG. 21 is a collinear chart for explaining a shifting operation of the transmission mechanism 70.

The transmission mechanism 70 includes the continuously-variable transmission portion 11 having the first electric motor M1, power distributing mechanism 16 and second electric motor M2, as in the preceding embodiments. The transmission mechanism 70 further includes a step-variable transmission portion 72 having three forward drive positions.

The transmission portion 72 is disposed between the continuously-variable transmission portion 11 and the output shaft 22 and is connected in series to the continuously-variable transmission portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The transmission step-variable portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 20. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the continuously-variable transmission portion 11 which is placed in the fixed-speed-ratio shifting state by engagement of the switching clutch C0 or switching brake B0. Further, a continuously variable transmission is constituted by the transmission portion 20, and the continuously-variable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.80, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 20. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, so that the continuously-variable transmission portion 11 functions as the continuously variable transmission, while the step-variable transmission portion 72 connected in series to the continuously-variable transmission portion 11 functions as the step-variable transmission, whereby the speed of the rotary motion transmitted to the transmission portion 72 placed in one of the first through third gear positions, namely, the rotating speed of the power transmitting member 18 is continuously changed, so that the speed ratio of the transmission mechanism 10 when the transmission portion 72 is placed in one of those gear positions is continuously variable over a predetermined range. Accordingly, the total speed ratio of the transmission portion 72 is continuously variable across the adjacent gear positions, whereby the overall speed ratio γT of the transmission mechanism 70 a whole is continuously variable.

The collinear chart of FIG. 21 indicates, by straight lines, a relationship among the rotating speeds of the rotary elements in each of the gear positions of the transmission mechanism 70, which is constituted by the continuously-variable transmission portion 11 functioning as the continuously-variable shifting portion or first shifting portion, and the transmission portion 72 functioning as the step-variable shifting portion or second shifting portion. The collinear chart of FIG. 21 indicates the rotating speeds of the individual elements of the continuously-variable transmission portion 11 when the switching clutch C0 and brake B0 are both released, and the rotating speeds of those elements when the switching clutch C0 or brake B0 is engaged, as in the preceding embodiments In FIG. 21, four vertical lines Y4, Y5, Y6 and Y7 corresponding to the automatic transmission 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission 72, and the seventh rotary element RE7 is selectively connected to the power transmitting member 18 through the first clutch C1.

When the first clutch C1 and the second brake B2 are engaged, the step-variable transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 21. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the continuously-variable transmission portion 11. When the switching clutch B0 is engaged in place of the switching clutch C0, the sixth rotary element RE6 is rotated at a speed higher than the engine speed $N_E$, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the continuously-variable transmission portion 11 functioning as the continuously-variable shifting portion or first shifting portion, and the step-variable transmission portion 72 functioning as the step-variable (automatic) shifting portion or second shifting portion, so that the present transmission mechanism 70 has advantages similar to those of the first embodiment.

Embodiment 4

Figure 22:
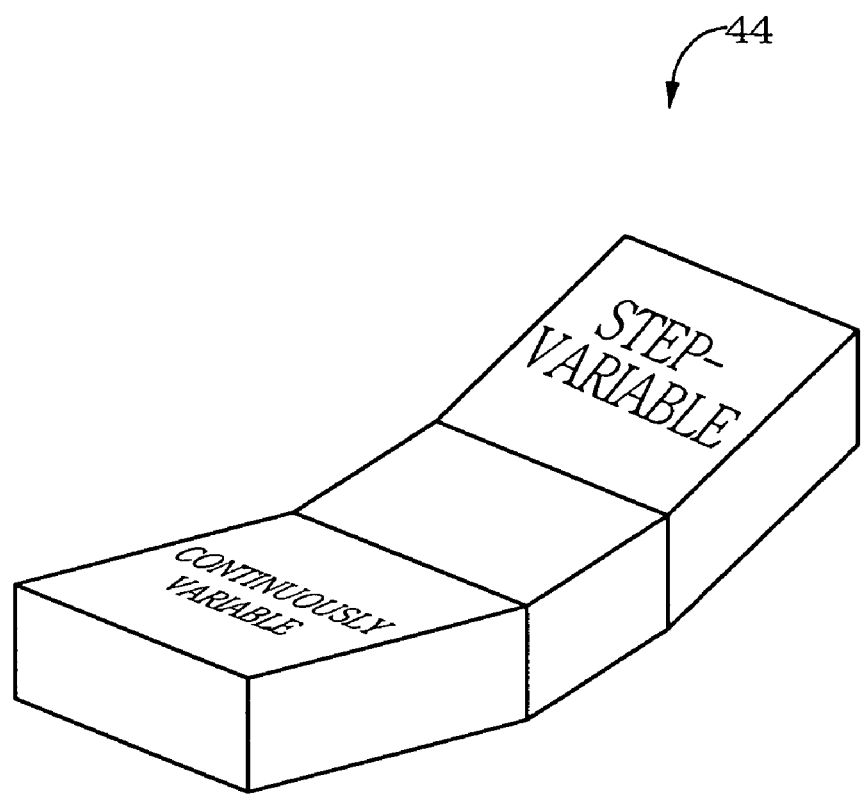
FIG. 22 is a perspective view showing an example of a manually operable shifting-state selecting device in the form of a seesaw switch operated by a user to select the shifting state.

FIG. 22 shows a seesaw switch 44 (hereinafter referred to as "switch 44") functioning as a shifting-state selecting device manually operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The seesaw switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 22. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the seesaw switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, step S2 in the flow chart of FIG. 11 or FIG. 14 is formulated such that the determination as to whether the power distributing mechanism 16 is placed in the differential state, that is, whether the continuously-variable transmission portion 11 is placed in the continuously-variable shifting state, is effected depending upon whether the switch 44 has been operated to select the differential state of the power distributing mechanism 16 or the continuously-variable shifting state of the transmission mechanism 10.

Embodiment 5

Figure 23:
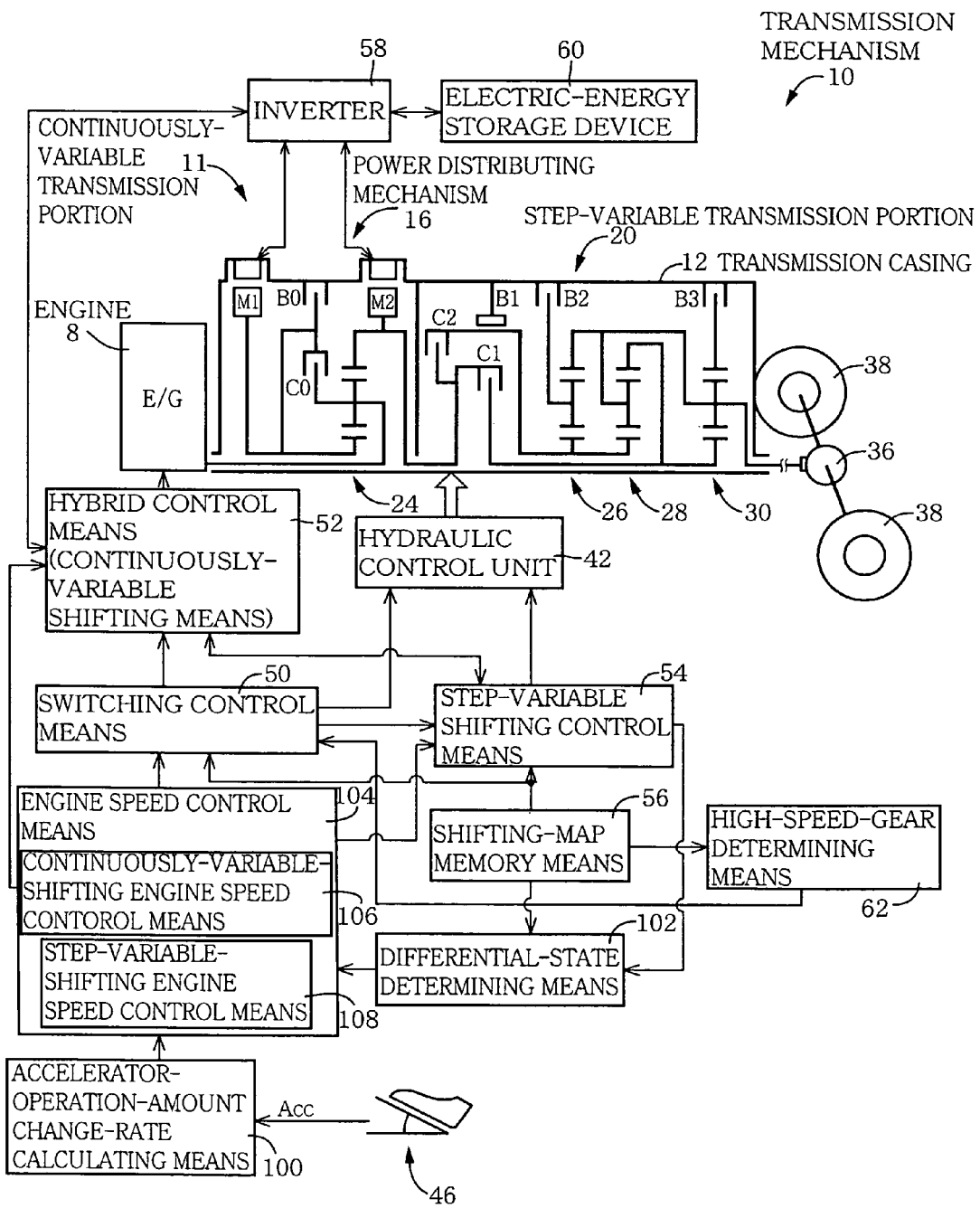
FIG. 23 is a functional block diagram illustrating major control functions of the electronic control device of FIG. 4 according to a further embodiment of the invention.

FIG. 23 is a functional block showing major control functions of the electronic control device 40. In FIG. 23, accelerator-operation-amount change-rate calculating means 100 is arranged to calculate an operating speed of the accelerator pedal 46 in the form of a change rate $A_{CC}'$ of the amount of operation of the accelerator pedal, on the basis of an operation amount signal $A_{CC}$ which represents the amount of operation of the accelerator pedal 46 and which is applied to the electronic control device 40. This change rate $A_{CC}'$ represents a rate of increase or decrease of the vehicle drive force as required by the vehicle operator. The change rate $A_{CC}'$ is a relatively high positive value when the accelerator pedal 46 is abruptly operated, that is, when the required vehicle drive force is relatively large, for rapid or abrupt starting or acceleration of the vehicle or for uphill running of the vehicle.

When the rate of change of the required vehicle drive force is relatively low, that is, when the amount of operation of the accelerator pedal 46 is kept substantially constant for running of the vehicle at a substantially constant speed, the change rate ACC' is almost zero or a relatively low value.

Differential-state determining means 102 is arranged is arranged to determine whether the power distributing mechanism 16 is placed in the differential state, that is, whether the continuously-variable transmission portion 11 is placed in the continuously-variable shifting state. This determination is made when it is determined that the step-variable transmission portion 20 should be shifted, for example, when the step-variable shifting control means 54 has determined the gear position to which the step-variable transmission portion 20 should be shifted, on the basis of the vehicle condition and according to the shifting boundary line map of FIG. 6. For instance, the differential-state determining means 80 makes the determination as to whether the continuously-variable transmission portion 11 is in the continuously-variable shifting state or not, depending upon the determination by the switching control means 50 as to whether the vehicle condition represented by the vehicle speed V and the output torque $T_{OUT}$ is in the step-variable shifting region for placing the transmission mechanism 10 in the step-variable shifting state, or in the continuously-variable shifting region for placing the transmission mechanism 10 in the continuously-variable shifting state, according to the switching boundary line map indicated in FIG. 6 by way of example.

The differential-state determining means 80 is provided to determine that the continuously-variable transmission portion 11 is placed in the differential state, so that the engine speed is controlled depending upon whether the continuously-variable transmission portion 11 is in the differential-state or in the non-differential state, upon determination of a shifting action of the step-variable transmission portion 20.

Engine-speed control means 104 includes continuously-variable-shifting engine control means 106 and step-variable-shifting engine control means 108, and is arranged to control the engine speed $N_E$ during a shifting control of the step-variable transmission portion 20 by the step-variable shifting control means 54, by controlling an electric continuously variable shifting action of the continuously-variable transmission portion 11 or utilizing a shifting action of the step-variable transmission portion 20 which causes a stepping change of the engine speed $N_E$.

The continuously-variable-shifting engine control means 106 is operated when the power distributing mechanism 16 is in the differential state upon initiation of a shifting action of the step-variable transmission portion 20 under the control of the step-variable shifting control means 54. The continuously-variable-shifting engine control means 106 is arranged to command the hybrid control means 52 to control the first electric motor M1 of the continuously-variable transmission portion 11 to implement an electric continuously variable shifting action such that the speed of the first sun gear S1 is changed so that the engine speed $N_E$ coincides with a target engine speed value $N_E^*$ upon completion of the shifting action of the step-variable transmission portion 20. The continuously-variable-shifting engine speed means 106 is further arranged to command the step-variable shifting control means to implement the shifting control of the step-variable transmission portion 20, together with the engine speed control described above. The target engine speed $N_E^*$ indicated above is the engine speed $N_E$ at which the engine output satisfying the required vehicle drive force upon completion of the shifting action of the step-variable transmission portion 20 is obtained, and which is controlled by the hybrid control means 52 so that the engine 8 is operated along a stored optimum curve defined by control parameters in the form of the engine speed $N_E$ and engine torque $T_E$.

Generally, there is response delay after a moment of determination by the step-variable shifting control means 54 that a shifting action of the step-variable transmission portion 20 should take place, until a moment of initiation of a change of the engine speed $N_E$ due to initiation of the actual shifting action with engaging and releasing actions of the appropriate hydraulically operated frictional coupling devices. To reduce this response delay and to rapidly obtain the required engine output upon completion of the shifting action, the continuously-variable-shifting engine control means 106 is arranged to rapidly change the engine speed $N_E$ after the determination of the shifting action by the step-variable shifting control means 54, by controlling the speed of the first electric motor M1 by the hybrid control means 52, rather than by utilizing the stepping change of the engine speed $N_E$ due to the shifting action of the step-variable transmission portion 20.

When the step-variable shifting control means 54 determines that a shift-down action of the transmission portion 20 should take place, for example, the continuously-variable-shifting engine control means 106 commands the hybrid control means 52 to raise the speed of the first electric motor M1 for thereby raising the engine speed $N_E$, rather than permitting the engine speed NE to rise due to the shift-down action. At this time, the continuously-variable-shifting engine control means 106 commands the hybrid control means 52 to control the speed of the first electric motor M1, for coincidence of the engine speed $N_E$ with the above-described target engine speed $N_E^*$. while taking account of the speed of the power transmitting member 18 which is determined by the input speed of the step-variable transmission portion 20 (namely, the vehicle: speed V) that rises as a result of the shift-down action, and the gear position of the transmission portion 20.

The continuously-variable-shifting engine control means 106 controls the rate of change of the engine speed $N_E$ on the basis of the change rate $A_{CC}'$ of the accelerator pedal operation amount. As described above, the change rate $A_{CC}'$ of the accelerator pedal operation amount represents a rate of increase or decrease of the vehicle drive force as required by the vehicle operator. Namely, the change rate $A_{CC}'$ represents the rate at which the required vehicle drive force is changed. The vehicle drive force as required by the vehicle operator corresponds to a rate of change of the engine output necessary to meet the required vehicle drive force. In this respect, the change rate $A_{CC}'$ is considered to represent a rate of change of the engine speed. For instance, the continuously-variable-shifting engine control means 106 commands the hybrid control means 52 to control the speed of the first electric motor M1 for increasing the rate of rise of the engine speed so that the rate of increase of the required vehicle drive force is comparatively high when the change rate $A_{CC}'$ is a comparatively high positive value than when the change rate $A_{CC}'$ is a comparatively low positive value.

The step-variable-shifting engine control means 108 is operated when the power distributing mechanism 16 is in the non-differential state upon initiation of a shifting control of the step-variable transmission portion 20 under the control of the step-variable shifting control means 54. The step-variable-shifting engine control means 108 is arranged to command the step-variable shifting control means 54 to implement the shifting control of the step-variable transmission portion 20 such that the engine speed $N_E$ is changed in steps as a result of the shifting action of the transmission portion 20, so as to coincide with step-variable-shifting target engine speed value $N_E^*$ upon completion of the shifting action of the transmission portion 20. The step-variable-shifting target engine speed value $N_E^*$ is the engine speed $N_E$ determined by the speed of the power transmitting member 18 which is determined by the vehicle speed V and the fixed speed ratio of the continuously-variable transmission portion 11.

The step-variable-shifting engine control means 108 is further arranged to command the hybrid control means 52 to control the speed(s) of the first electric motor M1 and/or the second electric motor M2 while the power distributing mechanism 16 is held in its non-differential state by the switching control means 50, so that the engine speed $N_E$ is made equal the step-variable-shifting target engine speed value $N_E^*$ as soon as possible. When the power distributing mechanism 16 is in the non-differential state with the switching clutch C0 held in its engaged state for rotation of the rotary elements of the mechanism 16 as a unit, for example, the step-variable-shifting engine control means 108 commands the hybrid control means 52 to control the speed(s) of the first electric motor M1 and/or the second electric motor M2 while the power distributing mechanism 16 is held in its non-differential state under the control of the switching control means 50, so that the engine speed $N_E$ coincides with the step-variable-shifting target engine speed value $N_E^*$ as soon as possible.

When the power distributing mechanism 16 is in the non-differential state upon initiation of a shifting action of the step-variable transmission portion 20 under the control of the step-variable shifting control means 54, the engine speed control means 104 controls the engine speed by activating the step-variable-shifting engine control means 108 rather than the continuously-variable-shifting engine control means 106, while holding the power distributing mechanism 16 in its non-differential state, rather than switching the mechanism 16 to the differential state, for preventing a response delay due to the switching of the mechanism 16 to the differential state. Namely, the engine speed control means 104 is arranged to implement an engine speed control by the step-variable shifting control means 54, for improving a shifting response of the step-variable transmission portion 20, when the power distributing mechanism 16 is in the non-differential state upon initiation of the shifting control by the step-variable shifting control means 54.

Thus, the engine speed control means 104 selectively activates the continuously-variable-shifting engine control means 106 or the step-variable-shifting engine speed control means 108, to control the engine speed during a shifting control of the step-variable transmission portion 20, in one of two engine speed control methods which is selected depending upon whether the power distributing mechanism 16 is placed in the differential state or non-differential state upon initiation of a shifting control of the transmission portion 20 by the step-variable shifting control means 54.

In other words, the engine speed control means 104 is arranged to change the method of the shifting control of the step-variable transmission portion 20, by selecting one of the engine speed control by the continuously-variable-shifting engine control means 106 and the engine speed control by the step-variable-shifting engine speed control means 108, during the shifting control of the step-variable transmission portion 20, depending upon whether the power distributing mechanism 16 is placed in the differential state or non-differential state upon initiation of the shifting control of the transmission portion 20 by the step-variable shifting control means 54.

Figure 24:
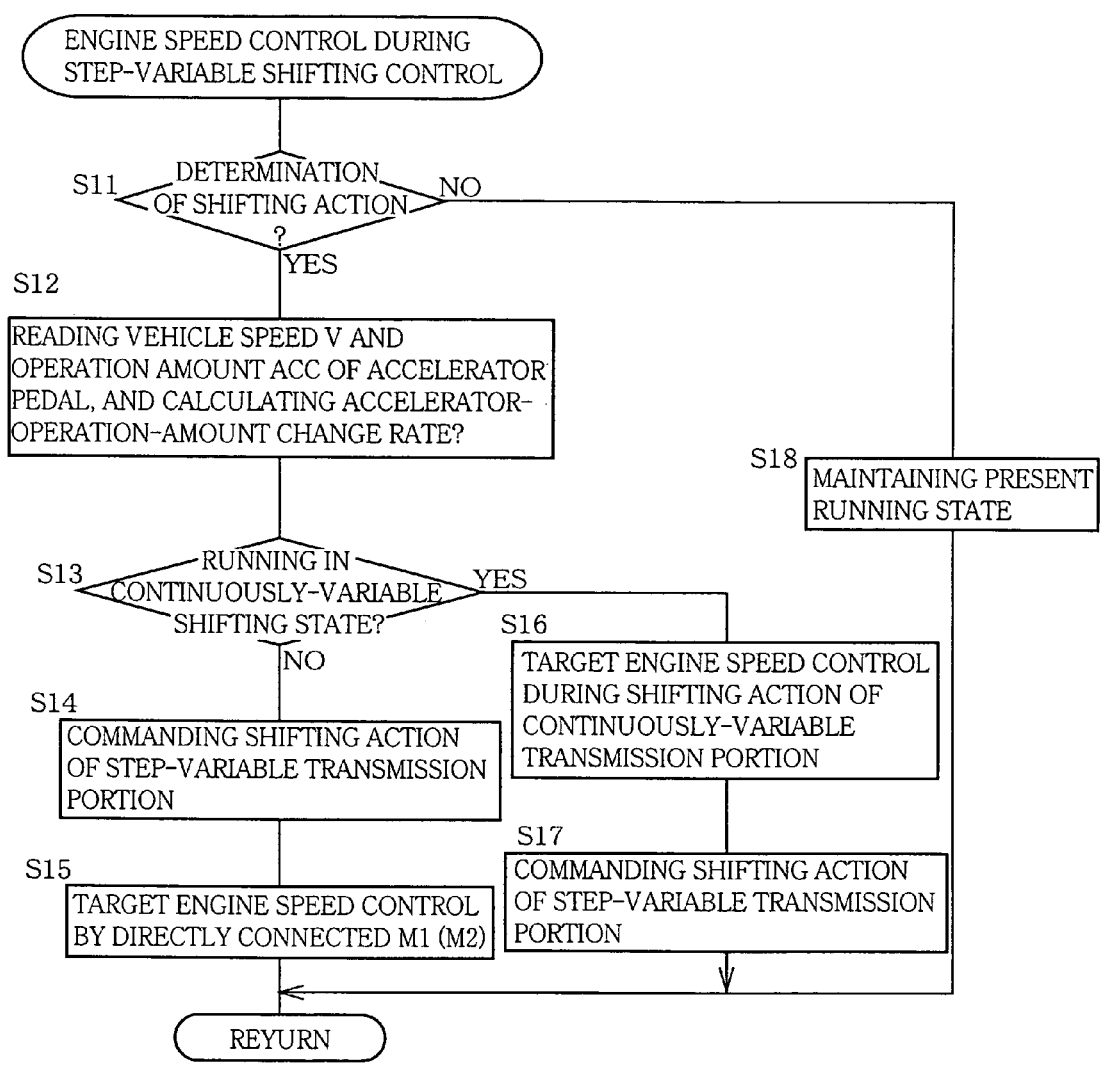
FIG. 24 is a flow chart illustrating a control operation of the electronic control device of FIG. 23, that is, a engine speed control operation during a shifting control of the step-variable transmission portion.

The flow chart of FIG. 24 illustrates a major control operation performed by the electronic control device 40, that is, an engine speed control routine during the shifting control of the step-variable transmission portion 20. This engine speed control routine is repeatedly executed with a short cycle time of about several microseconds to several tends of microseconds, for example.

The engine speed control routine is initiated with step S11 ("step" being omitted hereinafter) corresponding to the step-variable shifting control means 54, to determine whether a shifting action of the step-variable transmission portion 20 should take place. This determination is made by determining whether one of the gear positions to which the transmission portion 20 should be shifted is determined on the basis of the vehicle condition represented by the vehicle speed V and the output torque $T_{OUT}$ of the transmission portion 20, and according to the shifting boundary line map shown in FIG. 6 by way of example. When a negative decision is obtained in S11, the control flow goes to S18 to maintain the present running state of the vehicle and terminate one cycle of execution of the present control routine. When an affirmative decision is obtained in S11, the control flow goes to S12 corresponding to the accelerator-operation-amount change-rate calculating means 100, in which the accelerator operation amount change rate $A_{CC}'$ is calculated on the basis of the operation amount signal $A_{CC}$ which represents the amount of operation of the accelerator pedal 46 and which is applied to the electronic control device 40.

Successively, S13 corresponding to the differential-state determining means 102 is implemented to determine whether the power distributing mechanism 16 is placed in the differential state, that is, whether the continuously-variable transmission portion 11 is placed in the continuously-variable shifting state. This determination is made depending upon whether the vehicle condition is in the continuously-variable shifting region which is defined by the shifting boundary line map shown in FIG. 6 by way of example and in which the transmission mechanism 10 should be placed in the continuously-variable shifting state.

When a negative decision is obtained in S13, the control flow goes to S14 corresponding to the engine speed control means 104, in which the shifting control of the step-variable transmission portion 20 to effect the shifting action determined in S11 is implemented by the step-variable shifting control means 54 to control the engine speed $N_E$ by utilizing a stepping change of the engine speed $N_E$ as a result of the shifting action. At the same time, S15 corresponding to the engine speed control means 104 is implemented, in which the speed(s) of the first electric motor M1 and/or the second electric motor M2 is controlled by the hybrid control means 2 while the power distributing mechanism 16 is held in its non-differential state by the switching control means 50, so that the engine speed $N_E$ is made equal to the target engine speed value $N_E^*$ upon completion of the shifting action of the step-variable transmission portion 20, as soon as possible.

When an affirmative decision is obtained in S13, the control flow goes to S16 corresponding to the engine speed control means 104, in which the first electric motor M1 is controlled by the hybrid control means 52 to control the speed of the first sun gear S1, for thereby controlling the engine speed $N_E$. At the same time, S17 corresponding to the engine speed control means 104 is implemented, in which the shifting control of the step-variable transmission portion 20 is implemented by the step-variable shifting control means 54. Thus, the engine speed $N_E$ is controlled in S16 and S17 by using the first electric motor M1, to coincide with the target engine speed value $N_E^*$ upon completion of the shifting action of the step-variable transmission portion 20.

The time charts of FIGS. 25-28 show respective examples of the control operation illustrated in the flow chart of FIG. 24.

Figure 25:
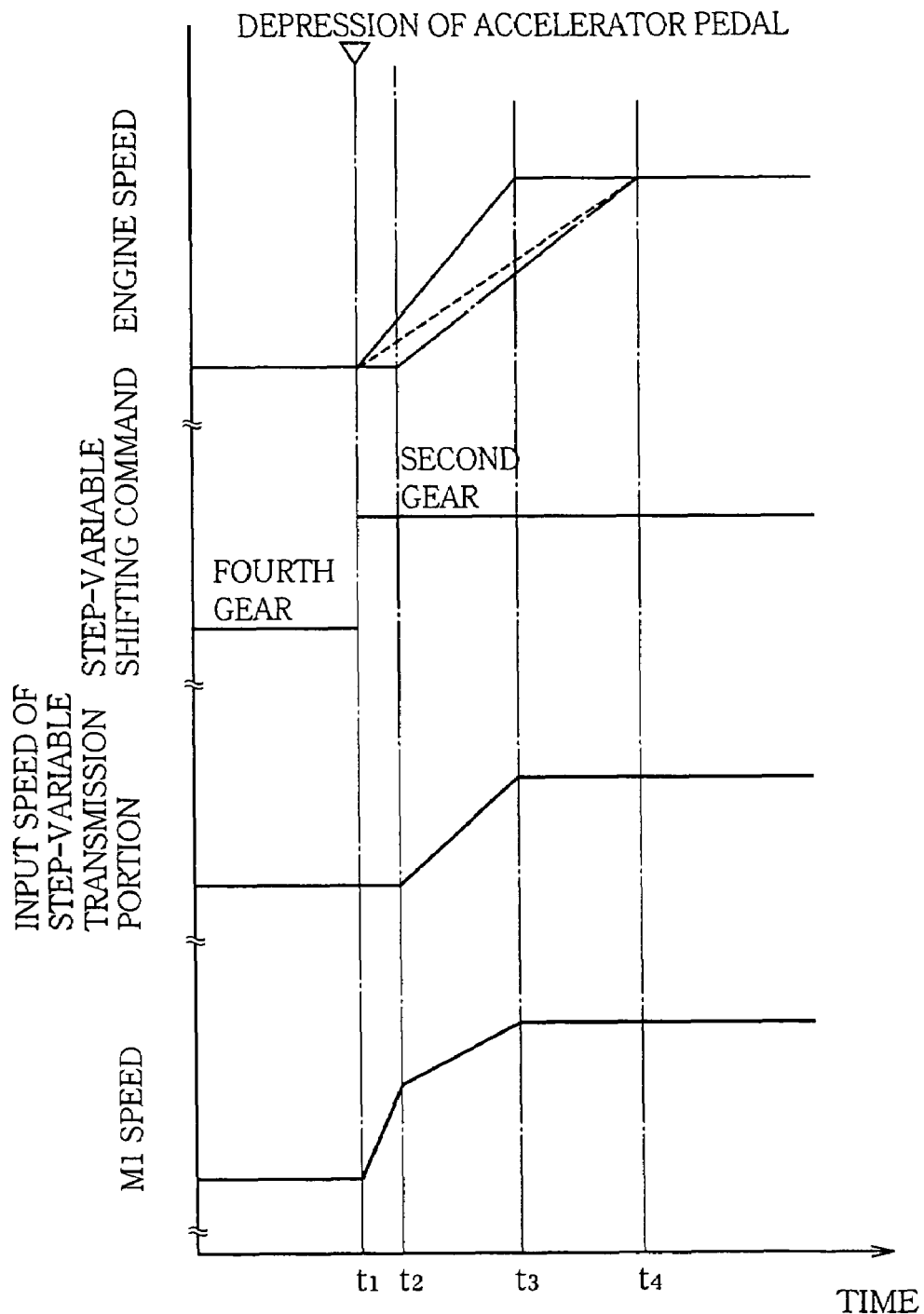
FIG. 25 is a time chart indicating the control operation shown in the flow chart of FIG. 24, when the transmission mechanism is shifted down from a fourth gear position to a second gear position in the continuously-variable shifting state in response to a depressing operation of an accelerator pedal.

FIG. 25 shows the example in which the transmission portion 20 is shifted down from the fourth gear position to the second gear position as indicated by solid line A in FIG. 6, as a result of a depressing operation of the accelerator pedal while the transmission mechanism 10 is placed in the continuously-variable shifting sate. In this example of FIG. 25, the control operation consists of S11, S12, S13, S16 and S17 of the flow chart of FIG. 24 which are implemented in this order. Namely, the shift-down action from the fourth gear position to the second gear position is determined at a point of time t1 in FIG. 25 at which the accelerator pedal is depressed. In response to this determination, the first electric motor M1 is controlled to raise the speed of the first sun gear S1 for thereby raising the engine speed $N_E$, and the shifting control of the step-variable transmission portion 20 is initiated. Due to the response delay of the shifting action of the transmission portion 20, the input speed of the transmission portion 20 remains unchanged to up a point of time t2. However, the engine speed $N_E$ is rapidly raised (during a time period from the point of time t1 to the point of time t2) irrespective of the shifting action of the transmission portion 20, since the continuously-variable transmission portion 11 is held in the continuously-variable shifting state. Namely, the engine speed control up to a point of time t3 at which the shifting control of the step-variable transmission portion 20 is completed is not effected by a change of the engine speed due to the shifting action of the transmission portion 20, but is implemented by controlling the first electric motor M1, so that the delay of the rise of the engine speed $N_E$ with respect to the depression of the accelerator pedal is reduced, that is, the response of the engine speed $N_E$ is improved. Thus, the engine speed control during the shifting action of the transmission portion 20 is improved over the conventional engine speed control indicated by one-dot chain line in FIG. 25. In addition, the engine output is also rapidly increased. Where the change rate $A_{CC}'$ of the accelerator pedal operation amount is relatively low, that is, where the operating speed of the accelerator pedal is relatively low, the engine speed may be controlled as indicated by broken line (during the time period from the point of time t1 to a point of time t4).

Figure 26:
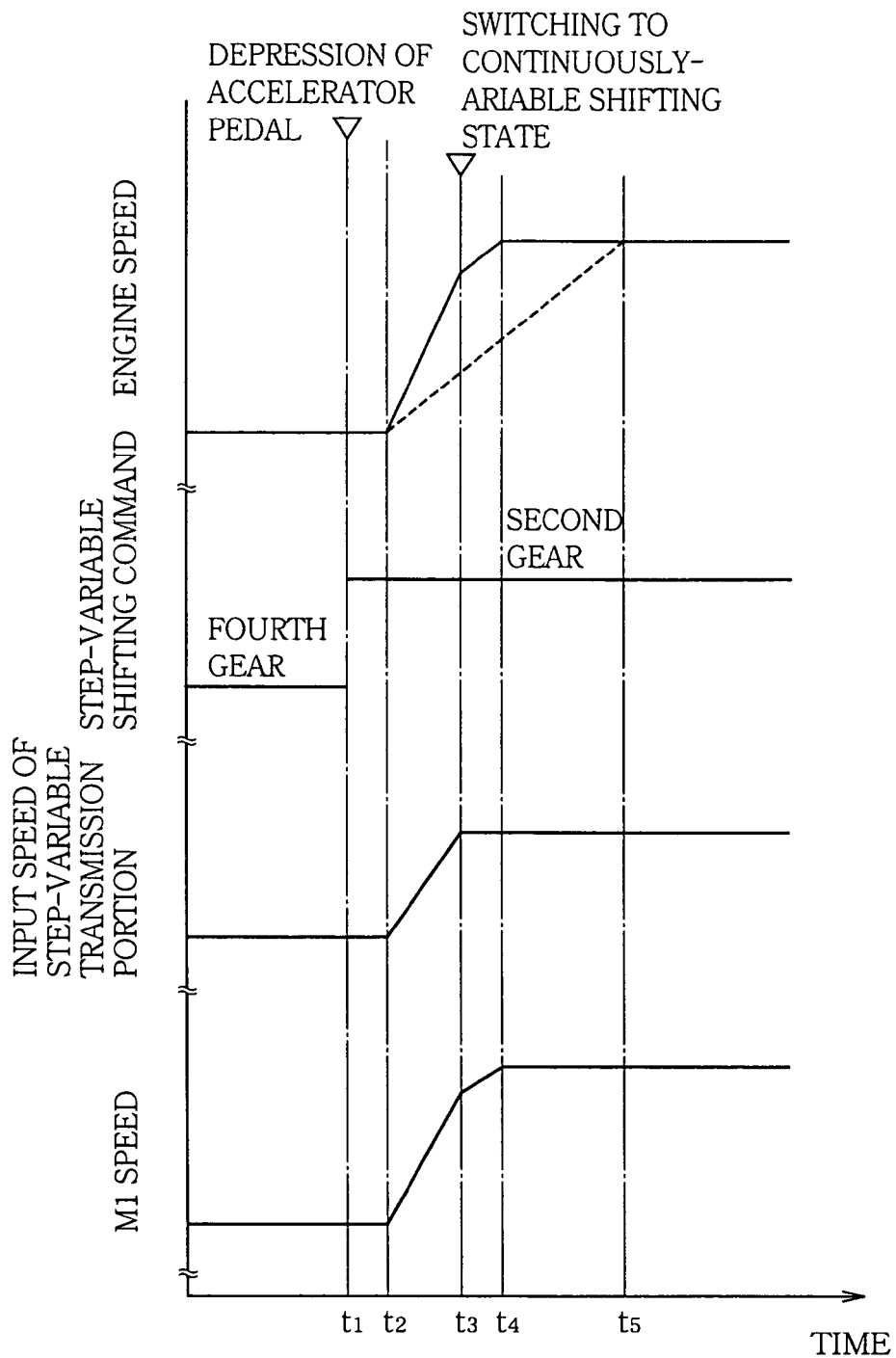
FIG. 26 is a time chart indicating the control operation shown in the flow chart of FIG. 24, when the transmission mechanism is shifted down from the fourth gear position to the second gear position in the step-variable shifting state in response to the depression operation of the accelerator pedal.

FIG. 26 shows the example in which the transmission portion 20 is shifted down from the fourth gear position to the second gear position as a result of a depressing operation of the accelerator pedal while the transmission mechanism 10 is placed in the step-variable shifting sate. In this example of FIG. 26, the control operation consists of S11, S12, S13, S14 and S15 of the flow chart of FIG. 24 which are implemented in this order. Namely, the shift-down action from the fourth gear position to the second gear position is determined at the point of time t1 in FIG. 26 at which the accelerator pedal is depressed. In response to this determination, the shifting control of the step-variable transmission portion 20 is initiated. Due to the response delay of the shifting action of the transmission portion 20, the input speed of the transmission portion 20 remains unchanged to up the point of time t2. In this case, the power distributing mechanism 16 is not once switched to the differential state, but is held in the non-differential state to prevent a response delay due to the switching action to the differential state. In this non-differential state, the transmission portion 20 is shifted down to change its speed ratio in steps, for thereby raising the engine speed (during a time period from the point of time t2 to the point of time t3). Accordingly, the shifting control of the transmission portion 20 is rapidly completed. For reducing the time period from the point of time t2 to the point of time t3, the engine speed $N_E$ may be controlled by controlling the first electric motor M1 and/or the second electric motor M2. Further, a fine adjustment of the engine speed $N_E$ may be made by using the first electric motor M1 during the time period from the point of time t3 to the point of time t4 after switching the continuously-variable transmission portion 11 to the continuously-variable shifting state. This switching to the continuously-variable shifting state may be effected in S15 of the flow chart of FIG. 24, or in a step following S15. Where the change rate $A_{CC}'$ of the accelerator pedal operation amount is relatively low, that is, where the operating speed of the accelerator pedal is relatively low, the engine speed may be controlled as indicated by broken line (during the time period from the point of time t2 to a point of time t5).

Figure 27:
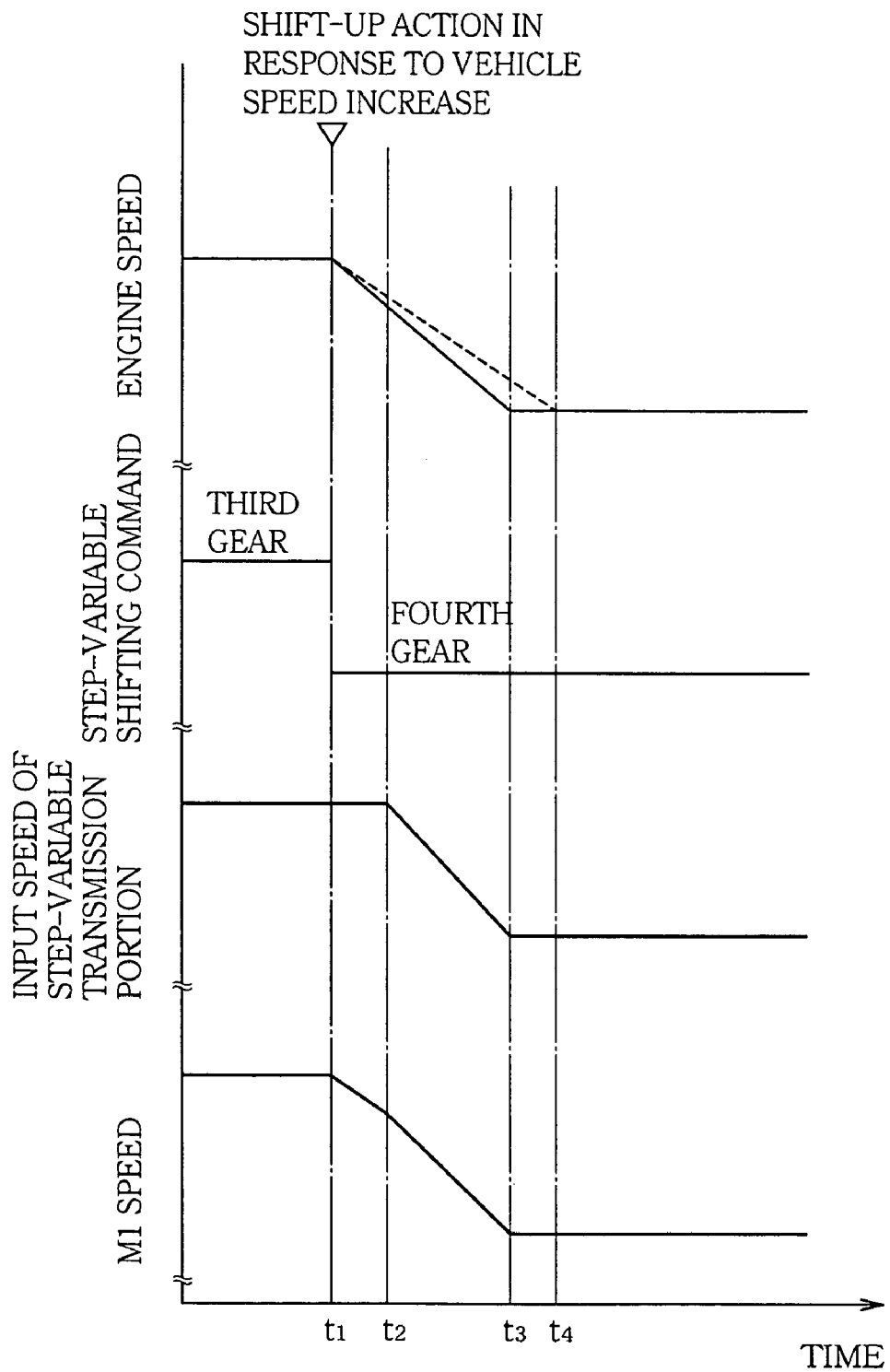
FIG. 27 is a time chart indicating the control operation shown in the flow chart of FIG. 24, when the transmission mechanism is shifted up from a third gear position to the fourth gear position in the continuously-variable shifting state in response to an increase of the vehicle speed.

FIG. 27 shows the example in which the transmission portion 20 is shifted up from the third gear position to the fourth gear position as indicated by solid line B in FIG. 6, as a result of an increase of the vehicle seed while the transmission mechanism 10 is placed in the continuously-variable shifting sate. In this example of FIG. 27, the control operation consists of S11, S12, S13, S16 and S17 of the flow chart of FIG. 24 which are implemented in this order. Namely, the shift-up action from the third gear position to the fourth gear position is determined at the point of time t1 in FIG. 27 at which the vehicle speed is increased. In response to this determination, the first electric motor M1 is controlled to reduce the speed of the first sun gear S1 for thereby reducing the engine speed $N_E$, and the shifting control of the step-variable transmission portion 20 is initiated. Due to the response delay of the shifting action of the transmission portion 20, the input speed of the transmission portion 20 remains unchanged to up the point of time t2. However, the engine speed $N_E$ is rapidly reduced (during a time period from the point of time t1 to the point of time t2) irrespective of the shifting action of the transmission portion 20, since the continuously-variable transmission portion 11 is held in the continuously-variable shifting state. Namely, the engine speed control up to the point of time t3 at which the shifting control of the step-variable transmission portion 20 is completed is not effected by a change of the engine speed due to the shifting action of the transmission portion 20, but is implemented by controlling the first electric motor M1, so that the shifting control can be rapidly completed. The rate of reduction of the engine speed during the time period from the point of time t1 to the point of time t2 may be made lower than that during the time period from the point of time t2 to the point of time t2, for reducing the shifting shock of the transmission portion 20. Where the change rate $A_{CC}'$ of the accelerator pedal operation amount is relatively low, that is, where the operating speed of the accelerator pedal is relatively low, the engine speed may be controlled as indicated by broken line (during the time period from the point of time t1 to a point of time t4).

Figure 28:
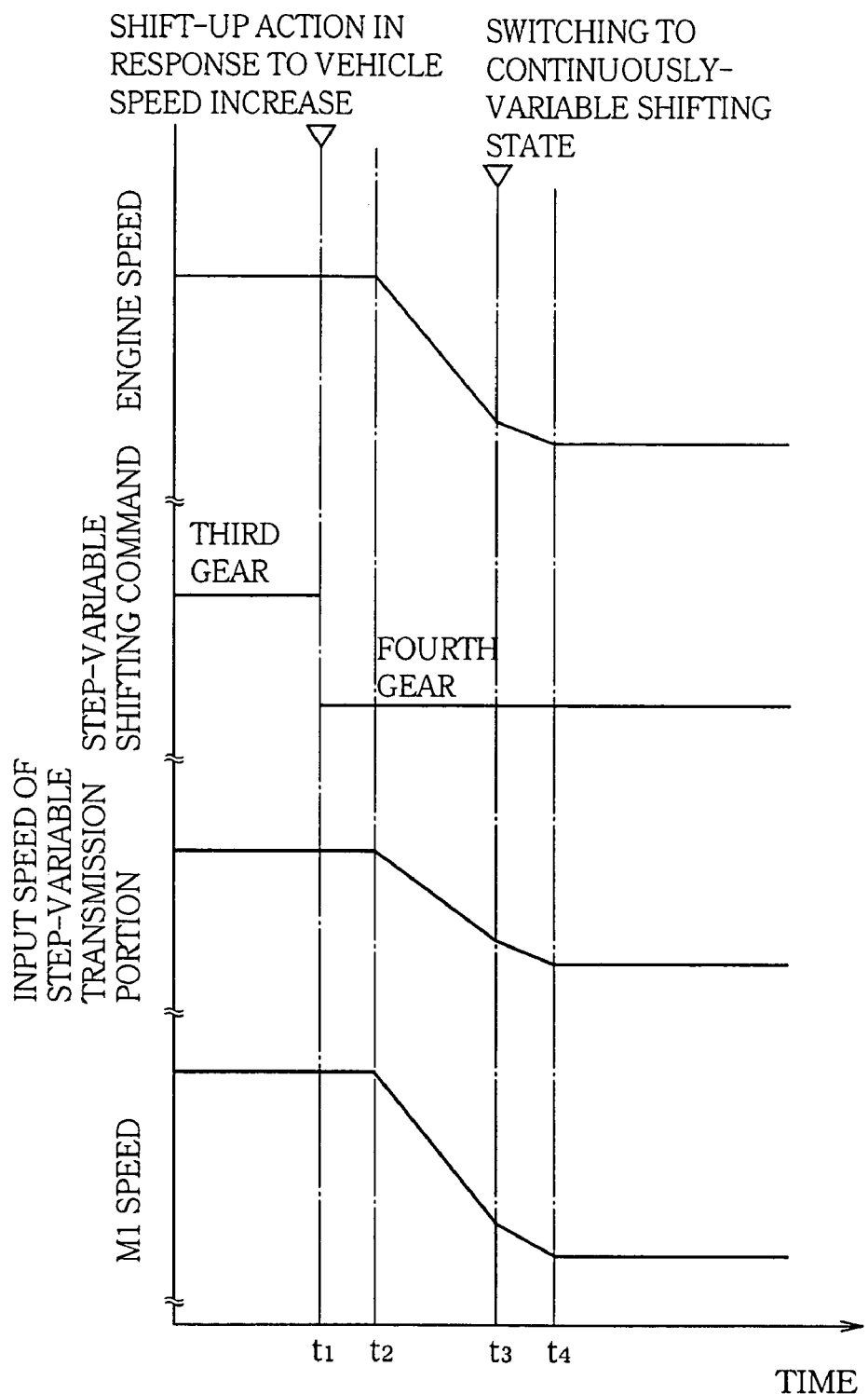
FIG. 28 is a time chart indicating the control operation shown in the flow chart of FIG. 24, when the transmission mechanism is shifted up from the third gear position to the fourth gear position in the step-variable shifting state in response to the increase of the vehicle speed.

FIG. 28 shows the example in which the transmission portion 20 is shifted up from the third gear position to the fourth gear position as a result of an increase of the vehicle seed while the transmission mechanism 10 is placed in the step-variable shifting sate. In this example of FIG. 28, the control operation consists of S11, S12, S13, S14 and S16 of the flow chart of FIG. 24 which are implemented in this order. Namely, the shift-up action from the third gear position to the fourth gear position is determined at the point of time t1 in FIG. 27 at which the vehicle speed is increased. In response to this determination, the shifting control of the step-variable transmission portion 20 is initiated. Due to the response delay of the shifting action of the transmission portion 20, the input speed of the transmission portion 20 remains unchanged to up the point of time t2. In this case, the power distributing mechanism 16 is not once switched to the differential state, but is held in the non-differential state to prevent a response delay due to the switching action to the differential state. In this non-differential state, the transmission portion 20 is shifted up to change its speed ratio in steps, for thereby reducing the engine speed (during a time period from the point of time t2 to the point of time t3). Accordingly, the shifting control of the transmission portion 20 is rapidly completed. For reducing the time period from the point of time t2 to the point of time t3, the engine speed $N_E$ may be controlled by controlling the first electric motor M1 and/or the second electric motor M2. Further, a fine adjustment of the engine speed $N_E$ may be made by using the first electric motor M1 during the time period from the point of time t3 to the point of time t4 after switching the continuously-variable transmission portion 11 to the continuously-variable shifting state. This switching to the continuously-variable shifting state may be effected in S15 of the flow chart of FIG. 24, or in a step following S15.

As described above, the transmission mechanism 10 according to the present embodiment includes the switching clutch C0 and switching brake B0 operable to switch the power distributing mechanism 16 between the differential state in which the continuously-variable transmission portion 11 is operable as an electrically controlled continuously variable transmission, and the non-differential state in which the transmission portion 11 is not operable as the continuously variable transmission. In this transmission mechanism 10, the engine speed $N_E$ during a shifting control of the step-variable transmission portion 20 is controlled by the engine speed control means 104, by utilizing the function of the continuously-variable transmission portion 11 as the electrically controlled continuously variable transmission, that is, by utilizing the differential function of the power distributing mechanism 16. Accordingly, the engine speed $N_E$ is rapidly changed with improved response, irrespective of the moment of initiation of a shifting action of the step-variable transmission portion 20, and the shifting control of the transmission portion 20 is rapidly completed since the shifting control is implemented simultaneously with the engine speed control. When the transmission portion 20 is shifted down in response to a depression operation of the accelerator pedal, for example, the engine speed $N_E$ is rapidly raised following the depressing operation of the accelerator pedal, so that the engine output (power) is rapidly increased. Further, the shift-down action of the transmission portion 20 is rapidly completed since the shift-down control is implemented simultaneously with the engine speed control.

The engine speed control means 104 provided in the present embodiment is further arranged to control the engine speed $N_E$ by utilizing the first electric motor M1 such that the engine speed upon completion of the shifting action of the step-variable transmission portion 20 coincides with the target engine speed value $N_E^*$ upon completion of the shifting action of the step-variable transmission portion 20, so that the response of the engine speed $N_E$ to the shifting action is improved irrespective of a change of the engine speed $N_E$ due to the shifting action of the transmission portion 20.

The present embodiment is further arranged such that the engine speed control means 104 controls the rate of change of the engine speed on the basis of the change rate $A_{CC}^*$ of the accelerator pedal operation amount, so that the vehicle-operator's desire is adequately reflected on the engine speed $N_E$, whereby the drivability of the vehicle is improved.

The present embodiment is further arranged such that the method of control of the engine speed $_{NE}$ by the engine speed control means 104 is changed depending upon whether the power distributing mechanism 16 is in the differential state or the non-differential state upon initiation of the shifting control of the step-variable transmission portion 20, so that the engine speed $N_E$ is rapidly changed, and the response of the engine speed to the shifting action is improved.

Where the power distributing mechanism 16 is in the differential state, for example, the engine speed control means 104 controls the engine speed $N_E$ during the shifting control of the step-variable transmission portion 20, by utilizing the differential function of the power distributing mechanism 16, so that the engine speed $N_E$ is rapidly changed irrespective of the moment of initiation of the shifting action of the transmission portion 20, resulting in an improvement of the response of the engine speed $N_E$, and the shifting control of the transmission portion 20 is rapidly completed since the shifting control is implemented simultaneously with the engine speed control.

Where the power distributing mechanism 16 is in the non-differential state, the engine speed control means 104 controls the engine speed $N_E$ during the shifting control of the step-variable transmission portion 20, by utilizing a change of the engine speed due to the shifting action of the transmission portion 20, so that the engine speed $N_E$ is rapidly changed with improved response during the shifting action of the transmission portion 20, without switching the power distributing mechanism 16 from the non-differential state to the differential state.

Where the power distributing mechanism 16 is in the non-differential state, the engine speed control means 104 controls the engine speed during the shifting control of the step-variable transmission portion 20, by utilizing the first electric motor M1 and/or the second electric motor M1, while holding the power distributing mechanism 16 in the non-differential state, so that the engine speed $N_E$ is rapidly changed during the shifting action of the transmission portion 20, without switching the power distributing mechanism 16 from the non-differential state to the differential state. Further, the engine speed $N_E$ is controlled by utilizing the electric motor(s) M1, M2 such that the engine speed NE coincides with the target engine speed value $N_E^*$ upon completion of the shifting action of the transmission portion 20, so that the response to the shifting action is further improved.

The present embodiment is further arranged such that the manner of the shifting control of the step-variable transmission portion 20 depending upon whether the power distributing mechanism 16 is in the differential state or the non-differential state upon initiation of the shifting control of the step-variable transmission portion 20, so that the engine speed $N_E$ is rapidly changed, and the response of the engine speed to the shifting action is improved.

Where the power distributing mechanism 16 is in the differential state, for example, the engine speed control means 104 controls the engine speed $N_E$ during the shifting action of the transmission portion 20 by utilizing the differential function of the power distributing mechanism 16, while permitting the simultaneous shifting control of the transmission portion 20, so that the engine speed $N_E$ is rapidly changed irrespective of the moment of initiation of the shifting action of the transmission portion 20, resulting in an improvement of the response of the engine speed $N_E$, and the shifting control of the transmission portion 20 is rapidly completed since the shifting control is implemented simultaneously with the engine speed control.

Where the power distributing mechanism 16 is in the non-differential state, the engine speed control means 104 controls the engine speed $N_E$ during the shifting control of the step-variable transmission portion 20 by utilizing a change of the engine speed due to the shifting action of the transmission portion 20, while holding the power distributing mechanism 16 in the non-differential state, so that the engine speed $N_E$ is rapidly changed with improved response during the shifting action of the transmission portion 20, without switching the power distributing mechanism 16 from the non-differential state to the differential state.

While the embodiments of the present invention have been described above in detail by reference to the accompanying drawings, it is to be understood that the present invention may be otherwise embodied.

In the illustrated embodiments, the power distributing mechanism 16 is switchable between its differential state and non-differential state, so that the transmission mechanism 10, 70 is switchable between the continuously-variable shifting state in which the transmission mechanism 10 functions as the electrically controlled continuously variable transmission, and the step-variable shifting state in which the transmission mechanism 10 functions as the step-variable transmission. However, the principle of this invention is applicable to the transmission mechanism 10, 70 which cannot be placed in the step-variable shifting state, that is, the transmission mechanism wherein the continuously-variable transmission portion (differential portion) 11 is not provided with the switching clutch C0 and brake B0 and is operable to function as the electrically controlled continuously variable transmission (electrically controlled differential device). In this case, the switching control means 50, high-speed-gear determining means 62 and differential-state determining means 80 shown in FIG. 5 are not necessary, and step S2 in the flow chart of FIGS. 11 and 14 to determine the differential state of the transmission mechanism 16 is not necessary so that step S6 is not necessary, either. The present invention is also applicable to a transmission mechanism wherein the continuously-variable transmission portion 11 is a well known continuously variable transmission (CVT).

In the illustrated embodiments, the transmission mechanism 10, 70 is switchable between its continuously-variable shifting state and step-variable shifting state, by switching the continuously-variable transmission portion 11 (power distributing mechanism 16) between its differential state in which the transmission portion 11 is operable as the electrically controlled continuously variable transmission, and its non-differential state (locked state) in which the transmission portion 11 is not operable as the electrically controlled continuously variable transmission. However, the transmission mechanism 10, 70 may function as the step-variable transmission while the speed ratio of the continuously-variable transmission portion 11 is variable in steps rather than continuously variable, while this transmission portion 11 remains in the differential state. In other words, the differential and non-differential states of the continuously-variable transmission portion 11 need not respectively correspond to the continuously-variable and step-variable shifting states of the transmission mechanism 10, 70, and the continuously-variable transmission portion 11 need not be switchable between the continuously-variable and step-variable shifting states. The principle of the present invention is applicable to any transmission mechanism (its continuously-variable transmission portion 11 or power distributing mechanism 16) which is switchable between the differential state and the non-differential state.

In the preceding embodiments, the shifting control of the continuously-variable transmission portion 11 is implemented to prevent a change of the engine speed $N_E$, that is, to prevent a change of the total speed ratio of the transmission mechanism 10, as indicated in the time charts of FIGS. 12, 15 and 16. However, the shifting control of the transmission portion 11 need not be implemented to prevent a change of the engine speed $N_E$, as long as the shifting control is implemented to reduce a stepping change of the engine speed $N_E$ and assure a continuous change of the engine speed.

In the preceding embodiments, the differential-state determining means 80 (step S2 of FIGS. 11 and 14) is arranged to determine whether the vehicle condition is in the continuously-variable shifting region, according to the switching boundary line map shown in FIG. 6 by way of example, to determine whether the power distributing mechanism 16 is placed in the differential state. However, the determination as to whether the power distributing mechanism 16 is placed in the differential state may be made depending upon whether the transmission mechanism 10 is placed in the step-variable or continuously-variable shifting state under the control of the switching control means 30.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the transmission portion 20, 72.

In the illustrated embodiments, the step-variable transmission portion 20, 72 is disposed in the power transmitting path between the drive wheels 38, and the power transmitting member 18 which is the output member of the continuously-variable transmission portion 11 or power distributing mechanism 16. However, the transmission portion 20, 72 may be replaced by any other type of power transmitting device such as: a continuously variable transmission (CVT) which is a kind of an automatic transmission; and an automatic transmission which is a permanent-mesh parallel-two-axes type transmission well known as a manual transmission and which is automatically shifted by select cylinders and shift cylinders. Where the continuously variable transmission (CVT) is provided, the transmission mechanism as a whole is placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of a step-variable transmission, according to stored data indicative of the predetermined speed ratios.

While the transmission portion 20, 72 in the preceding embodiments is connected in series to the continuously-variable transmission portion 11 through the power transmitting member 18, the transmission portion 20, 72 may be mounted on and disposed coaxially with a counter shaft which is parallel to the input shaft 14. In this case, the continuously-variable transmission portion 11 and the transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which are respectively operatively connected to the first and second electric motors M1, M2.

Although the shifting device 90 in the preceding embodiments is provided with the shift lever 92 operable to select the plurality of shift positions, the shift lever 92 may be replaced by a switching device such as pushbuttons or slide-type switch operable to select the shift positions, or a switching device operable by a voice generated by the vehicle operator or a foot of the vehicle operator, rather than by hand, to select the plurality of shift positions. While the desired one of the shift ranges is selected when the shift lever 92 is placed in the manual forward-drive position M, the desired gear position (namely, the highest gear position of each shift range) may be selected by operating the shift lever 92 placed in the manual forward-drive position M. In this case, the step-variable transmission portion 20, 70 is shifted to the selected gear position. For instance, each time the shift lever 92 is operated from the manual forward-drive position M to the shift-up position "+" or shift-down position "−", the step-variable transmission portion 20, 70 is shifted up or down to the desired one of the first through fourth gear positions.

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function-of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

In the embodiment shown in the flow chart of FIG. 24, step S11 is arranged to make the determination as to whether a shifting control of the step-variable transmission portion 20 is implemented, by determining whether one of the gear positions to which the step-variable transmission 20 should be shifted has been determined on the basis of the vehicle condition and according to the shifting boundary line map shown in FIG. 6. Where the desired shift range or the desired gear position is manually selected by a shifting device well known in the art, the determination that the shifting control of the transmission portion 20 is implemented may be made when the transmission portion 20 is shifted according to the manual operation of the shifting device. Thus, the present invention is applicable to a transmission mechanism wherein the step-variable transmission portion 20 is shifted in response to a manual shifting operation.

In the embodiment shown in the flow chart of FIG. 24, steps S16 and S17 are simultaneously implemented. However, it is possible that step S16 is first implemented and then step S17 is implemented.

In the embodiment shown in the flow chart of FIG. 24, steps S12 and S15 are not essential, and may be eliminated according to the present invention.

It is to be understood that the embodiments of the invention have been descried for illustrative purpose only, and that the present invention may be embodied with various changes and modifications which may occur to those skilled in the art.

The invention claimed is:

1. A control device for a vehicular drive system comprising (a) a continuously-variable transmission portion including a differential mechanism operable to distribute an output of an engine to a first electric motor and a power transmitting member, and further including a second electric motor disposed in a power transmitting path between said power transmitting member and a drive wheel of a vehicle, said continuously-variable transmission portion functioning as an electrically controlled continuously variable transmission, and (b) a step-variable transmission portion constituting a portion of said power transmitting path and functioning as a step-variable automatic transmission, said control device comprising:

an engine speed control portion operable during a shifting control of said step-variable transmission portion, for controlling a speed of said engine by controlling an electric continuously-variable shifting action of said continuously-variable transmission portion.

2. The control device according to claim 1, wherein said engine speed control portion controls the speed of said engine by utilizing at least one of said first electric motor and said second electric motor, such that the speed of the engine is made equal to a target engine speed value upon completion of a shifting action of said step-variable transmission portion.

3. The control device according to claim 1, wherein said engine speed control portion controls a rate of change of the speed of said engine on the basis of a rate of change of an operation amount of an accelerator pedal.

4. The control device according to claim 1, wherein said differential mechanism includes a differential-state switching device operable to switch said continuously-variable transmission portion between a differential state in which said continuously-variable transmission portion is operable as the electrically controlled continuously variable transmission, and a non-differential state in which said continuously-variable transmission portion is not operable as the electrically controlled continuously variable transmission.

5. The control device according to claim 4, wherein said differential mechanism has a first element connected to said engine, a second element connected to said first electric motor, and a third element connected to said power transmitting member, and wherein said differential-state switching device is operable to permit said first through third elements to be rotated relative to each other, for establishing said differential state, and to permit said first through third elements to be rotated as a unit or hold said second element stationary, for establishing said non-differential state.

6. The control device according to claim 5, wherein said differential-state switching device includes a clutch operable to connect any two of the first through third elements to each other for rotating the first through third elements as a unit, and/or a brake operable to fix the second element to a stationary member for holding said second element stationary.

7. A control device for a vehicular drive system comprising (a) a continuously-variable transmission portion including a differential mechanism operable to distribute an output of an engine to a first electric motor and a power transmitting member, and further including a second electric motor disposed in a power transmitting path between said power transmitting member and a drive wheel of a vehicle, said continuously-variable transmission portion functioning as an electrically controlled continuously variable transmission, and (b) a step-variable transmission portion constituting a portion of said power transmitting path and functioning as a step-variable automatic transmission, said control device comprising:

a differential-state switching device provided in said differential mechanism and operable to switch said continuously-variable transmission portion between a differential state in which said continuously-variable transmission portion is operable as the electrically controlled continuously variable transmission, and a non-differential state in which said continuously-variable transmission portion is not operable as the electrically controlled continuously variable transmission; and an engine speed control portion operable during a shifting control of said step-variable transmission portion, for controlling a speed of said engine during the shifting control of said step-variable transmission portion in one of two engine speed control methods which is selected depending upon whether the power distributing mechanism is placed in said differential state or said non-differential state upon initiation of the shifting control of the step-variable transmission portion.

8. The control device according to claim 7, wherein said engine speed control portion controls the speed of said engine by controlling an electric continuously-variable shifting action of said continuously-variable transmission portion if said differential mechanism is placed in said differential state upon initiation of the shifting control of said step-variable transmission portion.

9. The control device according to claim 7, wherein said engine speed control portion controls the speed of said engine by utilizing a change of the speed of the engine due to a shifting action of said step-variable transmission portion if said differential mechanism is placed in said non-differential state upon initiation of the shifting control of said step-variable transmission portion.

10. The control device according to claim 9, wherein said engine speed control portion controls the speed of said engine during the shifting control of said step-variable transmission portion, by utilizing at least one of said first electric motor and said second electric motor while said differential mechanism is held in said non-differential state, if said differential mechanism is placed in said non-differential state upon initiation of the shifting control of said step-variable transmission portion.

11. A control device for a vehicular drive system comprising (a) a continuously-variable transmission portion including a differential mechanism operable to distribute an output of an engine to a first electric motor and a power transmitting member, and further including a second electric motor disposed in a power transmitting path between said power transmitting member and a drive wheel of a vehicle, said continuously-variable transmission portion functioning as an electrically controlled continuously variable transmission, and (b) a step-variable transmission portion constituting a portion of said power transmitting path and functioning as a step-variable automatic transmission, said control device comprising:

a differential-state switching device provided in said differential mechanism and operable to switch said continuously-variable transmission portion between a differential state in which said continuously-variable transmission portion is operable as the electrically controlled continuously variable transmission, and a non-differential state in which said continuously-variable transmission portion is not operable as the electrically controlled continuously variable transmission; and an engine speed control portion operable during a shifting control of said step-variable transmission portion, for controlling a speed of said engine during the shifting control of said step-variable transmission portion, by changing a method of the shifting control of said step-variable transmission portion depending upon whether the power distributing mechanism is placed in said differential state or said non-differential state upon initiation of the shifting control of the step-variable transmission portion.

12. The control device according to claim 11, wherein said engine speed control means control portion controls the speed of said engine by controlling an electric continuously-variable shifting action of said continuously-variable transmission portion and implements the shifting control of said step-variable transmission portion, if said differential mechanism is placed in said differential state upon initiation of the shifting control of said step-variable transmission portion.

13. The control device according to claim 11, wherein if said differential mechanism is placed in said non-differential state upon initiation of the shifting control of said step-variable transmission portion, said engine speed control portion implements the shifting control of said step-variable transmission portion, such that the speed of said engine is changed by utilizing a change of the speed of the engine due to a shifting action of said step-variable transmission portion, while said step-variable transmission portion is held in said non-differential state.

14. The control device according to claim 11, wherein said differential mechanism has a first element connected to said engine, a second element connected to said first electric motor, and a third element connected to said power transmitting member, and wherein said differential-state switching device is operable to permit said first through third elements to be rotated relative to each other, for establishing said differential state, and to permit said first through third elements to be rotated as a unit or hold said second element stationary, for establishing said non-differential state.

15. The control device according to claim 14, wherein said differential-state switching device includes a clutch operable to connect any two of the first through third elements to each other for rotating the first through third elements as a unit, and/or a brake operable to fix the second element to a stationary member for holding said second element stationary.

* * * * *

UNITED STATES PATENT AND TRADEMARK OFFICE
CERTIFICATE OF CORRECTION

| | |
|---|---|
| PATENT NO. | : 7,396,316 B2 |
| APPLICATION NO. | : 11/092819 |
| DATED | : July 8, 2008 |
| INVENTOR(S) | : Atsushi Tabata et al. |

It is certified that error appears in the above-identified patent and that said Letters Patent is hereby corrected as shown below:

| Column | Line | |
|---|---|---|
| 1 | 28 | Before "disposed" insert --is--. |
| 4 | 37 | Change "toque" to --torque--. |
| 6 | 5 | Change "toque" to --torque--. |
| 6 | 11 | Change "In a 11$^{th}$" to --In an 11$^{th}$--. |
| 9 | 49 | After "method" insert --of--. |
| 9 | 65-66 | Change "portion controls" to --portion-controls--. |
| 10 | 32 | After "according" insert --to--. |
| 11 | 26 | After "transmission" insert --,--. |
| 15 | 43 | Change "a engine speed" to --an engine speed--. |
| 19 | 23 | After "ZS2/ZR2" insert --,--. |
| 19 | 55 | Change "neural position" to --neutral position--. |
| 19 | 62 | Change "Output" to --output--. |
| 20 | 2 | Change "speed ration" to --speed ratio--. |
| 34 | 41 | Change "potion 20" to --portion 20--. |
| 35 | 13 | After "parameters" delete "in the for". |

UNITED STATES PATENT AND TRADEMARK OFFICE
CERTIFICATE OF CORRECTION

PATENT NO. : 7,396,316 B2
APPLICATION NO. : 11/092819
DATED : July 8, 2008
INVENTOR(S) : Atsushi Tabata et al.

It is certified that error appears in the above-identified patent and that said Letters Patent is hereby corrected as shown below:

| Column | Line | |
|---|---|---|
| 37 | 56 | Change "position" (first occurrence) to --position "+"--. |
| 37 | 60 | Change "aut6omatically" to --automatically--. |
| 39 | 4 | Change "tends" to --tenths--. |
| 42 | 43 | Change "tends" to --tenths--. |
| 46 | 13 | Change "implement" to --implemented--. |
| 47 | 28 | Change "neural" to --neutral--. |
| 47 | 61 | Change "2.80," to --2.804,--. |
| 48 | 33 | Before "a whole" insert --as--. |
| 51 | 6 | After "arranged" delete "is". |
| 51 | 7 | Delete "arranged". |
| 52 | 26 | Change "speed NE" to --speed $N_E$--. |
| 53 | 14 | After "made equal" insert --to--. |
| 54 | 6 | Change "tends" to --tenths--. |
| 55 | 11 | Change "shifting sate" to --shifting state--. |

UNITED STATES PATENT AND TRADEMARK OFFICE
CERTIFICATE OF CORRECTION

PATENT NO. : 7,396,316 B2
APPLICATION NO. : 11/092819
DATED : July 8, 2008
INVENTOR(S) : Atsushi Tabata et al.

It is certified that error appears in the above-identified patent and that said Letters Patent is hereby corrected as shown below:

| Column | Line | |
|--------|------|---|
| 55 | 23 | Change "to up" to --up to--. |
| 55 | 55 | Change "shifting sate" to --shifting state--. |
| 55 | 60 | Change "to up" to --up to--. |
| 56 | 23 | Change "shifting sate" to --shifting state--. |
| 56 | 35 | Change "to up" to --up to--. |
| 56 | 61 | Change "shifting sate" to --shifting state--. |
| 57 | 3 | Change "to up" to --up to--. |
| 62 | 12 | Change "function-of" to --function of--. |

Signed and Sealed this

Ninth Day of December, 2008

JON W. DUDAS
*Director of the United States Patent and Trademark Office*